(12) United States Patent
Hashimoto

(10) Patent No.: US 7,209,426 B2
(45) Date of Patent: Apr. 24, 2007

(54) LIQUID CRYSTAL OPTICAL ELEMENT AND OPTICAL DEVICE

(75) Inventor: Nobuyuki Hashimoto, Iruma (JP)

(73) Assignee: Citizen Watch Co., Ltd., Tokyo (JP)

( * ) Notice: Subject to any disclaimer, the term of this patent is extended or adjusted under 35 U.S.C. 154(b) by 170 days.

(21) Appl. No.: 10/500,881

(22) PCT Filed: Nov. 7, 2003

(86) PCT No.: PCT/JP03/14208

§ 371 (c)(1),
(2), (4) Date: Jul. 7, 2004

(87) PCT Pub. No.: WO2004/042715

PCT Pub. Date: May 21, 2004

(65) Prior Publication Data

US 2005/0174504 A1    Aug. 11, 2005

(30) Foreign Application Priority Data

| Nov. 8, 2002 | (JP) | ............................. 2002-325789 |
| Apr. 18, 2003 | (JP) | ............................. 2003-114445 |
| Apr. 18, 2003 | (JP) | ............................. 2003-114472 |

(51) Int. Cl.
*G11B 7/00* (2006.01)

(52) U.S. Cl. .............................. 369/112.02; 369/112.04; 369/112.07

(58) Field of Classification Search ........... 369/112.02, 369/112.07, 44.32
See application file for complete search history.

(56) References Cited

U.S. PATENT DOCUMENTS

| 5,319,481 | A | * | 6/1994 | Fergason ..................... 349/171 |
| 5,901,131 | A | * | 5/1999 | Ootaki et al. .......... 369/112.02 |
| 6,078,554 | A | * | 6/2000 | Ootaki et al. .......... 369/112.02 |
| 6,141,304 | A | * | 10/2000 | Ogasawara ............... 369/53.19 |
| 2003/0035356 | A1 | * | 2/2003 | Stallinga et al. ......... 369/53.19 |
| 2003/0185134 | A1 | * | 10/2003 | Kimura et al. .......... 369/112.08 |
| 2005/0237880 | A1 | * | 10/2005 | Kobayashi ............... 369/44.32 |
| 2005/0237881 | A1 | * | 10/2005 | Kobayashi ............... 369/44.32 |
| 2005/0270955 | A1 | * | 12/2005 | Hirai ..................... 369/112.01 |

FOREIGN PATENT DOCUMENTS

| JP | 2001-4972 A | 1/2001 |
| JP | 2002-56565 A | 2/2002 |
| JP | 2002-358690 A | 12/2002 |
| JP | 2004-30726 A | 1/2004 |

\* cited by examiner

*Primary Examiner*—Wayne Young
*Assistant Examiner*—Minerva Rivero
(74) *Attorney, Agent, or Firm*—Finnegan, Henderson, Farabow, Garrett & Dunner, L.L.P.

(57) ABSTRACT

The invention is directed to the provision of a liquid crystal optical element, for correcting wavefront aberrations (principally, coma aberration and spherical aberration), that can be mounted separately from an objective lens, and an optical apparatus using such a liquid crystal optical element. The liquid crystal optical element according to the invention includes a first transparent substrate, a second transparent substrate, a liquid crystal sealed between the first and second transparent substrates, and an electrode pattern as a region for advancing or delaying the phase of a light beam and thereby correcting wavefront aberration, wherein the region is formed smaller than the field of view of the objective lens so that the region substantially stays within the field of view of the objective lens regardless of the tracking motion of tracking means.

61 Claims, 30 Drawing Sheets

INSIDE REGION — FIELD OF VIEW OF OBJECTIVE LENS

INSIDE REGION — FIELD OF VIEW OF OBJECTIVE LENS

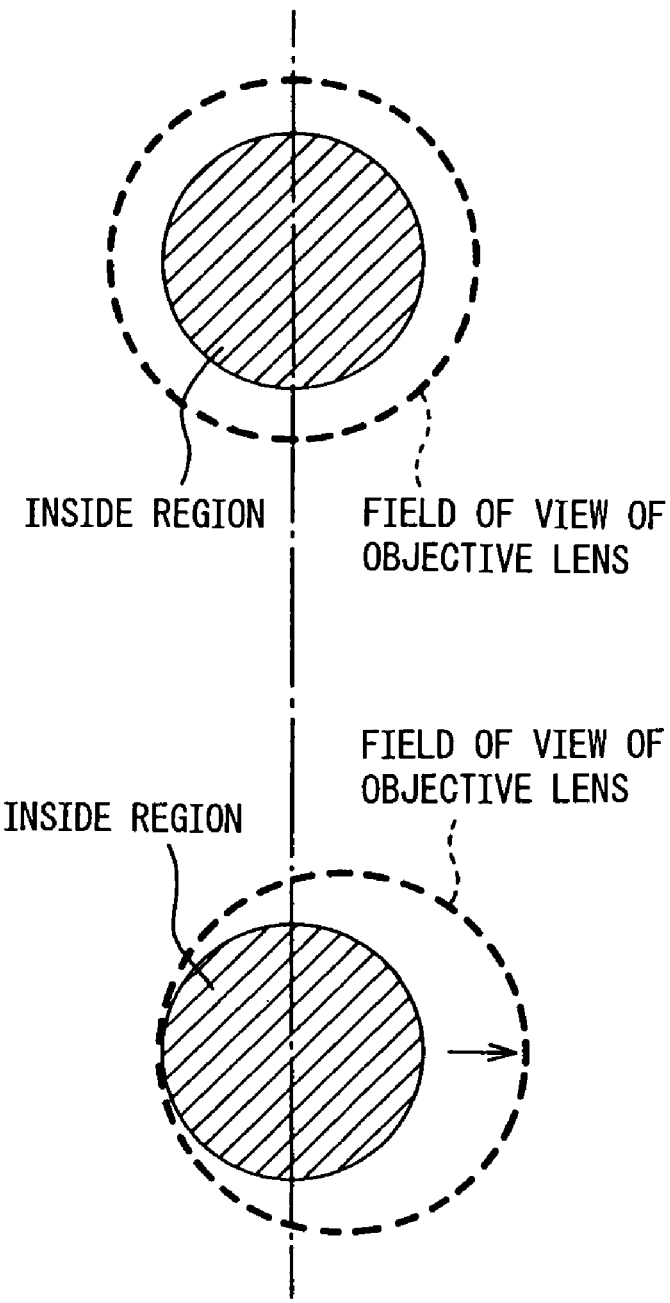
Fig.6A — INSIDE REGION | FIELD OF VIEW OF OBJECTIVE LENS
Fig.6B — INSIDE REGION | FIELD OF VIEW OF OBJECTIVE LENS

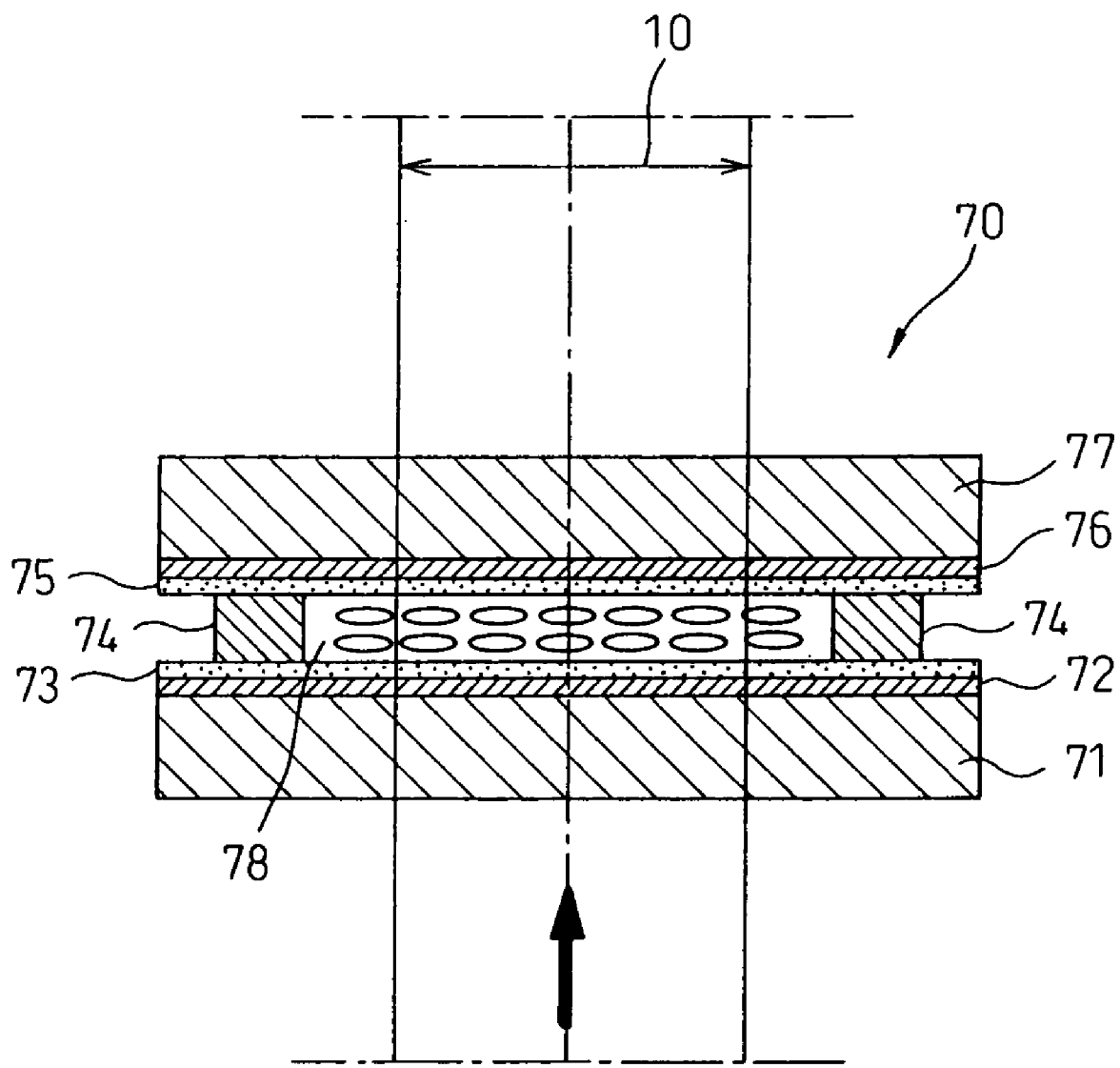

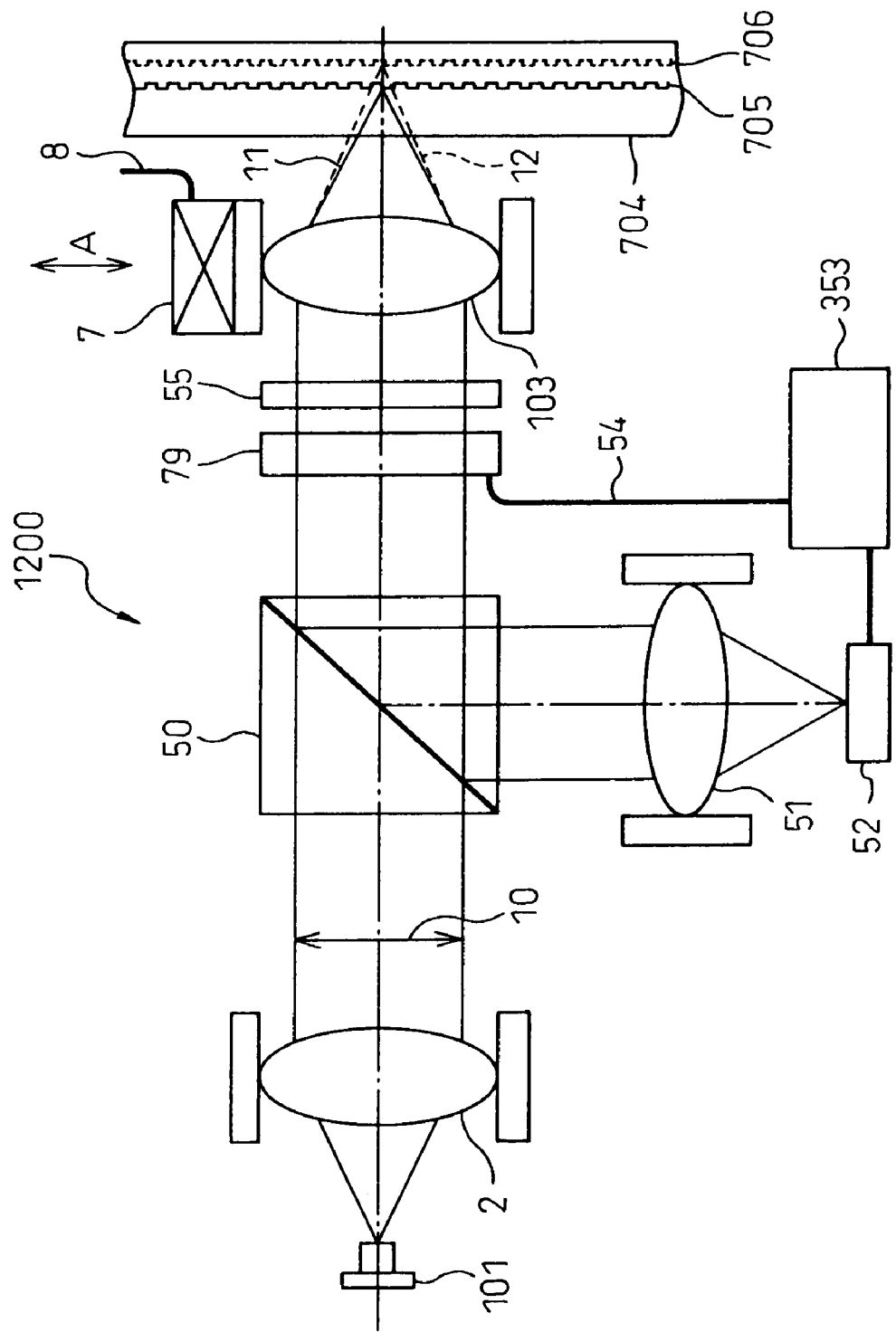

Fig.14B

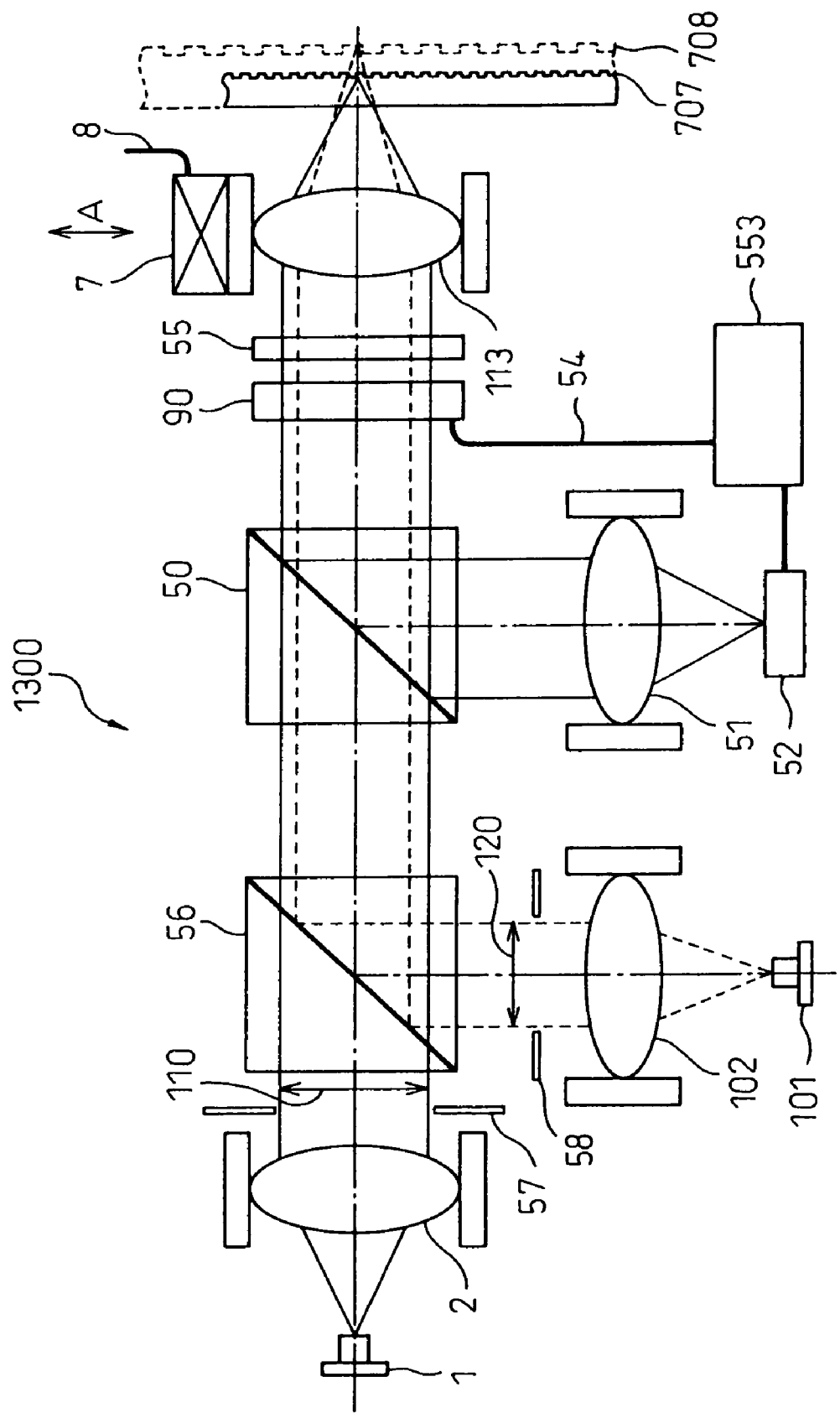

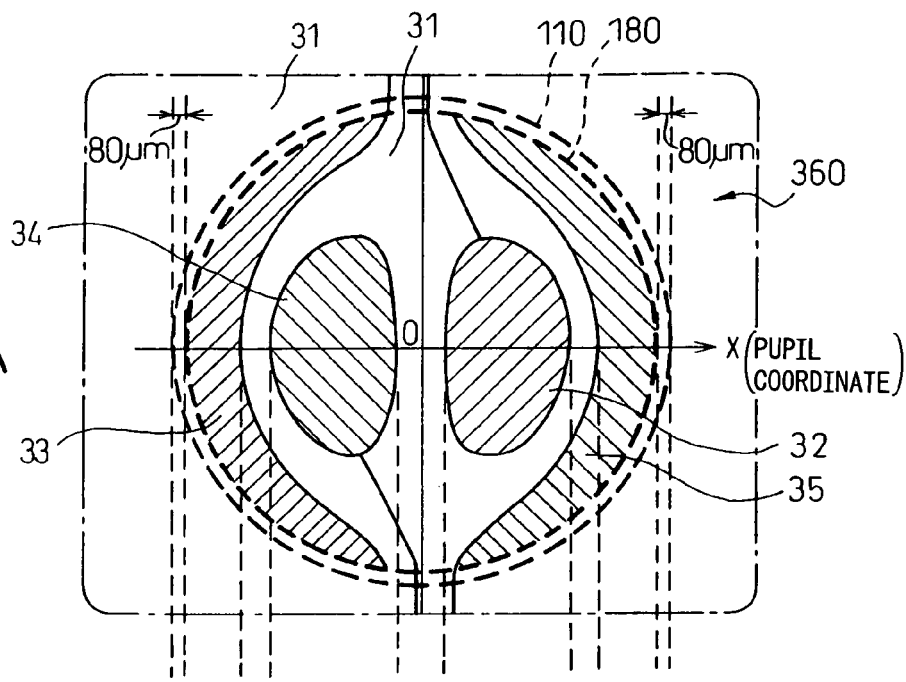
Fig.19A
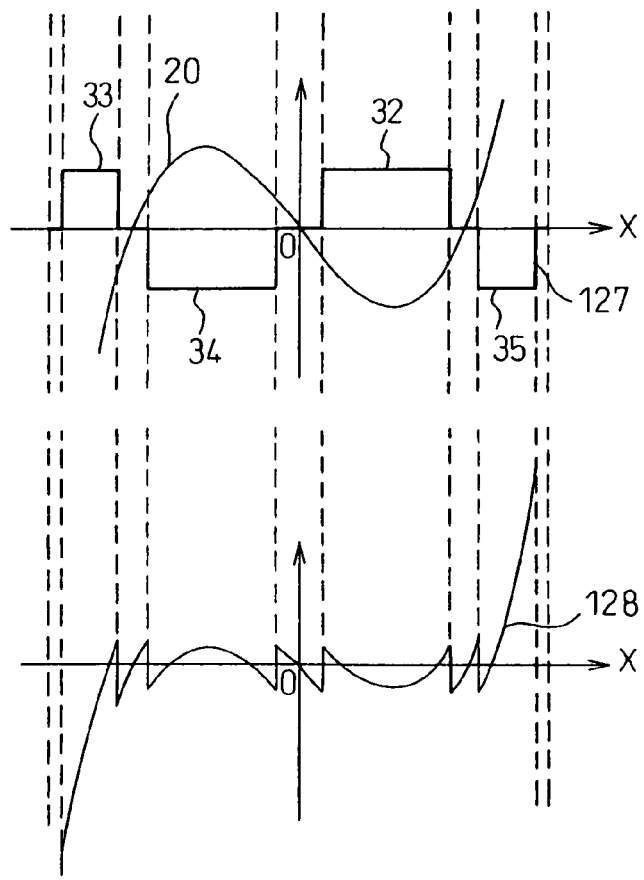
Fig.19B
Fig.19C

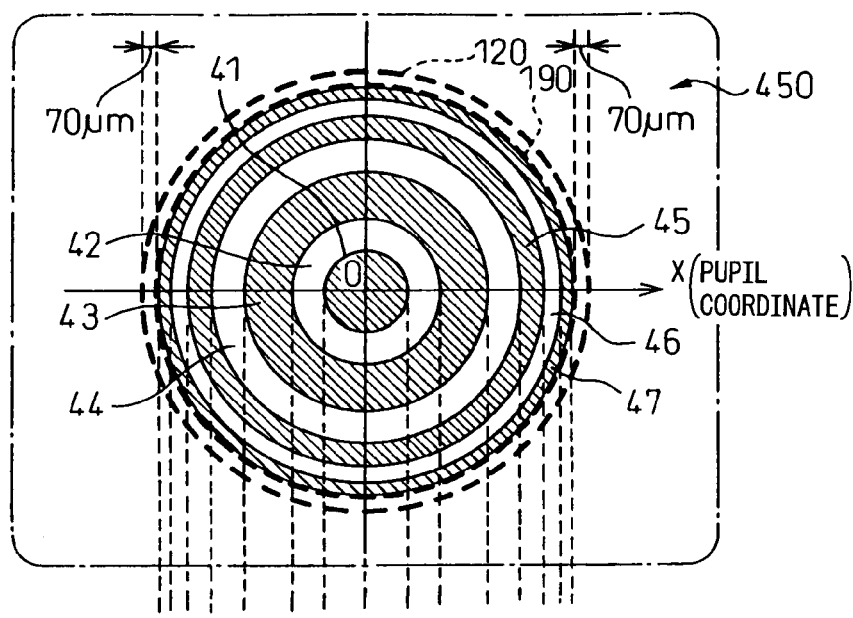
Fig.20A
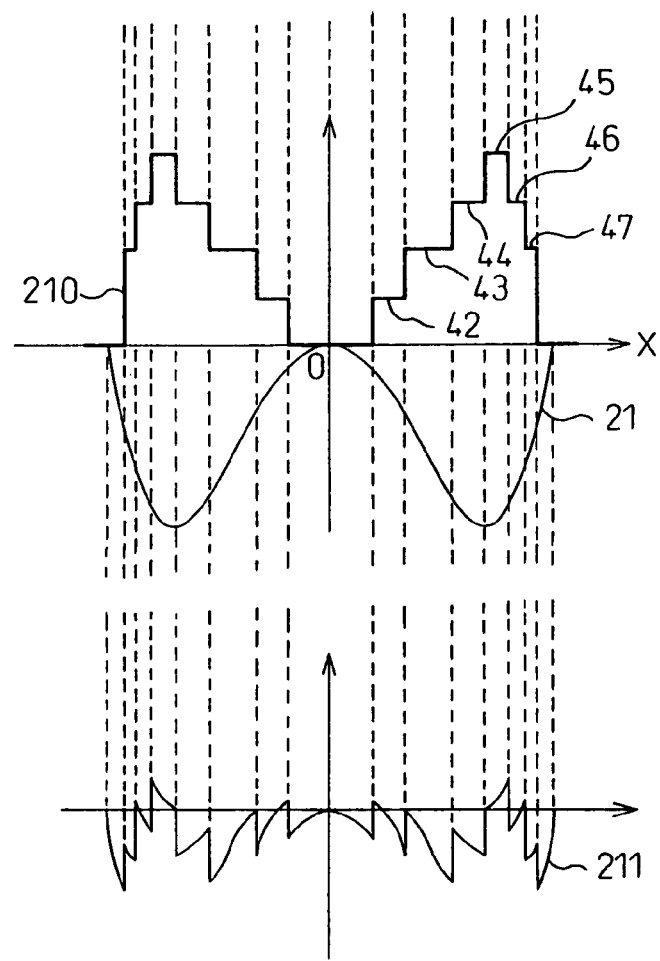
Fig.20B
Fig.20C

LIQUID CRYSTAL OPTICAL ELEMENT AND OPTICAL DEVICE

FIELD OF THE INVENTION

The present invention relates to a phase-modulating liquid crystal optical element, to an optical apparatus using the same and, more particularly, to a liquid crystal optical element for correcting wavefront aberrations of a highly coherent light beam such as laser light, and to an optical apparatus using such a liquid crystal optical element.

BACKGROUND OF THE INVENTION

In an optical pickup device used to read or write data on a recording medium such as a compact disc (CD) or a digital versatile disc (DVD), as shown in FIG. 23A a light beam from a light source 1 is converted, by a collimator lens 2, into a substantially parallel beam of light which is focused by an objective lens 3 onto the recording medium 4, and an information signal is generated by receiving the light beam reflected from the recording medium 4. In such an optical pickup device, when reading or writing data on the recording medium, the light beam focused by the objective lens 3 must be made to accurately follow the track on the recording medium 4. However, a tilt can occur at the surface of the recording medium 4, due to warping or curving of the recording medium 4, imperfections in the driving mechanism for the recording medium 4, etc. If the optical axis of the light beam focused by the objective lens 3 is tilted relative to the track on the recording medium 4, coma aberration occurs in the substrate of the recording medium 4; that is, when seen at the entrance pupil position of the objective lens 3 (i.e., the position where a liquid crystal optical element 5 is to be inserted), coma aberration 20 such as shown in FIG. 23B occurs, causing a degradation of the information signal generated based on the light beam reflected from the recording medium 4.

In view of this, it has been proposed to correct the coma aberration associated with the tilting of the recording medium 4, by placing a liquid crystal optical element 5 in the path between the collimator lens 2 and the objective lens 3 as shown in FIG. 24 (refer, for example, to Patent Publication 1). That is, utilizing the property that the orientation of liquid crystal molecules changes according to the potential difference caused in the liquid crystal, the liquid crystal optical element 5 works to change the phase of the light beam passing through the liquid crystal and thereby cancel out the coma aberration.

FIG. 25A shows a transparent electrode pattern 30 for generating a phase distribution in the liquid crystal according to the voltage applied to the coma aberration correcting liquid crystal optical element 5. In FIG. 25A, two regions 32 and 33 for advancing the phase and two regions 34 and 35 for delaying the phase are formed in a region having approximately the same size as the effective diameter 10 of the light beam incident on the liquid crystal optical element 5. In the figure, reference numeral 31 indicates a region to which a reference potential is applied.

When a positive (+) voltage is applied to the regions 32 and 33, a potential difference occurs with respect to a transparent electrode on the opposite side (not shown), and the orientation of the liquid crystal molecules therebetween changes according to the potential difference. As a result, in the case of a conventional p-type liquid crystal, the light beam passing therethrough is acted upon by a force that advances its phase. On the other hand, when a negative (−) voltage is applied to the regions 34 and 35, a potential difference occurs with respect to the transparent electrode on the opposite side (not shown), and the orientation of the liquid crystal molecules therebetween changes according to the potential difference. As a result, in the case of a conventional p-type liquid crystal, the light beam passing therethrough is acted upon by a force that delays its phase. The reference potential (here, 0 V as an example) is applied to the region 31. These voltages are applied to the transparent electrode pattern 30 via a lead 6 (see FIG. 24).

In FIG. 25B, the voltages 21 applied to the respective regions are plotted on the X axis. The coma aberration 20 is corrected by applying suitable voltages to the transparent electrode pattern 30. FIG. 25C shows the coma aberration 22 after the correction. As shown in FIG. 25C, by using the liquid crystal optical element 5, corrections are made so as to suppress the coma aberration occurring in the substrate of the recording medium 4.

However, in addition to the problem associated with the tilting of the recording medium 4, there also occurs the problem of the optical axis of the objective lens 3 becoming displaced from the track on the recording medium 4 (optical axis displacement). To address this, as shown in FIG. 26, the objective lens 3 is attached to a tracking actuator 7 by which the optical axis of the objective lens 3 is made to follow the track on the recording medium 4. The actuator 7 has a power supply lead 8. With the actuator 7 moving the objective lens 3 in directions indicated by arrow A in the figure, the light beam focused by the objective lens 3 is corrected so as to accurately follow the track on the recording medium 4 (in FIG. 26, the light beam 11 is corrected as shown by a light beam 12).

However, when the objective lens 3 is moved by the actuator 7, the positional relationship between the liquid crystal optical element 5 and the objective lens 3 changes. On the other hand, the phase-modulating transparent electrode pattern 30 (FIG. 25A) formed in the liquid crystal optical element 5 is designed so as to match the effective diameter 10 of the optical pickup device. That is, the liquid crystal optical element 5 is designed so that the coma aberration occurring in the substrate of the recording medium 4 can be ideally corrected only when the objective lens 3 and the liquid crystal optical element 5 are precisely aligned along the optical axis. Accordingly, with the positional relationship between the liquid crystal optical element 5 and the objective lens 3 deviated from the ideal condition, if a tilt occurs at the surface of the recording medium 4, the coma aberration cannot be sufficiently corrected by the liquid crystal optical element 5.

In view of this, it has been proposed to mount the phase-modulating liquid crystal optical element 5 integrally with the objective lens 3 and move them as a unit by the same actuator 7 as shown in FIG. 26 (refer, for example, to Patent Publication 2).

However, mounting the phase-modulating liquid crystal optical element 5 integrally with the objective lens 3 and moving them as a unit by the same actuator 7 involves the following problems.

First, when the phase-modulating liquid crystal optical element 5 is mounted integrally, the weight acting on the actuator 7 increases. The actuator 7 is required to move the objective lens 3 at an extremely fast speed or within several milliseconds, but the additional weight of the liquid crystal optical element 5 decreases the ability of the actuator 7 to move the objective lens 3 so as to follow the track on the recording medium 4. Secondly, the liquid crystal optical element 5 must be provided with the lead 6 for driving the liquid crystal optical element 5 but, because of the provision of the lead 6, the spring rate changes, which increases the complexity of the control for operating the objective lens 3 and the liquid crystal optical element 5 constructed as a single unit. In particular, there arises a concern that the lead 6 may be entangled, and interfere, with the tracking action of the objective lens 3.

Further, in an optical pickup device used to read or write data on a recording medium such as a DVD or a next generation high density DVD, as shown in FIG. 27A a light beam from a light source 1 is converted by a collimator lens 2 into a substantially parallel beam of light which is focused by an objective lens 3 onto the recording medium 4, and an information signal is generated by receiving the light beam reflected from the recording medium 4. When reading or writing data on the recording medium 4 using such an optical pickup device, the light beam must be accurately focused, by the objective lens 3, onto the track on the recording medium 4.

However, due to such factors as unevenness in the thickness of the light transmissive protective layer (indicated by B in FIG. 27A) formed on the track surface of the recording medium 4, the distance from the objective lens 3 to the track surface may not be constant at all times, or the light spot may not be able to focus identically at all times. Furthermore, in cases where more than one track surface is formed in the recording medium 4 to increase the storage capacity of the recording medium 4, there also arises a need to adjust the positional relationship between the objective lens 3 and each track surface.

In this way, if a variation occurs in the distance between the objective lens 3 and the track surface, spherical aberration occurs in the substrate of the recording medium 4, resulting in a degradation of the information signal generated based on the light beam reflected from the recording medium 4. FIG. 27B shows one example of the spherical aberration 23 when seen at the entrance pupil position of the objective lens 3. On the other hand, in cases where more than one track surface is formed in the recording medium, spherical aberration occurs when reading or writing data on the second track surface which is located at a position different from that of the first track surface located at the focal point of the objective lens 3, and this also causes a degradation of the information signal generated based on the light beam reflected from the recording medium 4.

In view of this, it has been proposed to correct the spherical aberration, occurring in the substrate of the recording medium, by placing a liquid crystal optical element 5 in the path between the collimator lens 2 and the objective lens 3 as shown in FIG. 28 (refer, for example, to Patent Publication 3). That is, utilizing the property that the orientation of liquid crystal molecules changes according to the potential difference applied to the liquid crystal, the liquid crystal optical element 5 works to change the phase of the light beam passing through the liquid crystal and thereby cancel out the spherical aberration.

FIG. 29A shows one example of a transparent electrode pattern 40 for generating a phase distribution in the liquid crystal according to the voltage applied to the spherical aberration correcting liquid crystal optical element 5. In FIG. 29A, nine concentric electrode patterns 41 to 49 are formed within the range of the effective diameter 10. Voltages 24 such as shown in FIG. 29B are applied to the respective regions. When the voltages shown in FIG. 29B are applied to the electrode pattern 40 shown in FIG. 29A, a potential difference occurs with respect to the transparent electrode on the opposite side, and the orientation of the liquid crystal molecules therebetween changes according to the potential difference. As a result, the light beam passing therethrough is acted upon by a force that advances its phase according to the potential difference. Thus, the spherical aberration 23 occurring in the substrate of the recording medium 4 is corrected as shown by a spherical aberration 25 in FIG. 29C. The voltages are applied to the transparent electrode pattern 40 via a lead 6 (see FIG. 28).

However, in addition to the problem of the spherical aberration occurring in the substrate of the recording medium 4 described above, there also occurs the problem of the optical axis of the objective lens 3 becoming displaced from the track on the recording medium 4 (axis displacement). To address this, as shown in FIG. 30, the objective lens 3 is attached to a tracking actuator 7 by which the optical axis of the objective lens 3 is made to follow the track on the recording medium 4. The actuator 7 has a power supply lead 8. With the actuator 7 moving the objective lens 3 in directions indicated by arrow A in the figure, the light beam focused by the objective lens 3 is made to accurately follow the track on the recording medium 4.

However, when the objective lens 3 is moved by the actuator 7, the positional relationship between the liquid crystal optical element 5 and the objective lens 3 changes. On the other hand, the transparent electrode pattern 40 (see FIG. 29A) formed in the liquid crystal optical element 5 is designed so as to match the effective diameter 10 of the optical pickup device. That is, the liquid crystal optical element 5 is designed so that the spherical aberration occurring in the substrate of the recording medium 4 can be ideally corrected only when the objective lens 3 and the liquid crystal optical element 5 are precisely aligned along the optical axis. Accordingly, when the positional relationship between the liquid crystal optical element 5 and the objective lens 3 is deviated from the ideal condition, the spherical aberration cannot be sufficiently corrected by the liquid crystal optical element 5.

Here, if the phase-modulating liquid crystal optical element 5 is mounted integrally with the objective lens 3 so that they can be moved as a unit by the same actuator 7 as shown in FIG. 30, problems similar to those described with reference to FIG. 26 occur; first, when the phase-modulating liquid crystal optical element 5 is mounted integrally, the weight acting on the actuator 7 increases. The actuator 7 is required to move the objective lens 3 at an extremely fast speed or within several milliseconds, but the additional weight of the liquid crystal optical element 5 decreases the ability of the actuator 7 to move the objective lens 3 so as to follow the track on the recording medium 4. Secondly, the liquid crystal optical element 5 needs to be provided with the lead 6 for driving the liquid crystal optical element 5 but, because of the provision of the lead 6, the spring rate changes, which increases the complexity of the control for operating the objective lens 3 and the liquid crystal optical element 5 constructed as a single unit. In particular, there arises a concern that the lead 6 may be entangled, and interfere, with the tracking action of the objective lens 3.

It is also known to provide an optical apparatus, such as shown in FIG. 31, that can play back a high density optical disc 707 having a 0.6-mm thick transparent substrate, such as DVD, as well as an optical disc 708 having a 1.2-mm thick transparent substrate, such as compact disc (CD), by using an optical disc device having a single objective lens 113 (refer, for example, to Patent Publication 4).

In FIG. 31, light source 1 is a light source for a high density optical disc and it emits a light beam with a wavelength of 650 nm. The light beam emitted from the light source 1 is converted by a collimator lens 2 into a substantially parallel beam of light, which is limited by an aperture 57 to a light beam having an effective diameter 110 which is about 5 mm in diameter; the light beam is then passed through a half mirror 56 and enters the objective lens 113. The objective lens 113 is an objective lens with a numerical aperture (NA) of 0.65, for a high density optical disc, and focuses the incident light beam onto the high density optical disc 707 having a 0.6-mm transparent substrate.

On the other hand, a light source 101 is a light source for CD, and emits a light beam with a wavelength of 780 nm. The light beam emitted from the light source 101 is converted by a collimator lens 102 into a substantially parallel beam of light, which is limited by an aperture 58 to a light beam having an effective diameter 120 which is about 4 mm in diameter; the light beam is then redirected by the half mirror 56 and enters the objective lens 113. The objective lens 113 focuses the incident light beam onto the optical disc 708 having a 1.2-mm transparent substrate.

By switching between the two light sources according to the kind of the optical disc to be played back, two kinds of optical discs can be played back using the single objective lens 113.

However, a tilt can occur at the surface of the optical disc 707 (disc tilt), due to warping or curving of the optical disc 707, imperfections in the driving mechanism for the optical disc 707, etc. Because of such disc tilt, wavefront aberration (primarily, coma aberration) occurs in the substrate of the optical disc 707 when reading or writing data on the optical disc 707.

The coma aberration 20 occurring in the substrate of the optical disc 707, when represented by the pupil coordinate of the objective lens 113, is as shown in FIG. 23B. The coma aberration causes a degradation of the light intensity signal created based on the light beam reflected from the optical disc 707. For the optical disc 708 also, disc tilt can occur but, usually, the necessity of correction is low because of low recording density, etc.

Further, the objective lens 113 in such an optical apparatus is configured to focus a light spot on the track surface of the high density optical disc 707 having a 0.6-mm transparent substrate; therefore, if the light spot is to be focused on the track surface of the optical disc 708 such as CD having a 1.2-mm transparent substrate, the light spot cannot be accurately focused on the track even if the effective diameter of the incident light beam is reduced. This therefore results in the generation of spherical aberration in the substrate when playing back the optical disc 708 such as CD having a 1.2-mm transparent substrate.

The spherical aberration 23 occurring in the substrate of the optical disc 708 such as CD having a 1.2-mm transparent substrate, when represented by the pupil coordinate of the objective lens 113, is as shown in FIG. 27B. The spherical aberration causes a degradation of the light intensity signal created based on the light beam reflected from the optical disc 708.

(Patent Publication 1)
Japanese Unexamined Patent Publication No. 2001-143303 (page 3, FIG. 1)
(Patent Publication 2)
Japanese Unexamined Patent Publication No. 2000-215505 (page 2, FIG. 1)
(Patent Publication 3)
Japanese Unexamined Patent Publication No. H10-269611 (pages 3 to 5, FIGS. 1 to 3, FIG. 5)
(Patent Publication 4)
Japanese Unexamined Patent Publication No. 2001-101700 (pages 5 to 6, FIG. 6)

SUMMARY OF THE INVENTION

It is an object of the present invention to provide a liquid crystal optical element, for correcting wavefront aberrations (primarily, coma aberration and spherical aberration), that can be mounted separately from the objective lens, and an optical apparatus using such a liquid crystal optical element.

It is another object of the present invention to provide a liquid crystal optical element that can reliably correct coma aberration regardless of the tracking motion of the objective lens, and an optical apparatus using such a liquid crystal optical element.

It is a further object of the present invention to provide a liquid crystal optical element that can reliably correct spherical aberration regardless of the tracking motion of the objective lens, and an optical apparatus using such a liquid crystal optical element.

It is a further object of the present invention to provide a liquid crystal optical element for correcting wavefront aberrations (primarily, coma aberration and spherical aberration) that can be manufactured at low cost without compromising the tracking performance, and an optical apparatus using such a liquid crystal optical element.

It is a further object of the present invention to provide a liquid crystal optical element for correcting wavefront aberrations (primarily, coma aberration and spherical aberration) that enables reliable reading or writing on different kinds of optical discs by using a single objective lens, and an optical apparatus using such a liquid crystal optical element.

It is a further object of the present invention to provide a liquid crystal optical element for correcting wavefront aberrations (primarily, coma aberration and spherical aberration) that enables reliable reading or writing on different kinds of optical discs by using a single objective lens and without compromising the tracking performance, and an optical apparatus using such a liquid crystal optical element.

To achieve the above objects, a liquid crystal optical element according to the invention includes a first transparent substrate, a second transparent substrate, a liquid crystal sealed between the first and second transparent substrates, and an electrode pattern as a region for advancing or delaying the phase of a light beam and thereby correcting wavefront aberration, wherein the region is formed smaller than the field of view of the objective lens so that the region substantially stays within the field of view of the objective lens regardless of tracking motion of tracking means. As the region for advancing or delaying the phase of the light beam is formed so as to substantially stay within the field of view of the objective lens, the wavefront aberration generated can be satisfactorily corrected regardless of the tracking motion.

To achieve the above object, an optical apparatus according to the present invention includes a light source, an objective lens for focusing a light beam from the light source onto a recording medium, a tracking means for moving the objective lens to correct an axis displacement of the objective lens, and a liquid crystal optical element mounted separately from the objective lens, wherein the liquid crystal optical element includes: a first transparent substrate, a second transparent substrate, a liquid crystal sealed between the first and second transparent substrates; and an electrode pattern as a region for advancing or delaying the phase of the light beam and thereby correcting wavefront aberration, wherein the region is formed smaller than the field of view of the objective lens so that the region substantially stays within the field of view of the objective lens regardless of tracking motion of the tracking means. As the region for advancing or delaying the phase of the light beam is formed so as to substantially stay within the field of view of the objective lens, the wavefront aberration generated can be satisfactorily corrected regardless of the tracking motion.

Preferably, the electrode pattern is designed to correct the wavefront aberration according to the amount of the generated aberration.

Preferably, the electrode pattern is a coma aberration correcting electrode pattern.

Preferably, for correction of coma aberration, the region has a first region for advancing the phase of the light beam and a second region for delaying the phase of the light beam, and further preferably, a third region that does not substantially change the phase of the light beam.

Preferably, the region has only one first region and only one second region for correction of coma aberration.

Preferably, the region has two first regions and two second regions for correction of coma aberration.

Preferably, for correction of coma aberration, the first and second regions together are formed smaller than, and 50 μm to 300 μm inwardly of, the field of view of the objective lens when the tracking means is in a non-operating condition.

Preferably, for correction of coma aberration, the first and second regions together are formed smaller than and inwardly of the field of view of the objective lens so that residual coma aberration of the light beam after the aberration correction is kept within $\lambda/4$, where $\lambda$ is the wavelength of the light beam, when the tracking means is in a non-operating condition.

Preferably, for correction of coma aberration, the first and second regions together are formed smaller than, and inwardly of, the field of view of the objective lens so that residual coma aberration of the light beam after the aberration correction is kept within $\lambda/14$, where $\lambda$ is the wavelength of the light beam, when the tracking means is in a non-operating condition.

Preferably, for correction of coma aberration, the first and second regions together are formed smaller than, and inwardly of, the field of view of the objective lens so that residual coma aberration of the light beam after the aberration correction is kept within 33 m$\lambda$, where $\lambda$ is the wavelength of the light beam, when the tracking means is in a non-operating condition.

Preferably, the electrode pattern is a spherical aberration correcting electrode pattern.

Preferably, the region has a plurality of subregions for advancing or retarding the phase of the light beam for correction of spherical aberration.

Preferably, for correction of spherical aberration, the plurality of subregions are formed smaller than, and 50 μm to 300 μm inwardly of, the field of view of the objective lens when the tracking means is in a non-operating condition.

Preferably, for correction of spherical aberration, the plurality of subregions are formed only in an inside region smaller than an effective diameter of the objective lens so that residual spherical aberration of the light beam after the aberration correction is kept within $\lambda/4$, where $\lambda$ is the wavelength of the light beam, when the tracking means is in a non-operating condition.

Preferably, for correction of spherical aberration, the plurality of subregions are formed smaller than, and inwardly of, the field of view of the objective lens so that residual spherical aberration of the light beam after the aberration correction is kept within $\lambda/14$, where $\lambda$ is the wavelength of the light beam, when the tracking means is in a non-operating condition.

Preferably, for correction of spherical aberration, the plurality of subregions are formed smaller than, and inwardly of, the field of view of the objective lens so that residual spherical aberration of the light beam after the aberration correction is kept within 33 m$\lambda$, where $\lambda$ is the wavelength of the light beam, when the tracking means is in a non-operating condition.

Preferably, the optical apparatus further comprises a voltage applying means for applying a voltage to the spherical aberration correcting electrode pattern according to generated spherical aberration.

Preferably, the recording medium has a plurality of track surfaces, and the optical apparatus further comprises a voltage applying means for activating the spherical aberration correcting electrode pattern according to the plurality of track surfaces.

Preferably, the electrode pattern includes a coma aberration correcting electrode pattern formed on either one of the first and second transparent substrates and a spherical aberration correcting electrode pattern formed on the other one of the first and second transparent substrates.

Preferably, the first and second regions for correction of coma aberration together are formed smaller than, and 80 μm to 500 μm inwardly of, the field of view of the objective lens when the tracking means is in a non-operating condition, and the plurality of subregions for correction of spherical aberration are formed smaller than, and 70 μm to 400 μm inwardly of, the field of view of the objective lens when the tracking means is in a non-operating condition.

Preferably, the optical apparatus further comprises a switching means for switching operation between the coma aberration correcting electrode pattern and the spherical aberration correcting electrode pattern according to the recording medium used.

Preferably, the coma aberration correcting electrode pattern is used for a DVD, and the spherical aberration correcting electrode pattern is used for a CD.

Preferably, the objective lens is an objective lens for the DVD.

BRIEF DESCRIPTION OF THE DRAWINGS

FIG. 6 is a diagram illustrating the operation of the liquid crystal optical element according to the present invention.

FIG. 10 is a diagram showing one example of a cross section of a liquid crystal optical element used in FIG. 9.

FIG. 13 is a schematic plan view showing an optical apparatus according to a third embodiment of the present invention.

FIG. 14B is a diagram showing one example of a voltage applied to the electrode pattern shown in FIG. 14A.

FIG. 17 is a conceptual diagram showing an optical apparatus according to a fourth embodiment of the present invention.

FIG. 19A is a diagram showing one example a coma aberration correcting electrode pattern in the liquid crystal optical element used in FIG. 17, FIG. 19B is a diagram showing one example of a voltage applied to the electrode pattern shown in FIG. 19A, and FIG. 19C is a diagram showing one example of a corrected coma aberration.

FIG. 20A is a diagram showing one example a spherical aberration correcting electrode pattern in the liquid crystal optical element used in FIG. 17, FIG. 20B is a diagram showing one example of a voltage applied to the electrode pattern shown in FIG. 20A, and FIG. 20C is a diagram showing one example of a corrected spherical aberration.

DESCRIPTION OF THE PREFERRED EMBODIMENTS

A liquid crystal optical element for wavefront aberration correction according to the present invention and an optical apparatus using the same will be described with reference to the accompanying drawings. The wavefront aberrations that can occur here are primarily coma aberration and spherical aberration. In the first embodiment given hereinafter, a liquid crystal optical element primarily designed to correct coma aberration and an optical apparatus using the same will be described. In the second embodiment given hereinafter, a liquid crystal optical element primarily designed to correct spherical aberration and an optical apparatus using the same will be described. Further, in the third and fourth embodiments given hereinafter, a liquid crystal optical element primarily designed to correct coma aberration and spherical aberration and an optical apparatus using the same will be described.

Embodiment 1

Figure 1:
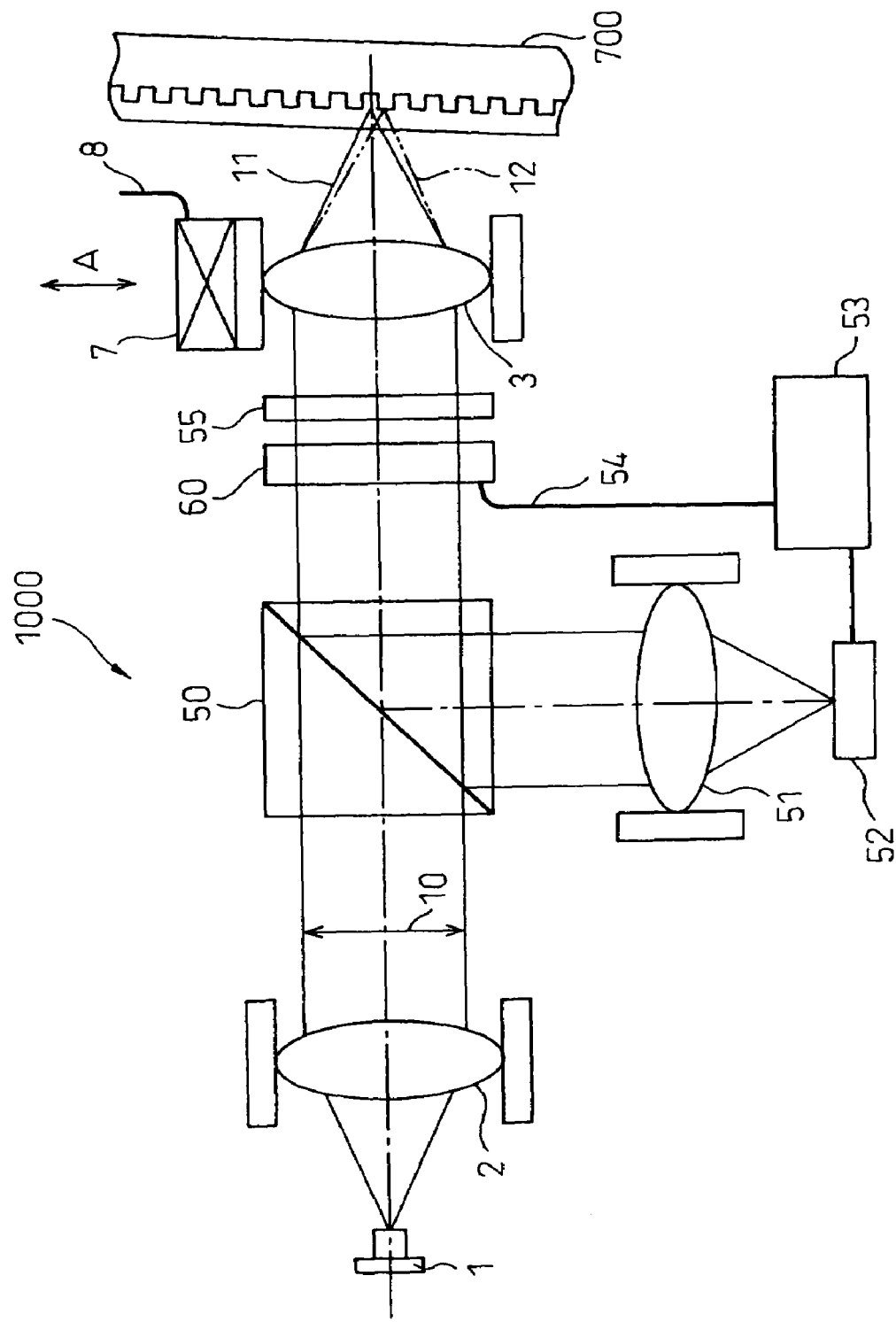
FIG. 1 is a schematic plan view showing an optical apparatus according to a first embodiment of the present invention.

FIG. 1 shows an optical apparatus 1000 using a liquid crystal optical element according to the first embodiment of the present invention. In FIG. 1, a light beam (650 nm) emitted from a light source 1 such as a semiconductor laser device is converted by a collimator lens 2 into a substantially parallel beam of light having an effective diameter 10; the light beam is then passed through a polarization beam splitter 50 and enters the liquid crystal optical element 60. The light beam emerging from the liquid crystal optical element 60 is passed through a quarter wave plate 55 and focused by an objective lens 3 onto a recording medium 700 (such as a DVD). As will be described later, the liquid crystal optical element 60 has the function of applying a correction so as to suppress the coma aberration occurring in the substrate of the recording medium 700.

The wavelength of the light beam is 650 nm in the case of a DVD (the present embodiment) and 780 nm in the case of a CD, and an error of ±20 nm can occur in either case. The wavelength employed for the next generation blue laser is 405 nm, and is used primarily for a DVD. The present invention is particularly effective for a DVD, and offers a particularly great effect in applications where the next generation blue laser is used.

The "effective diameter" here refers to the diameter of the main light beam, in geometrical optics design, that falls on the liquid crystal optical element and that can be effectively utilized in the objective lens 3, assuming that there is no displacement in the position of the light beam or variation in the diameter thereof. Further, the "effective diameter of the liquid crystal optical element" refers to the diameter containing regions for advancing the phase and regions for retarding the phase according to the amount of aberration generated. These definitions apply to all the embodiments described hereinafter.

In the present embodiment, the numerical aperture NA of the objective lens is chosen to be 0.65 and the effective diameter ($\phi$) is 3 mm.

The objective lens 3 is attached to a tracking actuator 7. A moving magnet tracking means may be used instead of the actuator. The actuator 7 operates so that the light beam focused by the objective lens accurately follows the track on the recording medium 700 by moving the objective lens in direction indicated by arrow A in the figure (for example, by correcting the light beam 11 as shown by a light beam 12). The actuator 7 is provided with a lead 8 for driving it. The liquid crystal optical element 60 is provided with a lead 54 for driving the transparent electrode pattern to be described later.

The light beam reflected from the recording medium 700 is once again passed through the objective lens 3, the quarter wave plate 55, and the liquid crystal optical element 60, and is redirected by the polarization beam splitter 50 toward a condenser lens 51 which focuses the light beam on a light detector 52. The light beam, when reflected by the recording medium 700, is amplitude-modulated by the information (pit) recorded on the track of the recording medium 700. The light detector 52 outputs the received light beam in the form of a light intensity signal. Recorded information is recovered from this light intensity signal (RF signal).

A liquid crystal optical element control circuit 53 (hereinafter simply referred to as the "control circuit") detects the coma aberration occurring in the substrate of the recording medium 700, by utilizing the light intensity signal output from the light detector 52. Further, the control circuit 53 applies a voltage to the transparent electrode pattern in the liquid crystal optical element 60 via the lead 54 so as to cancel out the detected coma aberration. With this control, the coma aberration is corrected so that the intensity of the light intensity signal is brought to an appropriate level.

Figure 2:
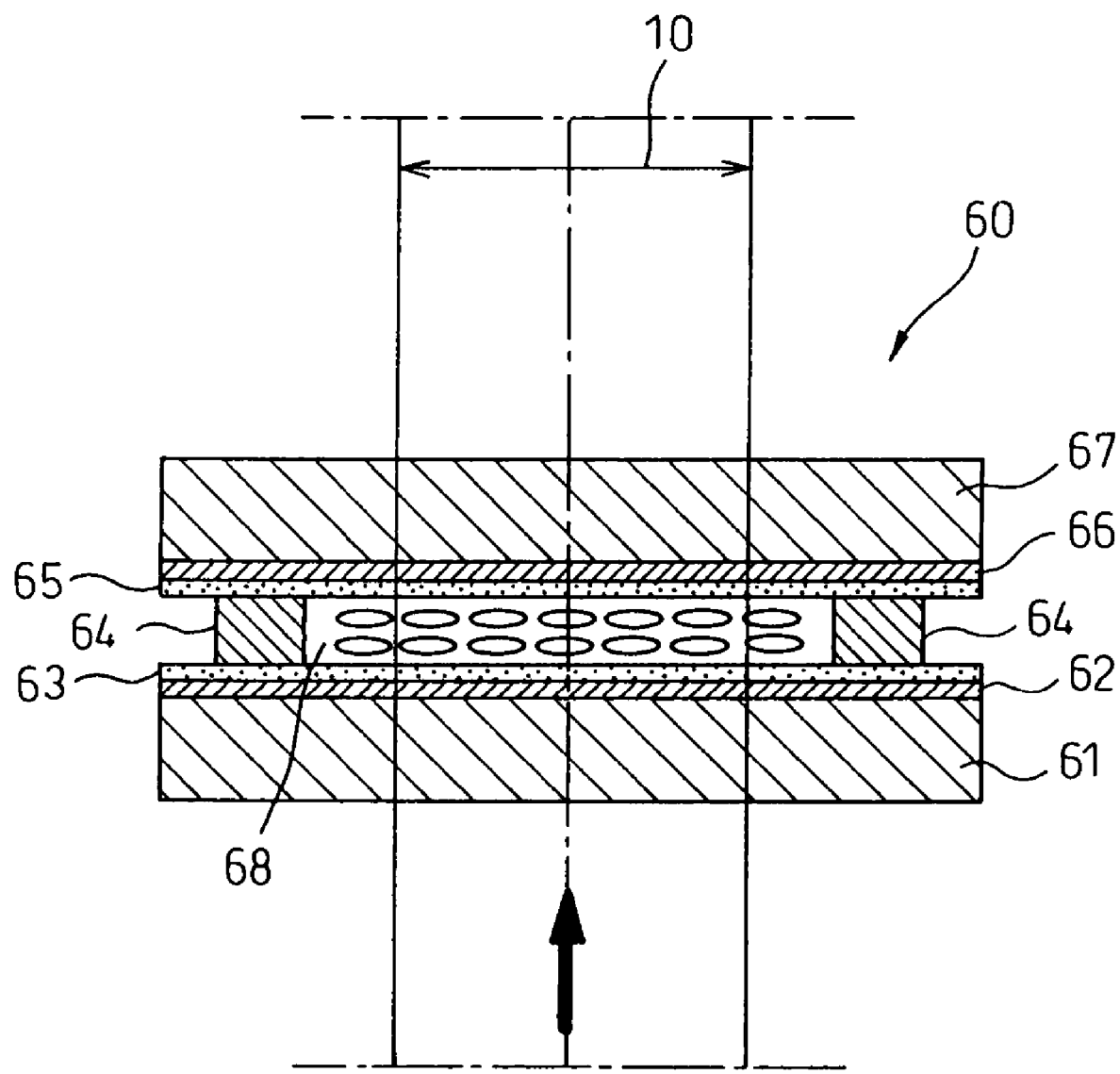
FIG. 2 is a diagram showing one example of a cross section of a liquid crystal optical element used in FIG. 1.

FIG. 2 shows a cross-sectional view of the liquid crystal optical element 60 shown in FIG. 1. The direction shown by arrow in FIG. 2 is the direction in which the light beam emitted from the light source 1 in FIG. 1 enters the liquid crystal optical element 60 after passing through the polarization beam splitter 50. In FIG. 2, a coma aberration correcting transparent electrode 62 and an alignment film 63 are formed on a transparent substrate 61 on the side that faces the light source 1. On the other hand, a transparent counter electrode 66 and an alignment film 65 are formed on a transparent substrate 67 on the side that faces the recording medium 700. A liquid crystal 68 is sealed between the two transparent substrates 61 and 67 and sealed by a sealing member 64. The constituent elements shown in FIG. 2 are exaggerated for convenience of explanation, and the ratio of their thicknesses is different from the actual ratio.

Figures 3A, 3B, 3C:
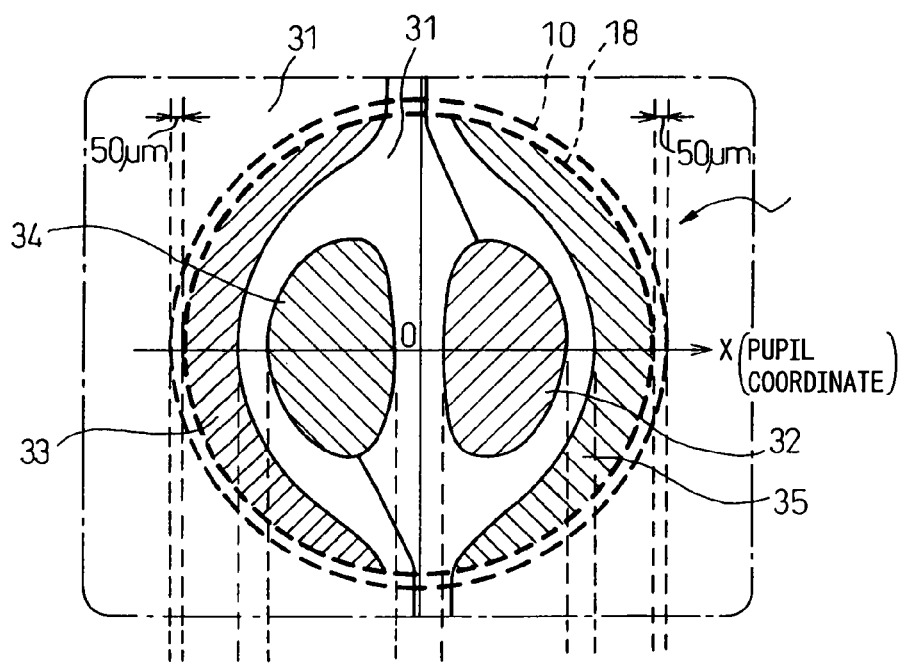
FIG. 3A is a diagram showing one example a coma aberration correcting electrode pattern in the liquid crystal optical element used in FIG. 1.
FIG. 3B is a diagram showing one example of a voltage applied to the electrode pattern shown in FIG. 3A.
FIG. 3C is a diagram showing one example of a corrected coma aberration.

FIG. 3A shows the coma aberration correcting transparent electrode pattern 300 formed in the transparent electrode 62 of the liquid crystal optical element 60 shown in FIGS. 1 and 2. As shown in FIG. 3A, two regions 32 and 33 for advancing the phase and two regions 34 and 35 for delaying the phase are arranged in an inside region 18 which is defined 50 μm inward of the effective diameter 10 of the light beam incident on the liquid crystal optical element 60. In the figure, reference numeral 31 indicates a region to which a reference potential is applied.

Here, the inside region refers to the region which is defined a prescribed distance inward of the effective diameter 10, and in which the wavefront aberration correcting electrode pattern is formed, and this region corresponds to the previously defined effective diameter of the liquid crystal optical element 60.

When a positive (+) voltage with respect to the reference voltage applied to the region 31 is applied to the regions 32 and 33, a potential difference occurs with respect to the transparent counter electrode 66, and the orientation of the liquid crystal molecules therebetween changes according to the potential difference. As a result, the light beam passing therethrough is acted upon by a force that advances its phase. On the other hand, when a negative (−) voltage with respect to the reference voltage applied to the region 31 is applied to the regions 34 and 35, a potential difference occurs with respect to the transparent counter electrode 66, and the orientation of the liquid crystal molecules therebetween changes according to the potential difference. As a result, the light beam passing therethrough is acted upon by a force that delays its phase. The reference potential (here, 0 V as an example) is applied to the region 31. These voltages are applied to the coma aberration correcting electrode pattern 300 of the transparent electrode 62 via the lead 54 (see FIG. 1) from the control circuit 53.

In FIG. 3B, the voltages 23 applied to the respective regions are plotted on the X axis. When such voltages are applied to the respective regions 31 to 35 in the transparent electrode pattern 300 formed in the inside region 18, the liquid crystal optical element 60 works to cancel out the coma aberration 20 occurring when the recording medium 700 is tilted relative to the optical axis.

FIG. 3C shows the coma aberration 24 after the correction. That is, the coma aberration 20 in FIG. 3B is corrected as shown by the coma aberration 24 in FIG. 3C. It is thus understood that the correction is made, by the liquid crystal optical element 60, so as to suppress the coma aberration occurring in the substrate of the recording medium 700.

Here, when the center of the effective diameter 10 coincides with the center of the transparent electrode pattern 300 in the inside region 18 (that is, when there is no axis displacement), it is preferable that the coma aberration after the correction (residual coma aberration) be not greater than one quarter of the wavelength of the light source 1, according to Rayleigh's quarter wavelength rule. When this condition is satisfied, light loss due to the coma aberration occurring in the substrate can usually be considered tolerable, according to Rayleigh's argument.

Also, when the center of the effective diameter 10 coincides with the center of the transparent electrode pattern 300 in the inside region 18 (that is, when there is no axis displacement), it is preferable that the coma aberration after the correction (residual coma aberration) be not greater than $1/14$ of the wavelength of the light source 1, according to Marechal's criterion. Marechal argued that the condition in which the standard deviation of the displacement between the wavefront and the reference sphere having its center at diffraction focus is $\lambda/14$ or less is equivalent to the condition that the aberration in a particular system is sufficiently small. When this condition is satisfied, the coma aberration occurring in the substrate can be considered sufficiently small, according to Marechal's argument.

Further, when the center of the effective diameter 10 coincides with the center of the transparent electrode pattern 300 in the inside region 18 (that is, when there is no axis displacement), it is preferable that the coma aberration after the correction (residual coma aberration) be not greater than 33 m$\lambda$rms (root mean square), when the recording medium is a DVD. This is because it is considered necessary to clear the evaluation criterion (33 m$\lambda$) in the DVD evaluator.

If the inside region is made smaller, the inside region will stay within the field of view of the objective lens as defined on the liquid crystal optical element (hereinafter simply referred to as the "field of view of the objective lens") even when a large axis displacement is caused by the actuator 7; this makes it possible to correct the coma aberration despite the axis displacement. However, if the inside region is made too small, the residual coma aberration will increase excessively. The above three examples set the limits on the condition.

Figure 4A:
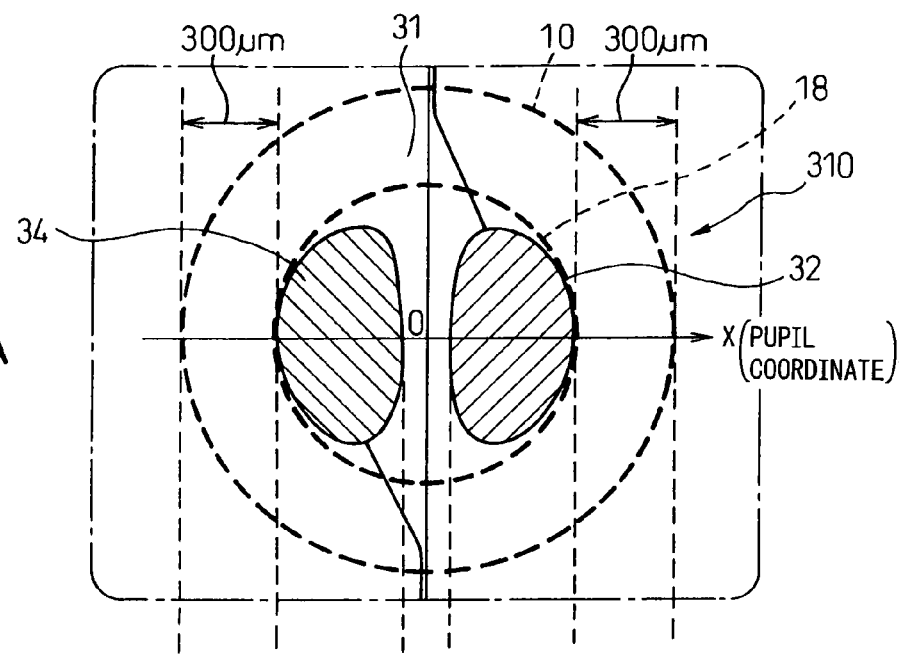
FIG. 4A is a diagram showing another example of a coma aberration correcting electrode pattern in the liquid crystal optical element used in FIG. 1.

FIG. 4A shows another coma aberration correcting transparent electrode pattern 310 according to the present invention. In FIG. 4A, a single region 32 for advancing the phase and a single region 34 for retarding the phase are formed within an inside region 18 which is defined 300 μm inward of the effective diameter 10 of the light beam incident on the liquid crystal optical element 60. In the figure, reference numeral 31 indicates a region to which a reference potential is applied.

When a positive (+) voltage is applied to the region 32, a potential difference occurs with respect to the transparent counter electrode 66, and the orientation of the liquid crystal molecules therebetween changes according to the potential difference. As a result, the light beam passing therethrough is acted upon by a force that advances its phase. On the other hand, when a negative (−) voltage is applied to the region 34, a potential difference occurs with respect to the transparent counter electrode 66, and the orientation of the liquid crystal molecules therebetween changes according to the potential difference. As a result, the light beam passing therethrough is acted upon by a force that delays its phase. The reference potential (here, 0 V as an example) is applied to the region 31. These voltages are applied to the transparent electrode pattern 310 via the lead 54 (see FIG. 1) from the control circuit 53.

Figure 4B:
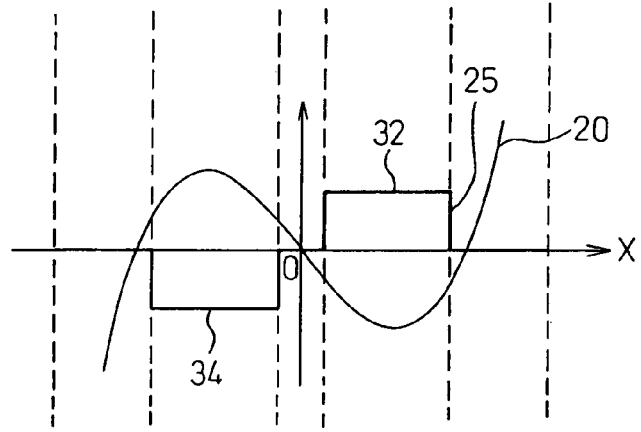
FIG. 4B is a diagram showing one example of a voltage applied to the electrode pattern shown in FIG. 4A.

In FIG. 4B, the voltages 25 applied to the respective regions are plotted on the X axis. When such voltages are applied to the respective regions 31, 32, and 34 in the transparent electrode pattern 310, the liquid crystal optical element 60 works to cancel out the coma aberration 20 occurring when the recording medium 700 is tilted relative to the optical axis.

Figure 4C:
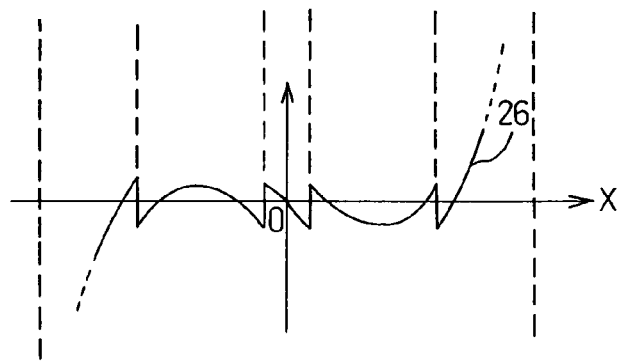
FIG. 4C is a diagram showing one example of a corrected coma aberration.

FIG. 4C shows the coma aberration 26 after the correction. That is, the coma aberration 20 in FIG. 4B is corrected as shown by the coma aberration 26 in FIG. 4C. It is thus understood that the correction is made by the liquid crystal optical element 60 so as to suppress the coma aberration occurring in the substrate of the recording medium 700.

Figure 25A:
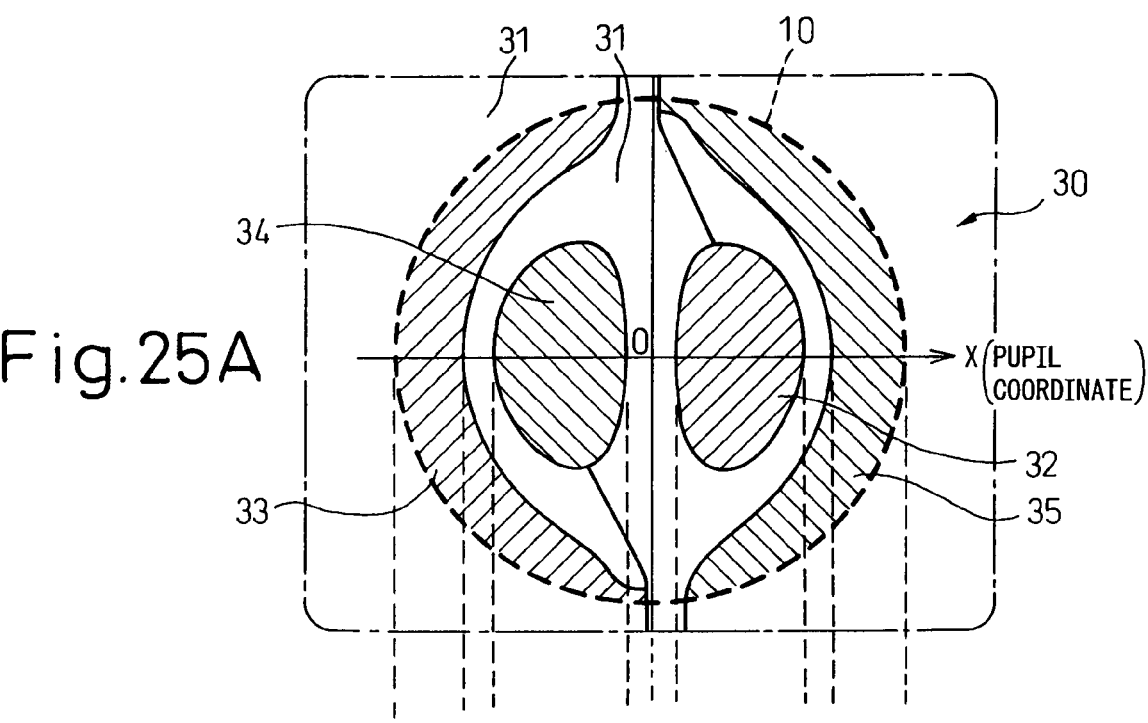
FIG. 25A is a diagram showing one example a coma aberration correcting electrode pattern in the liquid crystal optical element.

Here, a difference will be described between the case where the phase-advancing and phase-delaying regions are formed over the entire region inside the effective diameter 10, as shown in FIG. 25A, and the case where the phase-advancing and phase-delaying regions are formed only in the inside region 18 defined inside the effective diameter 10, as shown in FIG. 3A or 4A.

Figure 5A:
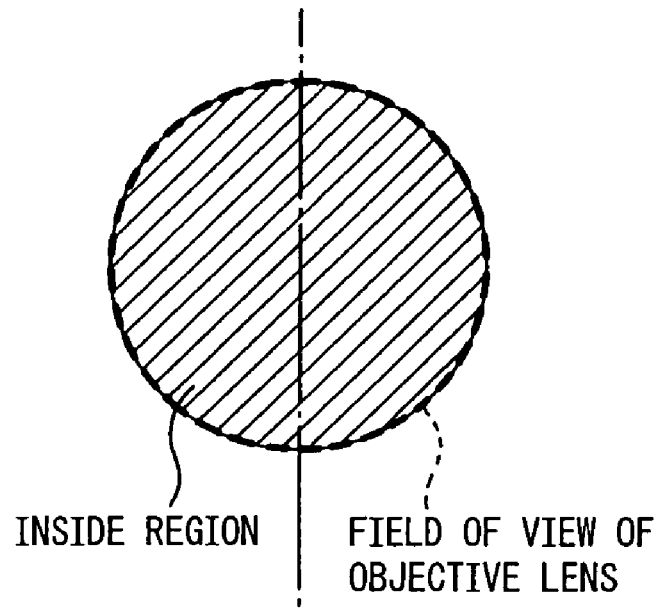
FIG. 5 is a diagram illustrating the operation of a prior art liquid crystal optical element for wavefront aberration correction.
Figure 5B:
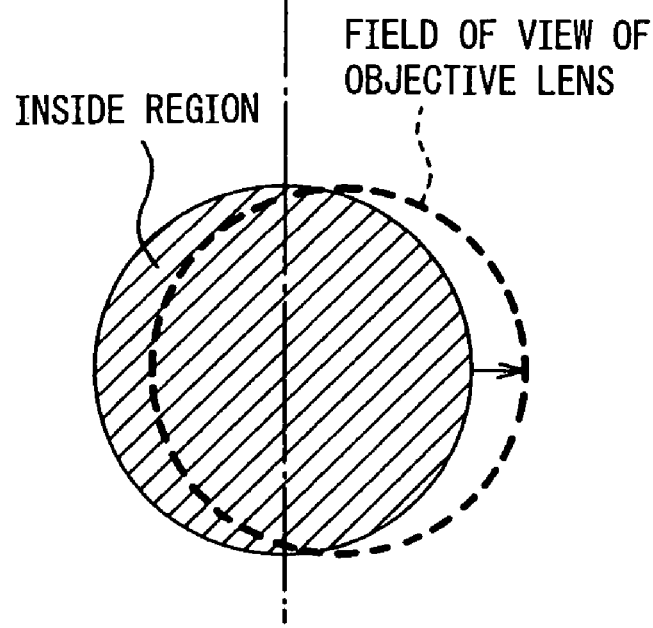

The coma aberration correction shown in FIG. 25A is equivalent to the case where the light beam is captured over the entire region of the effective diameter 10 and the captured light beam is corrected with the effective diameter of the liquid crystal optical element, as shown in FIG. 5A. In this case, however, when the objective lens 3 is moved by the actuator 7, the effective diameter of the liquid crystal optical element becomes displaced from the field of view of the objective lens (see FIG. 5B), and an effective coma aberration correction cannot be accomplished.

By contrast, the coma aberration correction shown in FIG. 3A is equivalent to the case where the light beam falling only on the inside region defined 50 μm inward of the effective diameter 10 is captured and the captured light beam is corrected with the region 18 corresponding to the effective diameter of the liquid crystal optical element, as shown in FIG. 6A. In this case, when the objective lens 3 is moved by the actuator 7, the center of the field of view of the objective lens becomes displaced from the center of the inside region 18, but the inside region 18 still stays within the field of view of the objective lens (see FIG. 6B). Accordingly, satisfactory coma aberration correction can be accomplished, though the degree of correction somewhat drops compared with the case where the inside region 18 is aligned with the center of the optical axis (see FIG. 6A).

As shown, as the phase-advancing and phase-retarding regions are formed only in the inside region 18 defined inside the effective diameter 10, rather than forming such regions over the entire region of the effective diameter 10, an effective coma aberration correction can be accomplished even when the objective lens 3 is moved by the actuator 7 for tracking.

That is, as the phase-advancing and phase-delaying regions are set so as to substantially stay within the field of view of the objective lens despite the movement of the lens by the actuator 7, an effective coma aberration correction can be accomplished. The wording "substantially stay" means that the regions are set so that the coma aberration correction can be accomplished within a predetermined accuracy.

Table 1 below shows the relationship between the inside region in which the coma aberration correcting electrode pattern is formed and the amount of movement of the objective lens for tracking (=the amount of axis displacement) in relation to the degradation (chiefly, signal jitter) of the RF signal generated based on the reflected light beam.

The degradation of the RF signal is evaluated on a scale of A to D: A indicates the best condition, B a good condition, C a condition in which the RF signal is usable, and D a condition in which the RF signal is not usable. To construct Table 1 shown below, liquid crystal optical elements were fabricated that contained phase-advancing and phase-retarding regions only in an inside region defined 0 μm, 50 μm, 100 μm, 150 μm, 200 μm, 250 μm, 300 μm, or 350 μm, respectively, inward of the effective diameter, and the jitter amount of the RF signal was measured by displacing each liquid crystal optical element from the optical axis of the objective lens by 0 μm, 50 μm, 100 μm, 150 μm, and 200 μm, respectively. The same optical apparatus construction as that shown in FIG. 1 was employed, and the effective diameter (φ) was selected as 3 mm and the numerical aperture (NA) of the objective lens as 0.65.

TABLE 1

|  |  | Amount of Axis Displacement (μm) | | | | |
| --- | --- | --- | --- | --- | --- | --- |
|  |  | 0 | 50 | 100 | 150 | 200 |
| Inside Region | 0 | A | C | D | D | D |
| (μm) | 50 | A | B | C | D | D |
|  | 100 | B | B | B | C | D |
|  | 150 | B | B | B | B | C |
|  | 200 | B | B | B | B | B |
|  | 250 | B | B | B | B | B |
|  | 300 | B | B | B | C | C |
|  | 350 | C | D | D | D | D |

As can be seen from Table 1, even when an axis displacement of 0 μm to 200 μm occurs, a substantially satisfactory coma aberration correction can be accomplished with any liquid crystal optical element in which the phase-advancing and phase-delaying regions are formed only in the inside region defined 50 μm to 300 μm inward of the effective diameter. As satisfactory coma aberration correction can be accomplished, the jitter amount of the RF signal is suppressed, and the optical apparatus is thus made usable. Here, the example in which the phase-advancing and phase-delaying regions are formed only in the inside region defined 50 μm inward of the effective diameter corresponds to the example shown in FIG. 3A, while the example in which the phase-advancing and phase-delaying regions are formed only in the inside region defined 300 μm inward of the effective diameter corresponds to the example shown in FIG. 4A.

On the other hand, in the case of the liquid crystal optical element (i.e., the prior art liquid crystal optical element shown in FIG. 25A) in which the phase-advancing and phase-delaying regions are formed only in the inside region defined 0 μm inward of the effective diameter (i.e., over the entire region of the effective diameter 10), if an axis displacement of 100 μm or larger occurs, proper aberration correction cannot be accomplished. That is, the jitter amount of the RF signal increases, rendering the optical apparatus unusable.

Likewise, in the case of the liquid crystal optical element in which the phase-advancing and phase-delaying regions are formed only in the inside region defined 350 μm inward of the effective diameter, if an axis displacement of 50 μm or larger occurs, proper aberration correction cannot be accomplished. That is, the jitter amount of the RF signal increases, rendering the optical apparatus unusable. This is presumably because the phase-advancing and phase-delaying regions are too small to accomplish proper coma aberration correction.

In this way, by using the liquid crystal optical element in which the phase-advancing and phase-delaying regions are formed only in the inside region defined 50 μm to 300 μm inward of the effective diameter, satisfactory coma aberration correction can be accomplished even when an axis displacement occurs due to the tracking motion of the objective lens.

Here, the inside region in which the phase-advancing and phase-delaying regions are to be formed may be set so as to match the specification of the optical apparatus. For example, if it is known in advance that the axis displacement due to tracking is 100 μm, the inside region should be set 50 μm to 100 μm inward of the effective diameter. If the axis displacement due to tracking is larger, the inside region should be set larger in accordance with the specification.

Figure 7A:
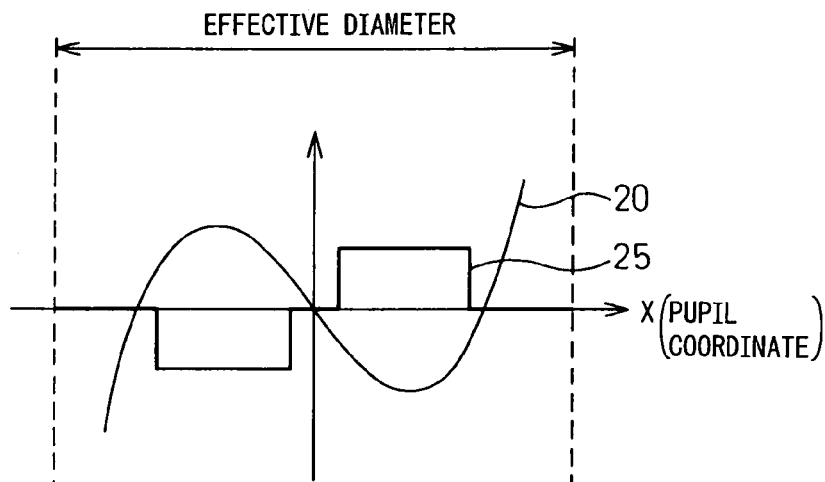
FIG. 7 is a diagram for explaining a specific example of how coma aberration is corrected when an axis displacement has occurred in the liquid crystal optical element according to the present invention.
Figure 7B:
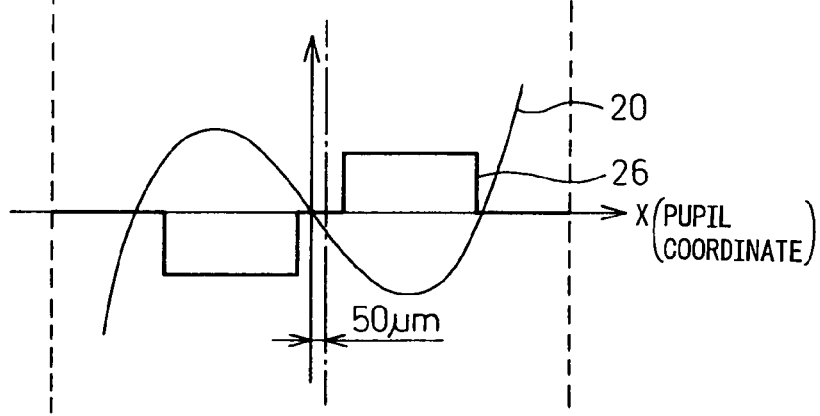
Figure 7C:
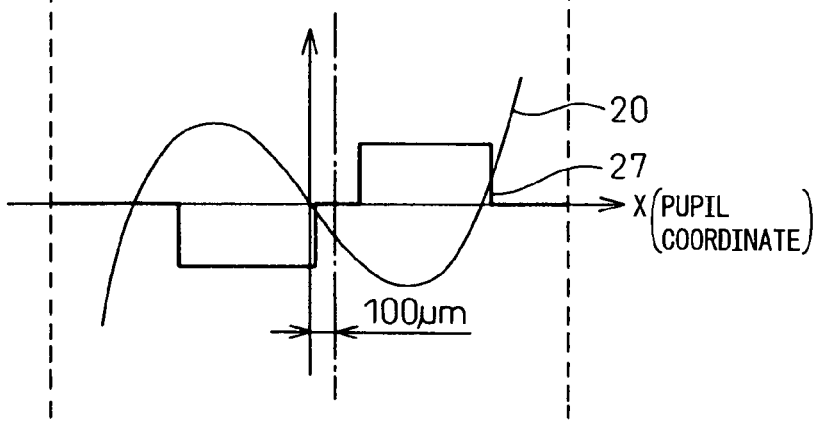
Figure 8A:
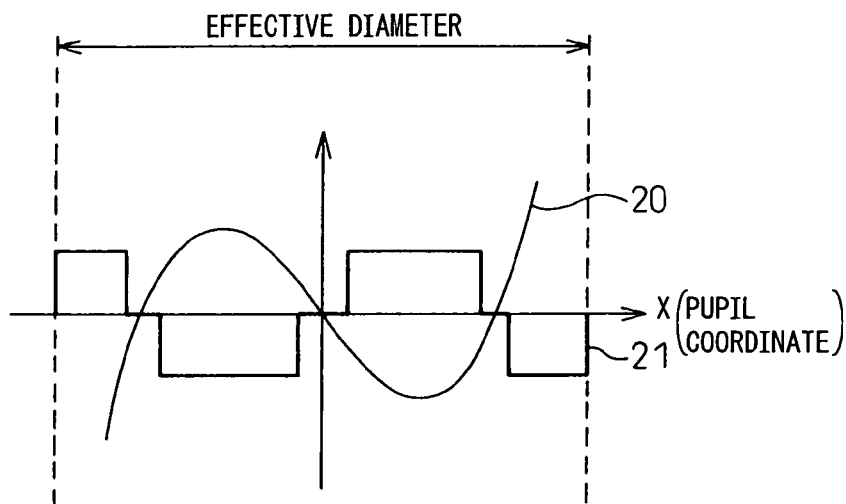
FIG. 8 is a diagram for explaining a situation when an axis displacement has occurred in the prior art liquid crystal optical element.
Figure 8B:
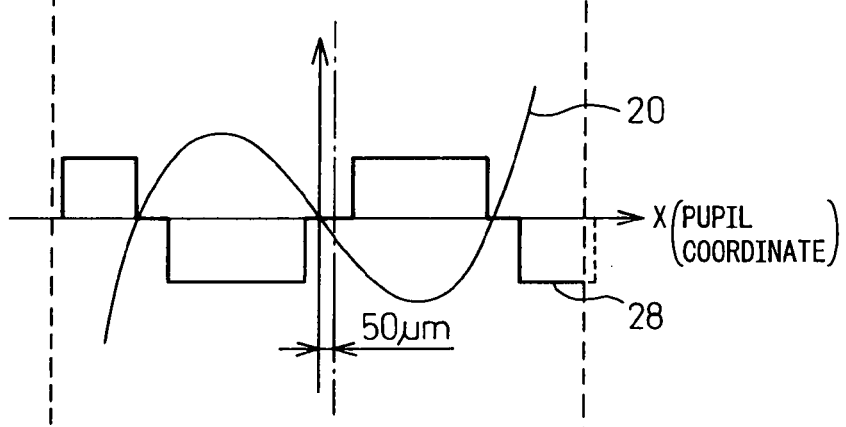
Figure 8C:
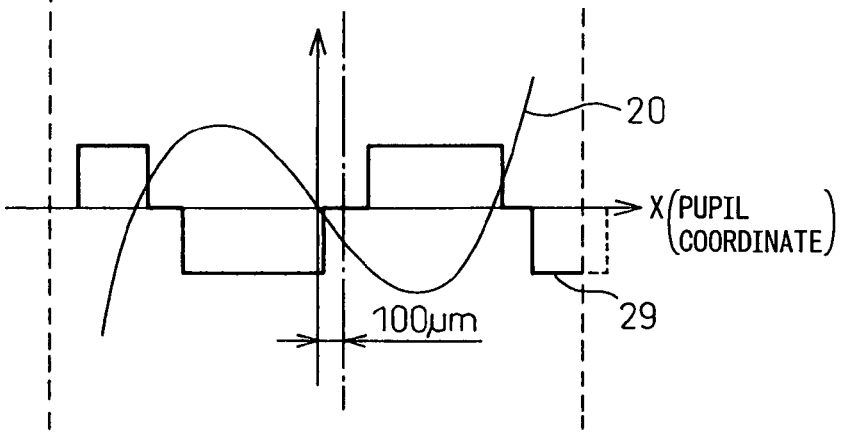
Figure 25B:
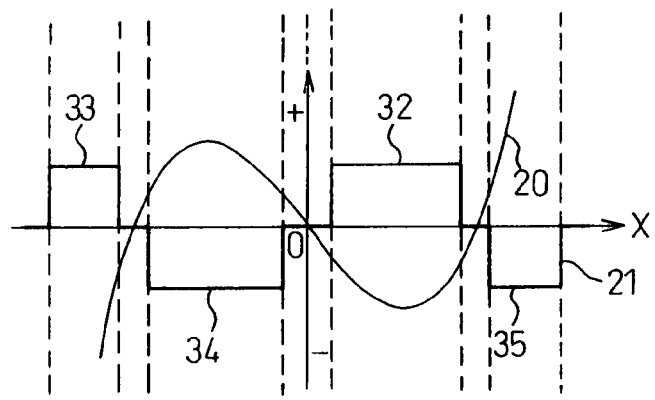
FIG. 25B is a diagram showing one example of a voltage applied to the electrode pattern shown in FIG. 25A.
Figure 25C:
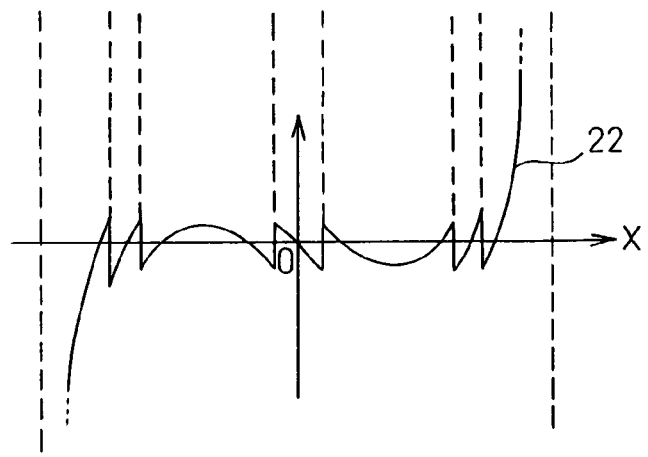
FIG. 25C is a diagram showing one example of a corrected coma aberration.
Figure 26:
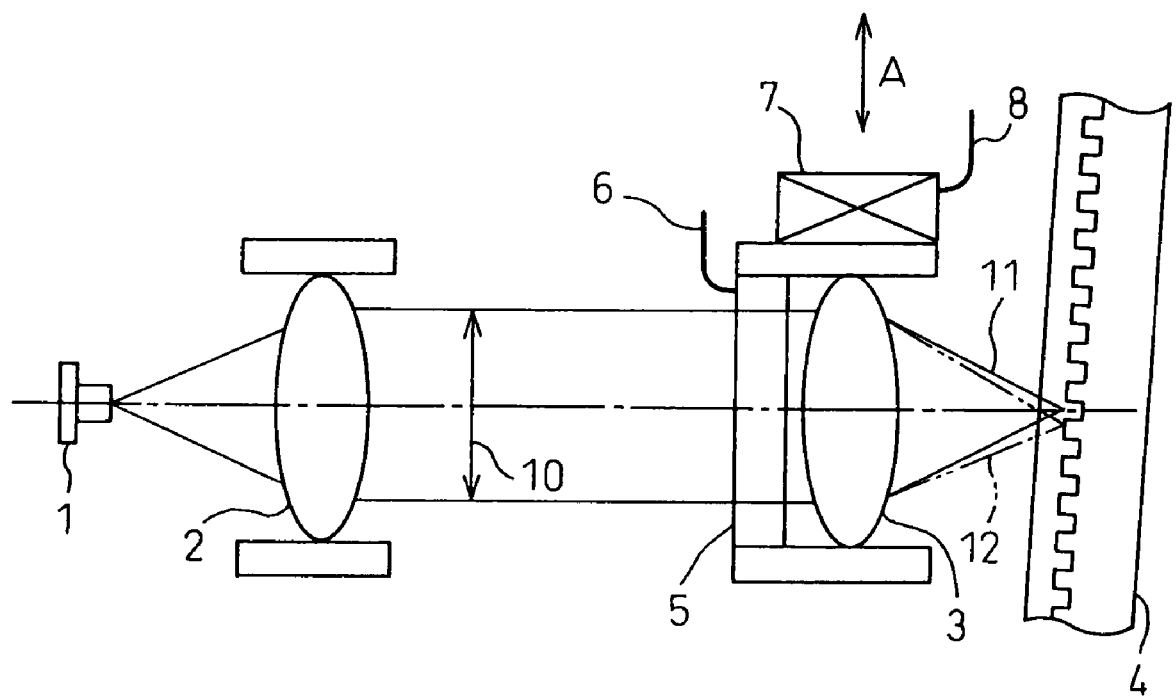
FIG. 26 is a diagram showing another example of an optical apparatus having a prior art liquid crystal optical element for coma aberration correction.
Figure 27:
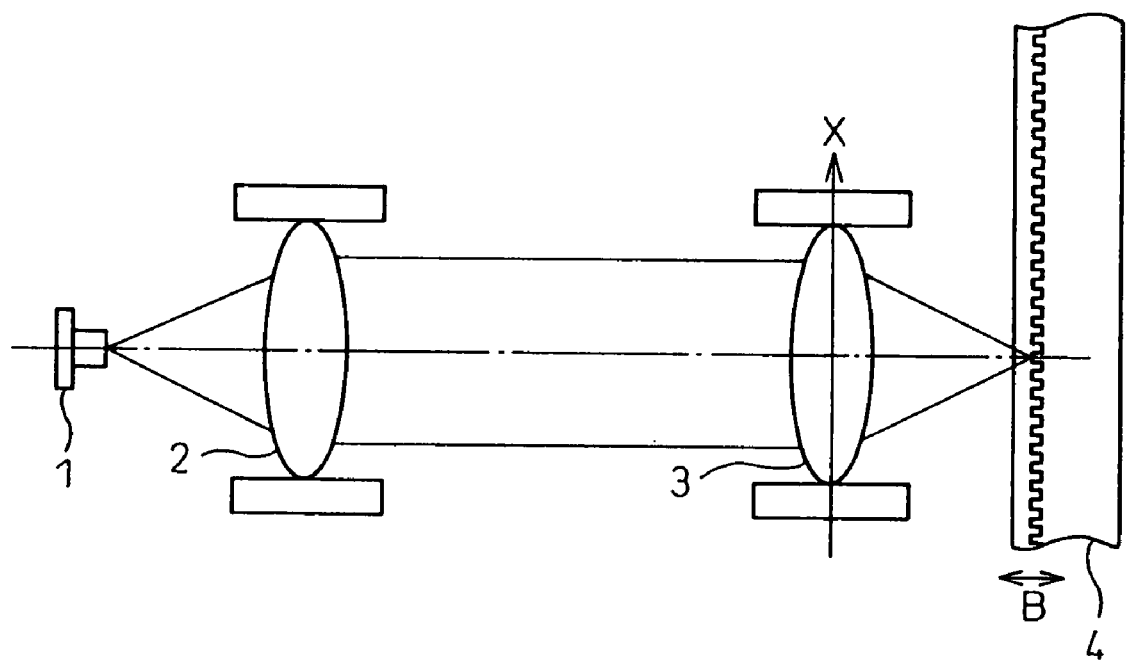
FIG. 27A is a diagram for explaining spherical aberration generated by a recording medium.
FIG. 27B is a diagram showing one example of the generated spherical aberration.
Figure 27:
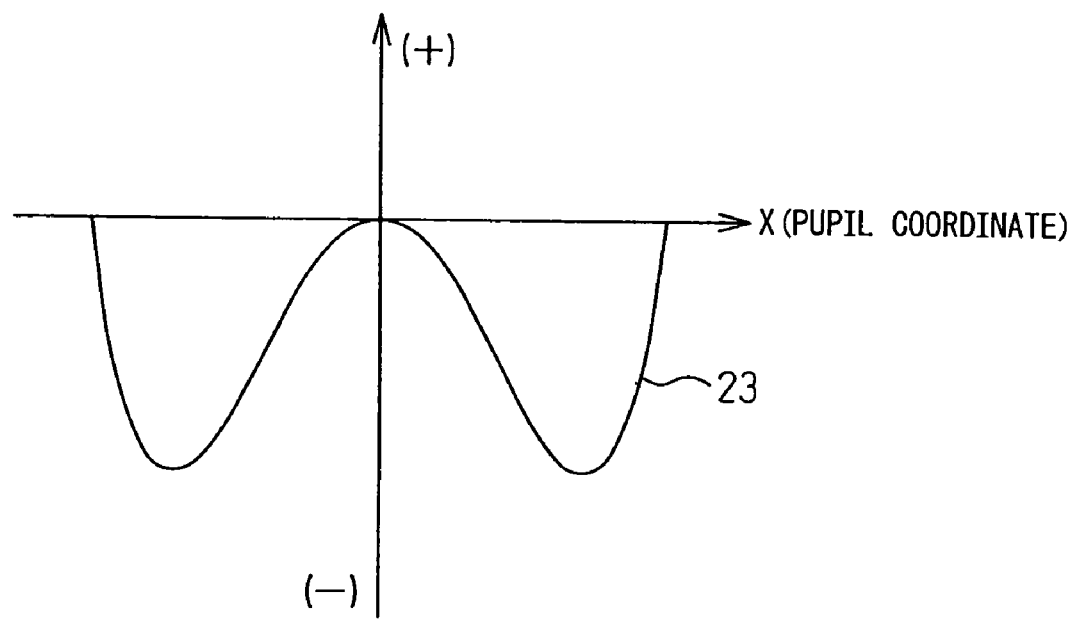
Figure 28:
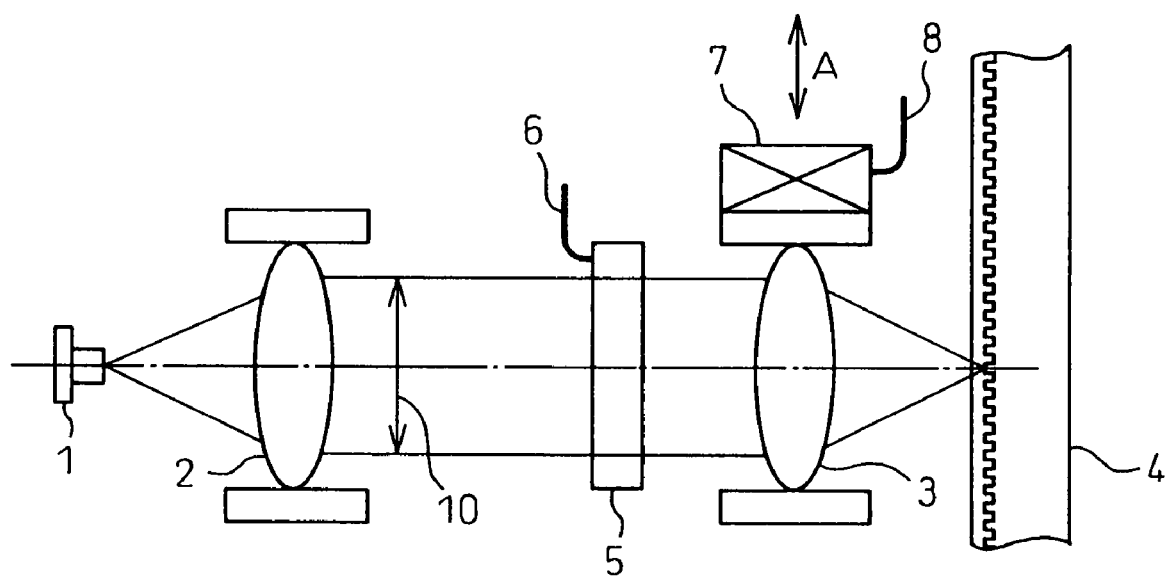
FIG. 28 is a diagram showing one example of an optical apparatus having a prior art liquid crystal optical element for spherical aberration correction.

Referring to FIGS. 7 and 8, a further description will be given of the coma aberration correction when an axis displacement occurs. FIG. 7 shows the case where the transparent electrode pattern 310 shown in FIG. 4A is used, while FIG. 8 shows the case where the prior art transparent electrode pattern 30 shown in FIG. 25A is used. FIGS. 7A and 8A show the condition when there is no axis displacement (same as FIGS. 4B and 25B), FIGS. 7B and 8B show the condition in the presence of an axis displacement of 50 μm, and FIGS. 7C and 8C show the condition in the presence of an axis displacement of 100 μm.

As shown in FIGS. 7B and 7C, even when an axis displacement of 50 μm or 100 μm occurs relative to the center of the effective diameter 10 of the light beam and the center of the inside region 18, the voltage waveforms 26 and 27 applied to the phase-advancing and phase-delaying regions formed in the inside region 18 of the liquid crystal optical element are located within the field of view of the objective lens. That is, there is no substantial difference from the condition of FIG. 7A where there is no axis displacement. Accordingly, the aberration can be properly corrected. That is, as the phase-advancing and phase-delaying regions (the effective region of the liquid crystal optical element) are set so as to substantially stay within the field of view of the objective lens despite the movement of the lens by the actuator 7, effective coma aberration correction can be accomplished.

On the other hand, in FIG. 8B, the phase-advancing and phase-delaying regions are formed over the entire region inside the effective diameter of the liquid crystal optical element. As a result, even when an axis displacement of 50 μm occurs, the applied voltage waveform 28 changes only slightly (a dropout occurs as indicated by a dashed line, compared to the case of FIG. 8A where there is no axis displacement). As it is considered that the aberration is corrected in accordance with the entire voltage waveform applied to the phase-advancing and phase-retarding regions, even a slight change in this waveform can more or less affect the aberration correction function. Accordingly, as shown in the table, in the case of the inside region of 0 μm, when the axis displacement is 0 μm the degradation of the RF signal is evaluated as "A", but when the axis displacement is 50 μm, the RF signal degrades to "C" because the voltage waveform (sign) changes slightly (a dropout occurs as indicated by a dashed line).

Further, as shown in FIG. 8C, when an axis displacement of 100 μm occurs, the voltage waveform 29 applied to the phase-advancing and phase-delaying regions changes significantly compared with the case of FIG. 8A. This greatly affects the aberration correction function. Accordingly, as shown in the table, in the case of the inside region of 0 μm, when the axis displacement is 100 μm, the RF signal degrades to "D", compared with the case of the axis displacement of 0 μm where the degradation of the RF signal is evaluated as "A".

In this way, in the liquid crystal optical element of the present embodiment and the optical apparatus using the same, even when the objective lens is moved for tracking, the coma aberration occurring in the substrate of the recording medium can be satisfactorily corrected, because the regions contributing to the coma aberration correction are set so as to substantially stay within the field of view of the objective lens.

Further, in the liquid crystal optical element of the present embodiment and the optical apparatus using the same, as the liquid crystal optical element for coma aberration correction need not be combined with the objective lens in a single unit, good coma aberration correction and good tracking can be accomplished with a simple construction and without overloading the actuator.

Embodiment 2

Figure 9:
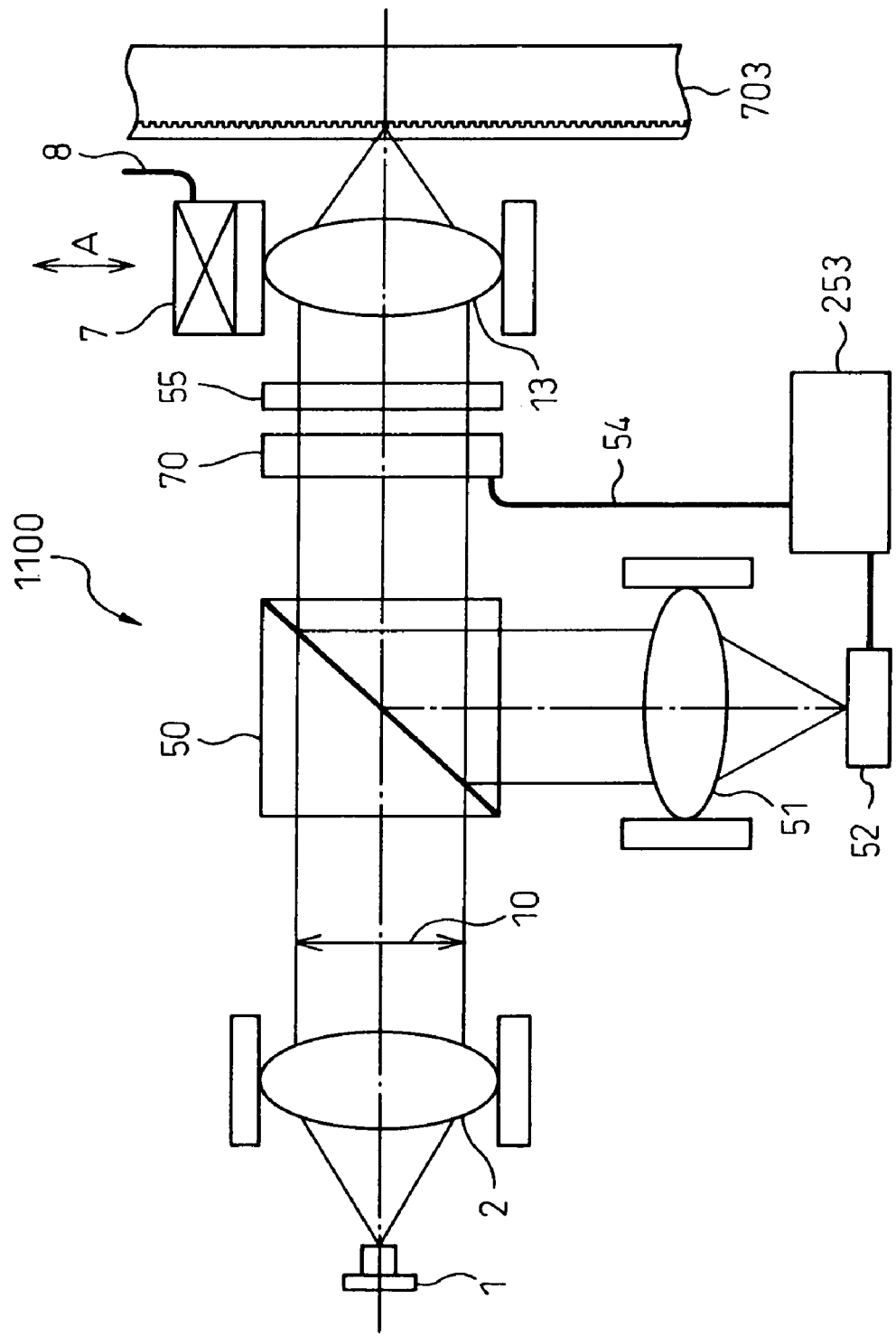
FIG. 9 is a schematic plan view showing an optical apparatus according to a second embodiment of the present invention.

FIG. 9 shows an optical apparatus 1100 using a liquid crystal optical element according to the second embodiment of the present invention. The same components as those shown in FIG. 1 are designated by the same reference numerals.

In FIG. 9, the light beam (405 nm) emitted from the light source 1 is converted by the collimator lens 2 into a substantially parallel beam of light having an effective diameter 10; the light beam is then passed through the polarization beam splitter 50 and enters the liquid crystal optical element 70. The light beam emerging from the liquid crystal optical element 70 is passed through the quarter wave plate 55 and focused by an objective lens 13 (numerical aperture NA=0.85) onto a recording medium 703. In the present embodiment, the effective diameter 10 ($\phi$) is chosen as 3 mm.

The light beam reflected from the recording medium 703 is once again passed through the objective lens 13, the quarter wave plate 55, and the liquid crystal optical element 70, and is redirected by the polarization beam splitter 50 toward the condenser lens 51 which focuses the light beam on the light detector 52. The light beam, when reflected by the recording medium 703, is amplitude-modulated by the information (pit) recorded on the track of the recording medium 703. The light detector 52 outputs the received light beam in the form of a light intensity signal. Recorded information is recovered from this light intensity signal (RF signal).

When writing to the recording medium 703, the intensity of the light beam to be emitted from the light source 1 is modulated with a write data signal, and the recording medium is illuminated by the modulated light beam. Data is written to the recording medium by causing the refractive index or color of the thin film sealed between disks to change, or causing the formation of a pit depression, in accordance with the intensity of the light beam. The intensity modulation of the light beam can be accomplished, for example, by modulating the electric current supplied to the semiconductor laser device used as the light source 1.

The objective lens 13 is attached to the tracking actuator 7. The actuator 7 moves the objective lens 13 in directions indicated by arrow A in the figure so that the light beam focused by the objective lens 3 accurately follows the track on the recording medium 703. The actuator 7 is provided with a lead 8 for driving it. The liquid crystal optical element 70 is provided with a lead 54 for driving the transparent electrode pattern to be described later.

The liquid crystal optical element 70 has a spherical aberration correcting transparent electrode pattern 410 or 420, such as those shown in FIG. 11A or 12A, as will be described later.

The recording medium 703 is the next generation high density DVD, which is a disc with a diameter of 12 cm and a thickness of 1.2 mm. A light transmissive protective layer formed from a polycarbonate or like material about 0.1 mm in thickness is formed over the track surface. The track pitch (0.32 μm) is about one-half that of the conventional DVD, and a maximum capacity of about 27 GB per side is achieved by using a 405-nm blue laser and an objective lens with a numerical aperture (NA)=0.85 and reducing the focused spot size to about one-fifth that of the conventional DVD.

In this recording medium 703, compared with the conventional DVD, spherical aberration caused by unevenness in the thickness of the light transmissive protective layer formed on the track surface can lead to a degradation of the light intensity signal that the light detector 52 outputs. To address this, a control circuit 253 detects the spherical aberration based on the light intensity signal output from the light detector 52, and applies a voltage to the spherical aberration correcting electrode pattern via the lead 54 so as to cancel out the detected spherical aberration. Here, the spherical aberration occurring in the substrate of the recording medium 703 can be canceled out by applying a voltage to the spherical aberration correcting electrode pattern so as to maximize the amplitude of the light intensity signal (RF signal) output from the light detector 52.

FIG. 10 shows a cross-sectional view of the liquid crystal optical element 70 shown in FIG. 9. The direction shown by arrow in FIG. 10 is the direction in which the light beam emitted from the light source 1 in FIG. 9 enters the liquid crystal optical element 70 after passing through the polarization beam splitter 50. In FIG. 10, a spherical aberration correcting transparent electrode 72 and an alignment film 73 are formed on a transparent substrate 71 on the side that faces the light source 1. On the other hand, a transparent counter electrode 76 and an alignment film 75 are formed on a transparent substrate 77 on the side that faces the recording medium 703. A liquid crystal 78 is sealed between the two transparent substrates 71 and 77 and sealed by a sealing member 74. The constituent elements shown in FIG. 10 are exaggerated for convenience of explanation, and the ratio of their thicknesses is different from the actual ratio.

Figure 11A:
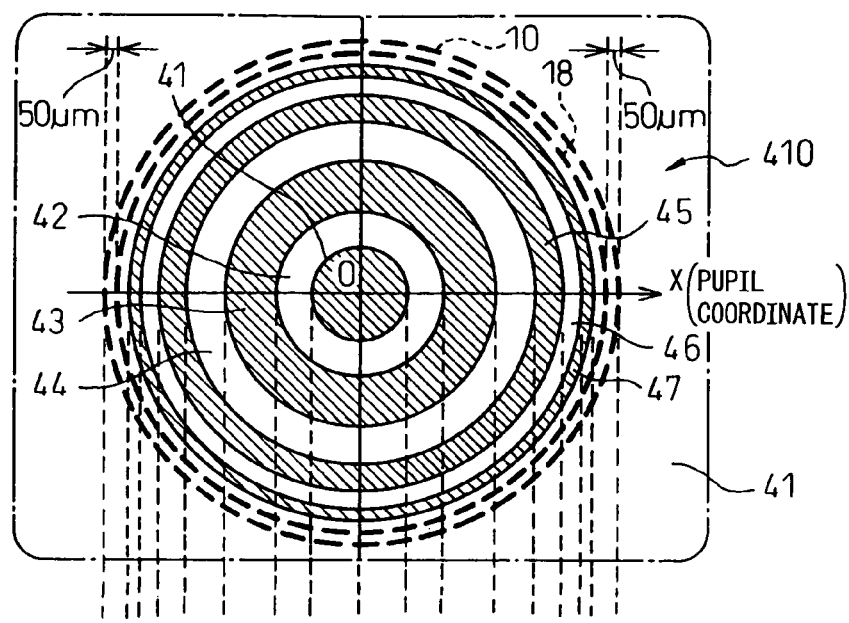
FIG. 11A is a diagram showing one example a spherical aberration correcting electrode pattern in the liquid crystal optical element used in FIG. 9.

FIG. 11A shows one example of the spherical aberration correcting transparent electrode pattern 410 in the liquid crystal optical element 70 shown in FIGS. 9 and 10. As shown in FIG. 11A, six concentric regions 42 to 47 for advancing the phase are arranged in an inside region 18 which is defined 50 μm inward of the effective diameter 10 of the light beam incident on the liquid crystal optical element 70. Here, a reference potential is applied to a region 41, and this region does not have the function of advancing the phase of the incident beam.

When a positive (+) voltage with respect to the reference potential is applied to each of the regions 42 to 47, a potential difference occurs with respect to the transparent counter electrode 76, and the orientation of the liquid crystal molecules therebetween changes according to the potential difference. As a result, the light beam passing therethrough is acted upon by a force that advances its phase. The reference potential (here, 0 V as an example) is applied to the region 41. These voltages are applied to the spherical aberration correcting electrode pattern 410 via the lead 54 (see FIG. 9) from the control circuit 253.

Figure 11B:
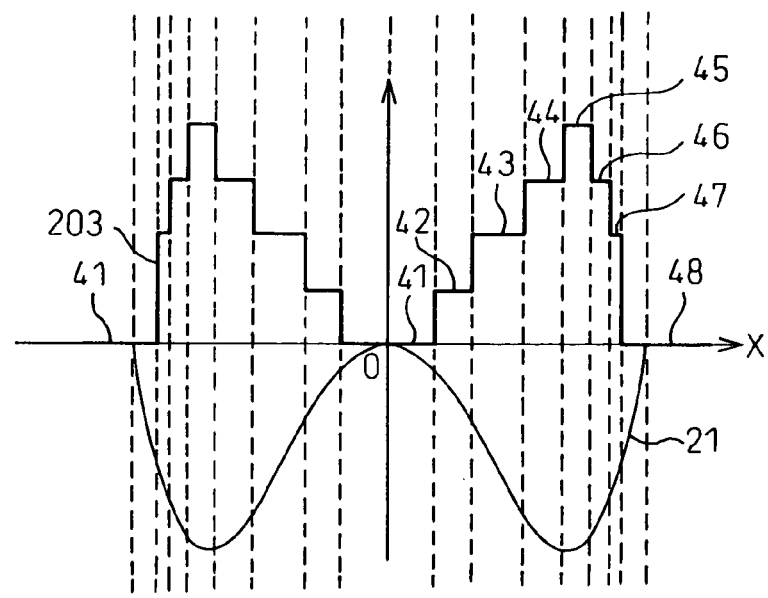
FIG. 11B is a diagram showing one example of a voltage applied to the electrode pattern shown in FIG. 11A.

In FIG. 11B, the voltage waveform 203 applied to the respective regions is plotted on the X axis. When such voltages are applied to the respective regions 41 to 47 in the inside region 18, the liquid crystal optical element 70 works to cancel out the spherical aberration 21 occurring due to such imperfections as unevenness in the thickness of the light transmissive protective layer of the recording medium 703.

Figure 11C:
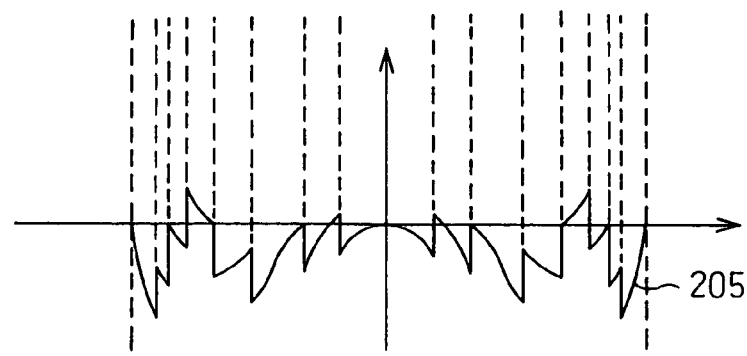
FIG. 11C is a diagram showing one example of a corrected spherical aberration.

FIG. 11C shows the spherical aberration 205 after the correction. That is, the spherical aberration 21 in FIG. 11B is corrected as shown by the spherical aberration 205 in FIG. 11C. It is thus understood that the correction is made by the liquid crystal optical element 70 so as to suppress the spherical aberration occurring in the substrate of the recording medium 703.

Figure 12A:
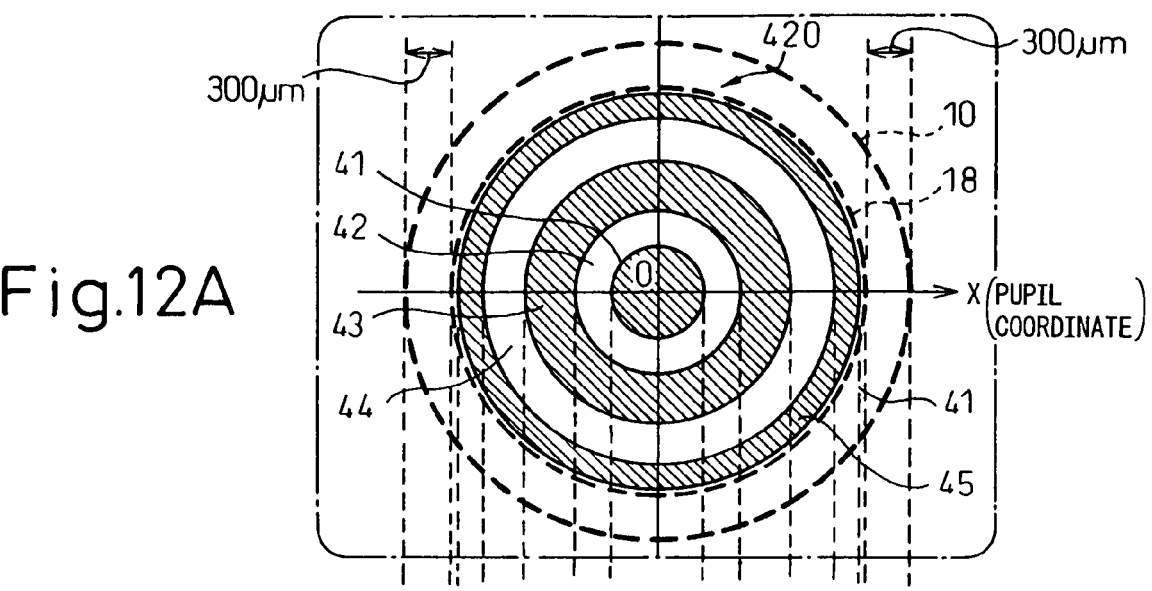
FIG. 12A is a diagram showing another example a spherical aberration correcting electrode pattern in the liquid crystal optical element used in FIG. 9.

FIG. 12A shows one example of an alternative spherical aberration correcting transparent electrode pattern 420 according to the present embodiment. In FIG. 12A, four regions 42 to 45 for advancing the phase are arranged in an inside region 18 which is defined 300 μm inward of the effective diameter 10 of the light beam incident on the liquid crystal optical element 70. A region 41 is a region to which a reference potential (here, 0 V as an example) is applied.

When a positive (+) voltage with respect to the reference potential is applied to each of the regions 42 to 45, a potential difference occurs with respect to the transparent counter electrode 76, and the orientation of the liquid crystal molecules therebetween changes according to the potential difference. As a result, the light beam passing therethrough is acted upon by a force that advances its phase. These voltages are applied to the transparent electrode pattern 420 via the lead 54 (see FIG. 9) from the control circuit 253.

Figure 12B:
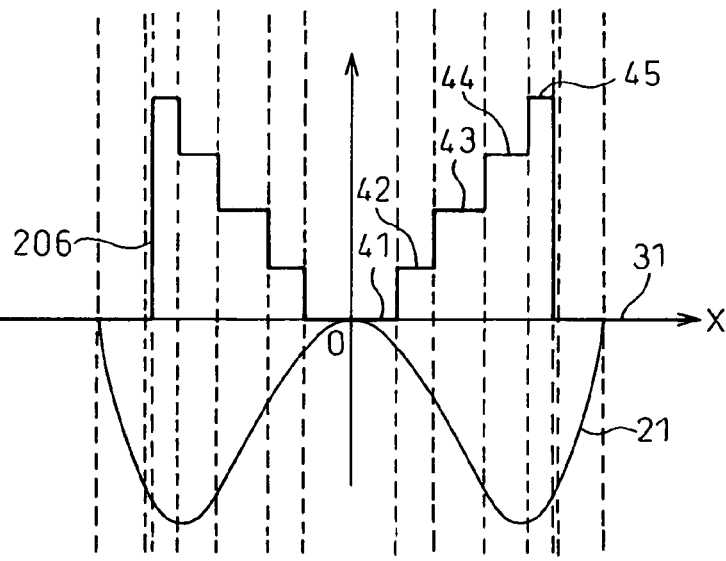
FIG. 12B is a diagram showing one example of a voltage applied to the electrode pattern shown in FIG. 12A.

In FIG. 12B, the voltages 206 applied to the respective regions are plotted on the X axis. When such voltages are applied to the respective regions 42 to 45 in the transparent electrode pattern 420, the liquid crystal optical element 70 works to cancel out the spherical aberration 21 occurring in the substrate of the recording medium 703.

Figure 12C:
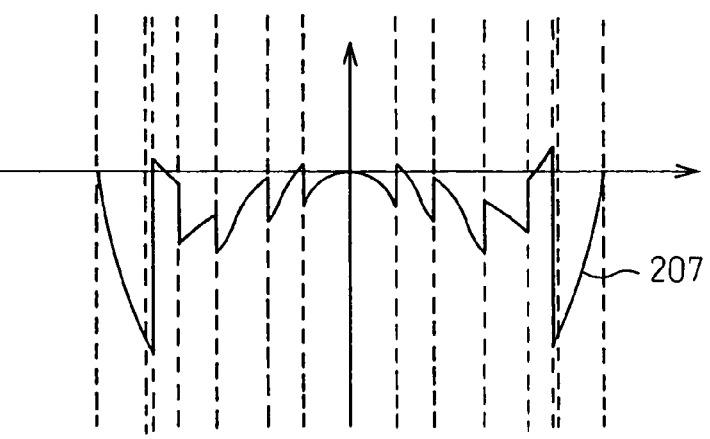
FIG. 12C is a diagram showing one example of a corrected spherical aberration.

FIG. 12C shows the spherical aberration 207 after the correction. That is, the spherical aberration 21 in FIG. 12B is corrected as shown by the spherical aberration 207 in FIG. 12C. It is thus understood that the correction is made so as to suppress the spherical aberration occurring in the substrate of the recording medium 703.

In the explanation of FIGS. 11A and 12A, it has been described that a positive (+) voltage with respect to the reference potential is applied to each region of the spherical aberration correcting transparent electrode patterns 410 and 420, thereby performing control so as to advance the phase of the light beam passing therethrough. However, if the direction of the spherical aberration occurring in the substrate of the recording medium 703 is opposite to that shown in FIGS. 11B and 12B, control can be performed so that a negative (−) voltage opposite in polarity to that shown in FIGS. 11B and 12B is applied to each region of the transparent electrode patterns 410 and 420. In that case, the light beam passing through each region of the transparent electrode patterns 410 and 420 is acted upon by a force that delays its phase.

Here, as previously described, it is preferable that the spherical aberration after the correction (residual spherical aberration) be not greater than one quarter of the wavelength of the light beam (according to Rayleigh's quarter wavelength rule). Also, as previously described, it is preferable that the spherical aberration after the correction be not greater than 1/14 of the wavelength of the light beam (according to Marechal's criterion). Further, as previously described, when the recording medium is a conventional DVD, it is preferable that the spherical aberration after the correction be not greater than 33 mλ (according to the evaluation criterion (33 mλ) in the DVD evaluator).

Figure 29A:
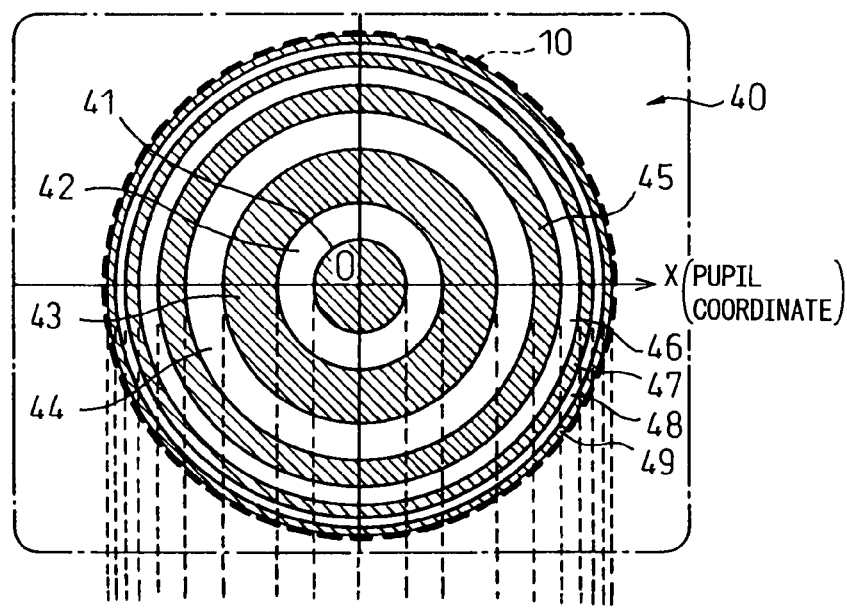
FIG. 29A is a diagram showing one example a spherical aberration correcting electrode pattern in the liquid crystal optical element.
Figure 29B:
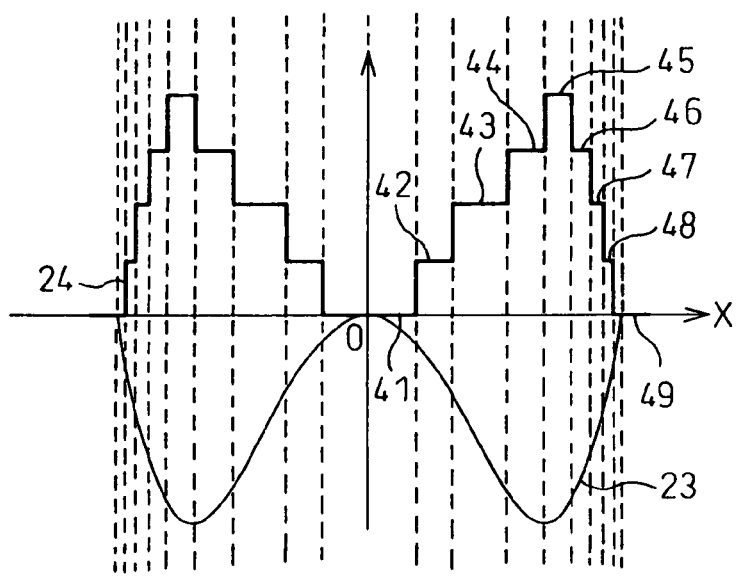
FIG. 29B is a diagram showing one example of a voltage applied to the electrode pattern shown in FIG. 29A.
Figure 29C:
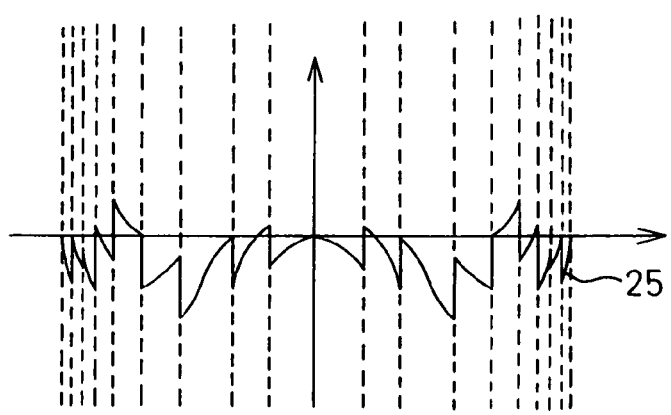
FIG. 29C is a diagram showing one example of a corrected spherical aberration.
Figure 30:
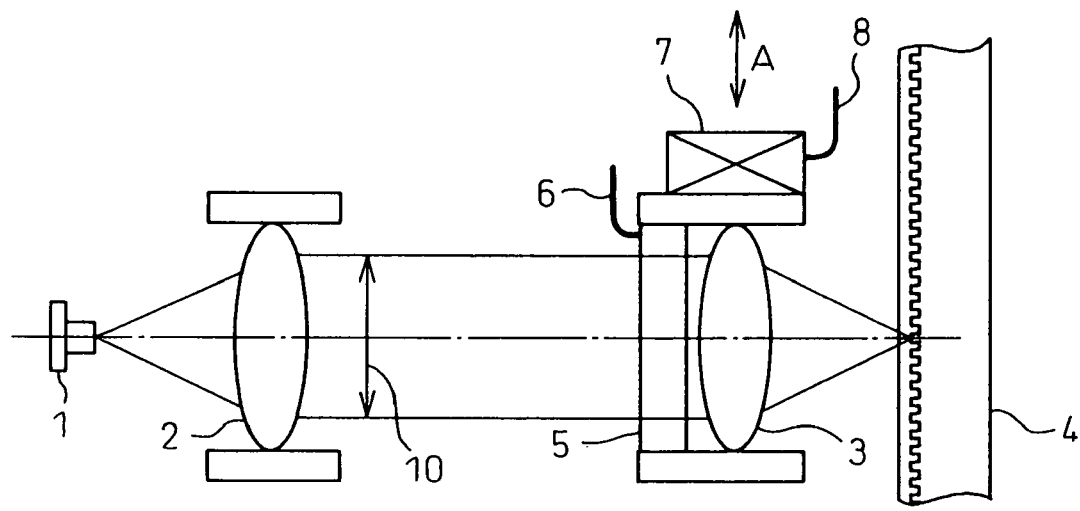
FIG. 30 is a diagram showing another example of an optical apparatus having a prior art liquid crystal optical element for spherical aberration correction.
Figure 31:
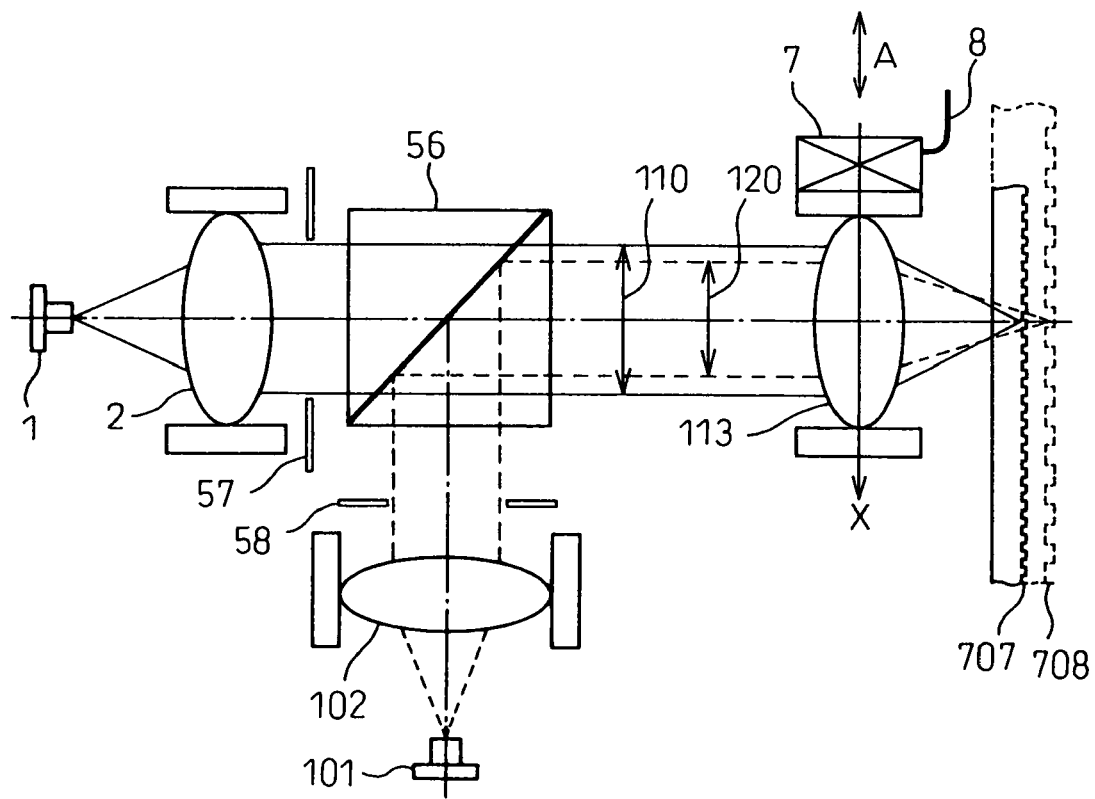
FIG. 31 is a diagram showing one example of an optical apparatus according to the prior art.

Here, a difference will be described between the case where the phase-advancing (or phase-retarding) regions are formed over the entire region inside the effective diameter 10, as shown in FIG. 29A, and the case where the phase-advancing (or phase-retarding) regions are formed only in the inside region 18 defined inside the effective diameter 10, as shown in FIG. 11A or 12A.

The spherical aberration correction shown in FIG. 29A is equivalent to the case where the light beam is captured over the entire region of the effective diameter 10 and the captured light beam is corrected with the effective diameter of the liquid crystal optical element, as previously shown in FIG. 5A. In this case, however, when the objective lens 13 is moved by the actuator 7, the effective diameter of the liquid crystal optical element becomes displaced from the field of view of the objective lens (see FIG. 5B), and an effective spherical aberration correction cannot be accomplished.

In contrast, the spherical aberration correction shown in FIG. 11A is equivalent to the case where the light beam falling only on the inside region defined 50 μm inward of the effective diameter 10 is captured and the captured light beam is corrected with the inside region 18 corresponding to the effective diameter of the liquid crystal optical element, as previously shown in FIG. 6A. In this case, when the objective lens 13 is moved by the actuator 7, the center of the field of view of the objective lens becomes displaced from the center of the inside region 18, but the inside region 18 still stays within the field of view of the objective lens (see FIG. 6B). Accordingly, satisfactory spherical aberration correction can be accomplished, though the degree of correction somewhat drops compared with the case where the light beam is aligned with the center of the optical axis (see FIG. 6A).

As shown, as the phase-advancing (or phase-retarding) regions are formed only in the inside region 18 defined inside the effective diameter 10, rather than forming such regions over the entire region of the effective diameter 10, an effective spherical aberration correction can be accomplished even when the objective lens 13 is moved by the actuator 7 for tracking.

That is, as the phase-advancing (or phase-delaying) regions are set so as to substantially stay within the field of view of the objective lens despite the movement of the lens by the actuator 7, an effective spherical aberration correction can be accomplished.

Table 2, below, shows the relationship between the inside region in which the spherical aberration correcting electrode pattern is formed and the amount of movement of the objective lens for tracking (=the amount of axis displacement) in relation to the degradation (chiefly, signal jitter) of the RF signal generated based on the reflected light beam.

The degradation of the light intensity signal is evaluated on a scale of A to D: A indicates the best condition, B a good condition, C a condition in which the light intensity signal is usable, and D a condition in which the light intensity signal is not usable. To construct Table 2 shown below, liquid crystal optical elements were fabricated that contained a plurality of phase-advancing regions only in an inside region defined 0 μm, 50 μm, 100 μm, 150 μm, 200 μm, 250 μm, 300 μm, or 350 μm, respectively, inward of the effective diameter, and the jitter amount of the light intensity signal was measured by displacing each liquid crystal optical element from the optical axis of the objective lens by 0 μm, 50 μm, 100 μm, 150 μm, and 200 μm, respectively. The same optical apparatus construction as that shown in FIG. 9 was employed.

TABLE 2

|  |  | Amount of Axis Displacement (μm) | | | | |
| --- | --- | --- | --- | --- | --- | --- |
|  |  | 0 | 50 | 100 | 150 | 200 |
| Inside Region | 0 | A | C | D | D | D |
| (μm) | 50 | A | B | C | D | D |
|  | 100 | B | B | B | C | D |
|  | 150 | B | B | B | B | C |
|  | 200 | B | B | B | B | B |
|  | 250 | B | B | B | B | B |
|  | 300 | B | B | B | C | C |
|  | 350 | C | D | D | D | D |

As can be seen from Table 2, even when an axis displacement of 0 μm to 200 μm occurs, a substantially satisfactory spherical aberration correction can be accomplished with any liquid crystal optical element in which the plurality of phase-advancing (or phase-delaying) regions are formed only in the inside region defined 50 μm to 300 μm inward of the effective diameter. As satisfactory spherical aberration correction can be accomplished, the jitter amount of the RF signal is suppressed, and the optical apparatus is thus made usable. Here, the example in which the phase-advancing (or phase-delaying) regions are formed only in the inside region defined 50 μm inward of the effective diameter corresponds to the example shown in FIG. 11A, while the example in which the phase-advancing (or phase-retarding) regions are formed only in the inside region defined 300 μm inward of the effective diameter corresponds to the example shown in FIG. 12A.

On the other hand, in the case of the liquid crystal optical element (i.e., the prior art liquid crystal optical element shown in FIG. 29A) in which the phase-advancing (or phase-delaying) regions are formed only in the inside region defined 0 μm inward of the effective diameter (i.e., over the entire region of the effective diameter 10), if an axis displacement of 100 μm or larger occurs, proper aberration correction cannot be accomplished. That is, the jitter amount of the RF signal increases, rendering the optical apparatus unusable.

Likewise, in the case of the liquid crystal optical element in which the phase-advancing (or phase-delaying) regions are formed only in the inside region defined 350 μm inward of the effective diameter, if an axis displacement of 50 μm or larger occurs, proper aberration correction cannot be accomplished. That is, the jitter amount of the RF signal increases, rendering the optical apparatus unusable. This is presumably because the phase-advancing (or phase-delaying) regions are too small to accomplish proper spherical aberration correction.

In this way, by using the liquid crystal optical element in which the phase-advancing (or phase-delaying) regions are formed only in the inside region defined 50 μm to 300 μm inward of the effective diameter, satisfactory spherical aberration correction can be accomplished even when an axis displacement occurs due to the tracking motion of the objective lens.

Here, the inside region in which the phase-advancing (or phase-delaying) regions are to be formed may be set so as to match the specification of the optical apparatus. For example, if it is known in advance that the axis displacement due to tracking is 100 μm, the inside region should be set 50 μm to 100 μm inward of the effective diameter. If the axis displacement due to tracking is larger, the inside region should be set larger in accordance with the specification.

In this way, in the liquid crystal optical element of the present embodiment and the optical apparatus using the same, even when the objective lens is moved for tracking, the spherical aberration occurring in the substrate of the recording medium can be satisfactorily corrected, because the regions contributing to the spherical aberration correction are set so as to substantially stay within the field of view of the objective lens.

Further, in the liquid crystal optical element of the present embodiment and the optical apparatus using the same, as the liquid crystal optical element for spherical aberration correction need not be combined with the objective lens in a single unit, good spherical aberration correction and good tracking can be achieved with simple construction and without overloading the actuator.

Embodiment 3

FIG. 13 shows an optical apparatus 1200 using a liquid crystal optical element 79 according to the third embodiment of the present invention. The same components as those shown in FIG. 9 are designated by the same reference numerals.

In FIG. 13, a light beam (650 nm) emitted from a light source 101 is converted by the collimator lens 2 into a substantially parallel beam of light having an effective diameter 10; the light beam is then passed through the polarization beam splitter 50 and enters the liquid crystal optical element 79. The light beam emerging from the liquid crystal optical element 79 is passed through the quarter wave plate 55 and focused by an objective lens 103 (numerical aperture NA=0.65) onto a recording medium 704. In the present embodiment, the effective diameter 10 (φ) is chosen as 3 mm.

The light beam reflected from the recording medium 704 is once again passed through the objective lens 103, the quarter wave plate 55, and the liquid crystal optical element 79, and is redirected by the polarization beam splitter 50 toward the condenser lens 51 which focuses the light beam on the light detector 52. The light beam, when reflected by the recording medium 704, is amplitude-modulated by the information (pit) recorded on the track of the recording medium 704, and is output as a light intensity signal from the light detector 52. Recorded information is recovered from this light intensity signal (RF signal).

The recording medium 704 is a DVD, which is a disc with a diameter of 12 cm and a thickness of 1.2 mm. The disc contains a first track surface 705 (on the light incident side) and a second track surface 706, on both of which information is recorded, and a light transmissive protective layer formed from a polycarbonate or like material about 0.6 mm in thickness is formed over the first track surface. With the two information layers, a capacity of about 9.5 GB is achieved using a 650-nm red laser as the light source 101 and a lens with a numerical aperture (NA)=0.65 as the objective lens 103.

The objective lens 103 is attached to the tracking actuator 7, which moves the objective lens 3 in a direction indicated by arrow A in the figure so that the light beam focused by the objective lens accurately follows the track on the recording medium 704. The actuator 7 is provided with a lead 8 for driving it, and the liquid crystal optical element 79 is provided with a lead 54 for driving the transparent electrode pattern to be described later.

A control circuit 353 applies a voltage to the spherical aberration correcting transparent pattern (the electrode pattern 410 or 420 shown in FIG. 11A or 12A) of the liquid crystal optical element 79 in accordance with a track switching signal (not shown). When no voltage is applied to the spherical aberration correcting transparent pattern, the objective lens 103 focuses the beam 11 suitably for reading or writing on the first track surface 705. On the other hand, when a voltage is applied to the spherical aberration correcting transparent electrode pattern, the spherical aberration is corrected by the liquid crystal optical element 79, and the beam 12 is focused suitably for reading or writing on the second track surface 706.

Further, by utilizing the light intensity signal output from the light detector 52, the control circuit 353 detects the wavefront aberration (primarily, coma aberration) occurring in the substrate of the recording medium 704, and applies a voltage to the coma aberration correcting transparent electrode pattern (described later) via the lead 54 (see FIG. 13) so as to cancel out the detected coma aberration.

The liquid crystal optical element 79 of FIG. 13 has a structure similar to that of the liquid crystal optical element 70 shown in FIG. 10. It is assumed here that the spherical aberration correcting transparent electrode pattern 410 or 420 shown in FIG. 11A or 12A in the second embodiment is formed in the transparent electrode 72 of the liquid crystal optical element 79. In addition to that, the coma aberration correcting transparent electrode pattern 320 or 330 described hereinafter is formed in the other transparent electrode 76 of the liquid crystal optical element 79.

Figure 14A:
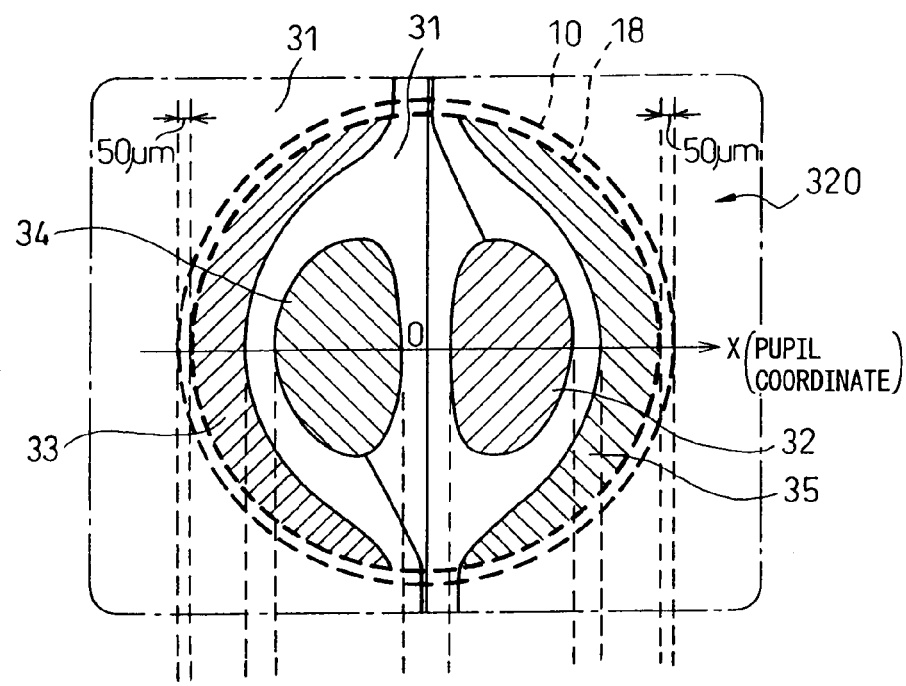
FIG. 14A is a diagram showing one example a coma aberration correcting electrode pattern in the liquid crystal optical element used in FIG. 13.

FIG. 14A shows one example of the coma aberration correcting transparent electrode pattern 320 formed in the transparent electrode 76 of the liquid crystal optical element 79. The coma aberration correcting transparent electrode pattern 320 shown in FIG. 14A is one that is to be paired with the spherical aberration correcting transparent electrode pattern 410 shown in FIG. 11A. In FIG. 14A, two regions 32 and 33 for advancing the phase and two regions 34 and 35 for retarding the phase are arranged in an inside region 18 which is defined 50 µm inward of the effective diameter 10 of the light beam incident on the liquid crystal optical element 79. In the figure, reference numeral 31 indicates a region to which a reference potential is applied.

When a positive (+) voltage with respect to the reference potential is applied to the regions 32 and 33, a potential difference occurs with respect to the transparent electrode 72 on the opposite side, and the orientation of the liquid crystal molecules therebetween changes according to the potential difference. As a result, the light beam passing therethrough is acted upon by a force that advances its phase. On the other hand, when a negative (−) voltage with respect to the reference potential is applied to the regions 34 and 35, a potential difference likewise occurs with respect to the transparent electrode 72 on the opposite side, and the orientation of the liquid crystal molecules therebetween changes according to the potential difference. As a result, the light beam passing therethrough is acted upon by a force that delays its phase. The reference potential (here, 0 V as an example) is applied to the region 31.

Utilizing the light intensity signal output from the light detector 52, the control circuit 353 detects the wavefront aberration (primarily, coma aberration) occurring in the substrate of the recording medium 704, and applies a voltage to the coma aberration correcting transparent electrode pattern 320 via the lead 54 (see FIG. 13) so as to cancel out the detected coma aberration.

In FIG. 14B, the voltages 121 applied to the respective regions are plotted on the X axis. When such voltages are applied to the respective regions 31 to 35 in the inside region 18, the liquid crystal optical element 79 works to cancel out the coma aberration 20 occurring when the recording medium 704 is tilted relative to the optical axis.

Figure 14C:
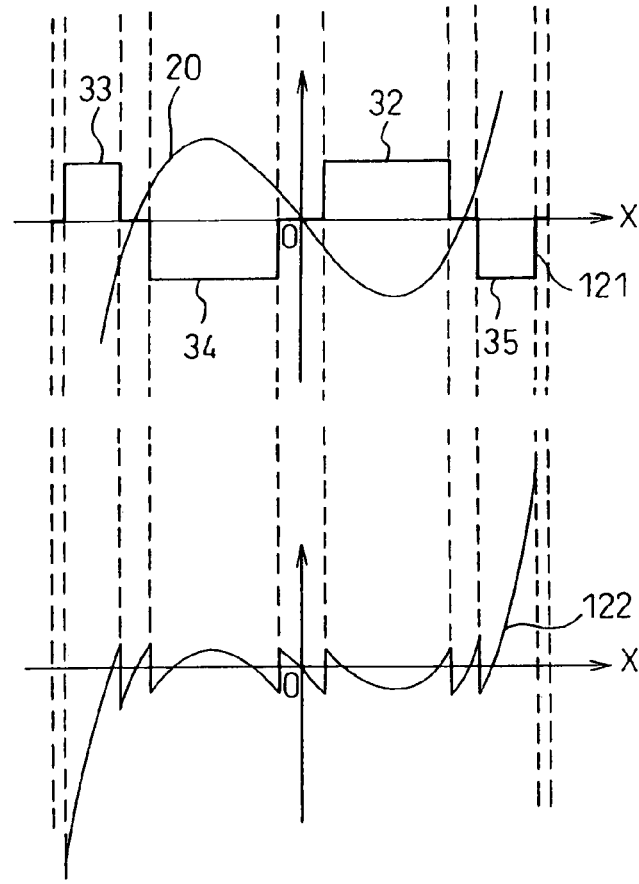
FIG. 14C is a diagram showing one example of a corrected coma aberration.

FIG. 14C shows the coma aberration 122 after the correction. That is, the coma aberration 20 in FIG. 14B is corrected as shown by the coma aberration 122 in FIG. 14C. It is thus understood that the correction is made by the liquid crystal optical element 79 so as to suppress the coma aberration occurring in the substrate of the recording medium 704.

Figure 15A:
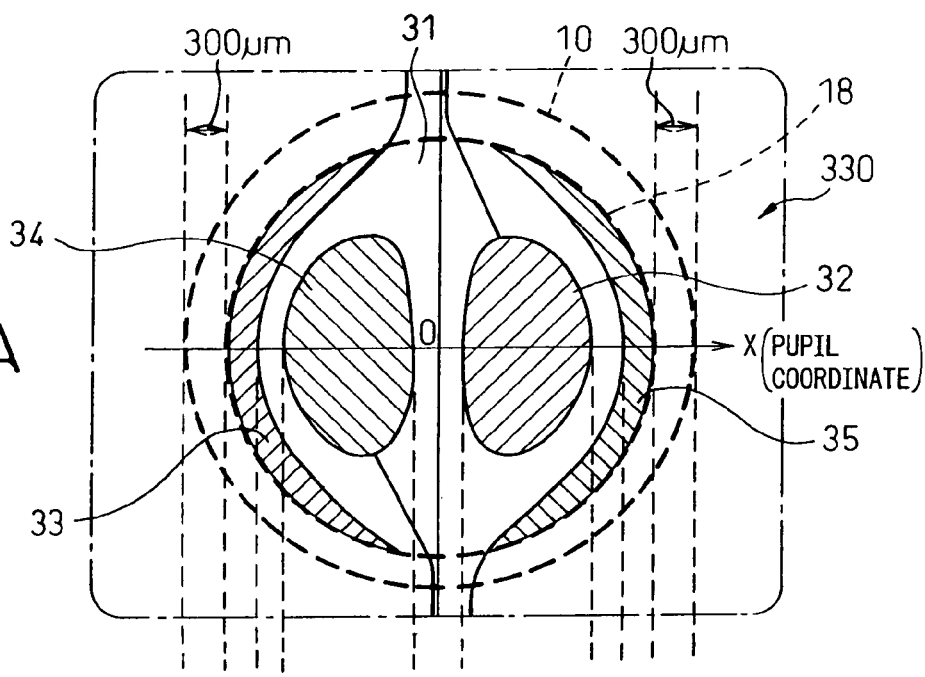
FIG. 15A is a diagram showing another example a coma aberration correcting electrode pattern in the liquid crystal optical element used in FIG. 13.

FIG. 15A shows one example of the coma aberration correcting transparent electrode pattern 330 formed in the transparent electrode 76 of the liquid crystal optical element 79. The coma aberration correcting transparent electrode pattern 330 shown in FIG. 15A is one that is to be paired with the spherical aberration correcting transparent electrode pattern 420 shown in FIG. 12A. In FIG. 15A, two regions 32 and 33 for advancing the phase and two regions 34 and 35 for retarding the phase are arranged in an inside region 18 which is defined 300 µm inward of the effective diameter 10 of the light beam incident on the liquid crystal optical element 79. In the figure, reference numeral 31 indicates a region to which a reference potential is applied.

When a positive (+) voltage with respect to the reference potential is applied to the regions 32 and 33, a potential difference occurs with respect to the transparent electrode 72 on the opposite side, and the orientation of the liquid crystal molecules therebetween changes according to the potential difference. As a result, the light beam passing therethrough is acted upon by a force that advances its phase. On the other hand, when a negative (−) voltage with respect to the reference potential is applied to the regions 34 and 35, a potential difference occurs with respect to the transparent electrode 72 on the opposite side, and the orientation of the liquid crystal molecules therebetween changes according to the potential difference. As a result, the light beam passing therethrough is acted upon by a force that delays its phase. The reference potential (here, 0 V as an example) is applied to the region 31.

Utilizing the light intensity signal output from the light detector 52, the control circuit 353 detects the wavefront aberration (primarily, coma aberration) occurring in the substrate of the recording medium 704, and applies a voltage to the coma aberration correcting transparent electrode pattern 330 via the lead 54 (see FIG. 13) so as to cancel out the detected coma aberration.

Figure 15B:
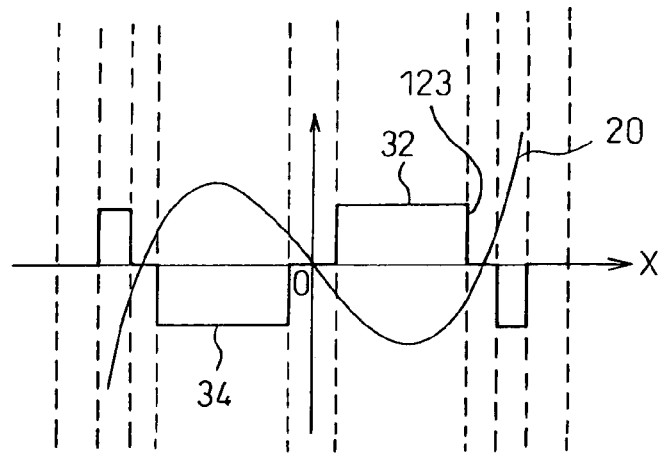
FIG. 15B is a diagram showing one example of a voltage applied to the electrode pattern shown in FIG. 15A.

In FIG. 15B, the voltages 123 applied to the respective regions are plotted on the X axis. When such voltages are applied to the respective regions 31 to 35 of the transparent counter electrode pattern 330, the liquid crystal optical element 79 works to cancel out the coma aberration 20 occurring when the recording medium 704 is tilted relative to the optical axis.

Figure 15C:
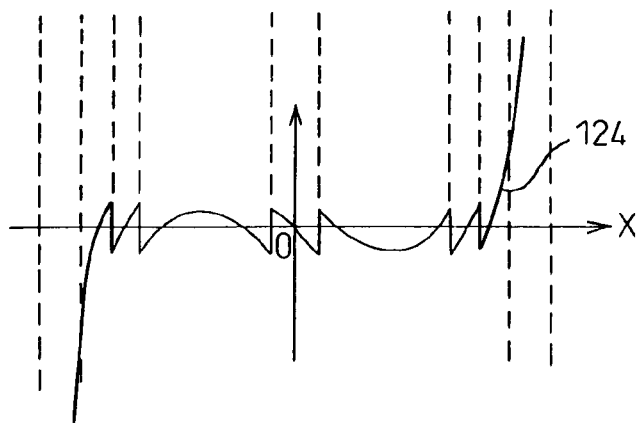
FIG. 15C is a diagram showing one example of a corrected coma aberration.

FIG. 15C shows the coma aberration 124 after the correction. That is, the coma aberration 20 in FIG. 15B is corrected as shown by the coma aberration 124 in FIG. 15C. It is thus understood that the correction is made by the liquid crystal optical element 79 so as to suppress the coma aberration occurring in the substrate of the recording medium 704.

As in the case of the spherical aberration correcting transparent electrode patterns 410 and 420 shown in FIGS. 11A and 15A, in the case of the coma aberration correcting transparent electrode patterns 320 and 330 also, when the plurality of phase-advancing and phase-delaying regions are formed only in the inside region defined 50 µm to 300 µm inward of the effective diameter, satisfactory coma aberration correction can be accomplished even when an axis displacement occurs due to tracking. Here, the example in which the plurality of phase-advancing and phase-delaying regions are formed only in the inside region defined 50 µm inward of the effective diameter corresponds to the example shown in FIG. 14A, while the example in which the plurality of phase-advancing and phase-retarding regions are formed only in the inside region defined 300 µm inward of the effective diameter corresponds to the example shown in FIG. 15A.

When the spherical aberration correcting transparent electrode pattern 410 or 420 shown in FIG. 11A or 12A and the coma aberration correcting transparent electrode pattern 320 or 330 shown in FIG. 14A or 15A are provided in the liquid crystal optical element 79 as described above, it becomes possible to correct the spherical aberration and coma aberration that occur when reading or writing data on the recording medium 704 such as the next generation high density DVD. It is preferable that the inside region for the spherical aberration correcting transparent electrode pattern and the inside region for the coma aberration correcting transparent electrode pattern be made to coincide with each other. Further, the spherical aberration correcting transparent electrode pattern and the coma aberration correcting transparent electrode pattern formed in the respective transparent substrates of the liquid crystal optical element 79 may be interchanged.

Figure 16A:
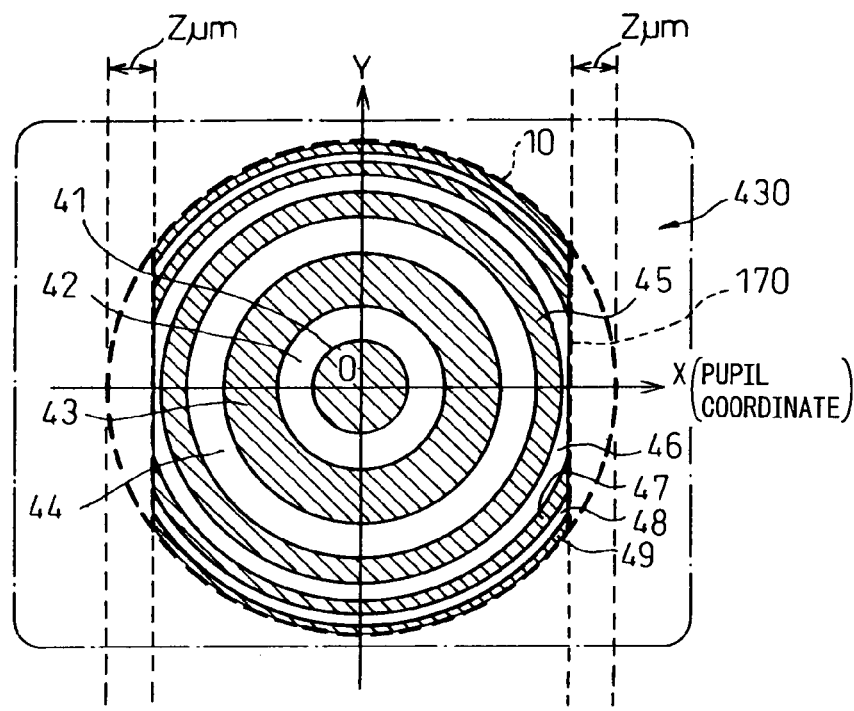
FIG. 16A is a diagram showing another electrode pattern example for spherical aberration correction.
Figure 16B:
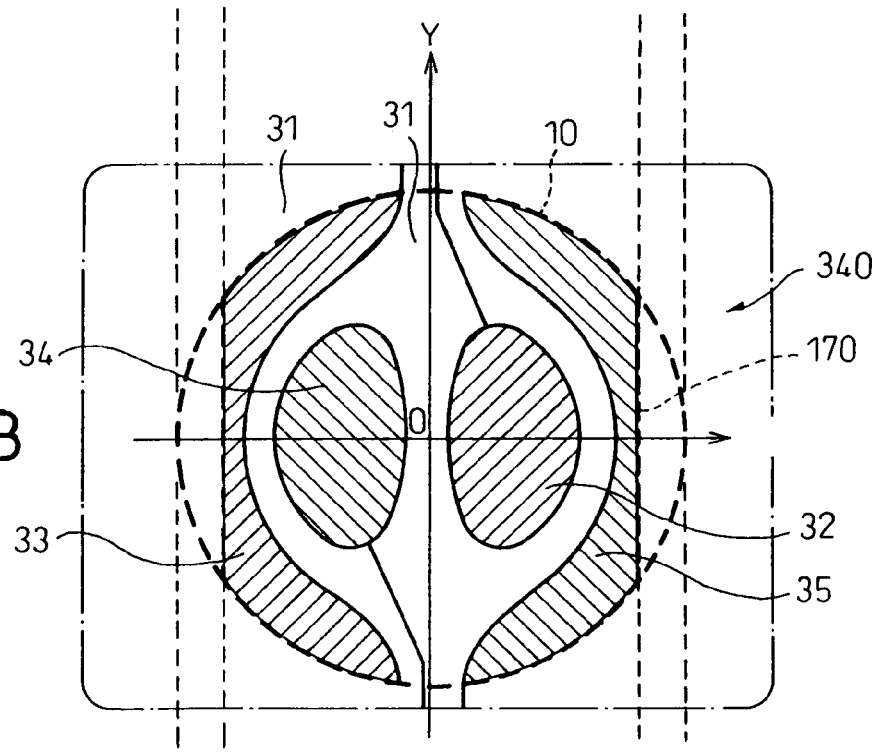
FIG. 16B is a diagram showing another electrode pattern example for coma aberration correction.

When the objective lens 13 and the liquid crystal optical element 79 are mounted with their optical axes accurately aligned with each other, it is also possible to set left/right limited regions 170 as shown in FIGS. 16A and 16B. That is, by considering the maximum amount of tracking motion (usually 200 to 300 µm), the phase controlling region along the X axis in the figure is restricted to the left/right limited region 170 defined Z µm inwardly from the left and right sides of the effective diameter, while leaving the dimension along the Y axis in the figure unchanged, i.e., the same as the effective diameter. With such patterns also, it is possible to correct the spherical and coma aberrations. FIG. 16A shows one example of such a spherical aberration correcting electrode pattern 430, and FIG. 16B shows one example of such a coma aberration correcting electrode pattern 340.

Accordingly, wavefront aberration correcting electrode patterns such as shown in FIGS. 16A and 16B may be formed in the respective transparent electrodes 72 and 76 of the liquid crystal optical element 79 of the optical apparatus 1200 shown in FIG. 13.

In this way, in the liquid crystal optical element of the present embodiment and the optical apparatus using the same, by making provisions to apply voltages to the spherical aberration correcting transparent electrode pattern in accordance with the track switching signal, it becomes possible to read or write data correctly on the plurality of track surfaces contained in the recording medium 704.

Further, in the liquid crystal optical element of the present embodiment and the optical apparatus using the same, the spherical aberration correcting transparent electrode pattern and the coma aberration correcting transparent electrode pattern are each formed only in the predefined inside region, and the regions contributing to the spherical aberration correction and the coma aberration correction are set so as to substantially stay within the field of view of the objective lens even when the objective lens is moved for tracking; as a result, satisfactory corrections can be made for both the spherical and coma aberrations.

Embodiment 4

FIG. 17 shows an optical apparatus 1300 using a liquid crystal optical element 90 according to the fourth embodiment of the present invention. The same components as those shown in FIG. 1 are designated by the same reference numerals. The configuration differs from that of FIG. 1 by the use of two light sources 1 and 101 and the liquid crystal optical element 90 which is different from the liquid crystal optical element 60 used in FIG. 1.

Coma aberration occurs when using a first optical disc 707 (a high density optical disc such as DVD), and spherical aberration occurs when using a second optical disc 708. Furthermore, a displacement (axis displacement) occurs between the optical axis of the objective lens 113 and the track on the first optical disc 707 or the second optical disc 708. To address this, the objective lens 113 is attached to the tracking actuator 7 by which the optical axis of the objective lens 113 is made to follow the track on the first optical disc 707 or the second optical disc 708. The actuator 7 is provided with a power supply lead 8. With the actuator 7 moving the objective lens 113 in a direction indicated by arrow A in the figure, the light beam focused by the objective lens 113 is made to accurately follow the track on the first optical disc 707 or the second optical disc 708.

However, when the objective lens 113 is moved by the actuator 7, the positional relationship between the liquid crystal optical element 90 and the objective lens 113 changes. It is assumed here that the coma aberration correcting transparent electrode pattern and the spherical aberration correcting transparent electrode pattern are designed to match the effective diameters 110 and 120, respectively, of the optical apparatus 1300. That is, the liquid crystal optical element 90 is designed so that the coma aberration occurring in the substrate of the first optical disc 707 and the spherical aberration occurring in the substrate of the second optical disc 708 can be ideally corrected only when the objective lens 113 and the liquid crystal optical element 90 are precisely aligned along the optical axis. Accordingly, when the positional relationship between the liquid crystal optical element 90 and the objective lens 113 is deviated from the ideal position as a result of tracking, the wavefront aberrations may not be sufficiently corrected by the liquid crystal optical element 90.

In view of the above situation, the optical apparatus 1300 shown in FIG. 17 uses the liquid crystal optical element 90 that can satisfactorily correct the coma and spherical aberrations irrespectively of the tracking motion of the objective lens 113.

In FIG. 17, the light beam (650 nm) emitted from the first light source 1 such as a semiconductor laser device is converted by the collimator lens 2 into a substantially parallel beam of light, which is limited by an aperture 57 to a light beam having an effective diameter 110 which is about 5 mm. The light beam is then passed through the half mirror 56 and the polarization beam splitter 50, and enters the liquid crystal optical element 90. The light beam emerging from the liquid crystal optical element 90 is passed through the quarter wave plate 55 and focused by the objective lens 113 (numerical aperture NA=0.65) onto the track of the first optical disc 707.

On the other hand, the light beam (780 nm) emitted from the second light source 101 such as a semiconductor laser device is converted by a collimator lens 102 into a substantially parallel beam of light, which is limited by an aperture 58 to a light beam having an effective diameter 120 which is about 4 mm. The light beam is then redirected by the half mirror 56 and passed through the polarization beam splitter 50, and enters the liquid crystal optical element 90. The light beam emerging from the liquid crystal optical element 90 is passed through the quarter wave plate 55 and focused by the objective lens 113 (numerical aperture NA=0.65) onto the track of the second optical disc 708.

The first optical disc 707 is a high density optical disc, such as DVD, that has a 0.6-mm thick transparent substrate on the track surface and a maximum storage capacity of about 4.75 GB on a single side. The second optical disc 708 is an optical disc, such as CD, that has a 1.2-mm thick transparent substrate on the track surface and a maximum storage capacity of about 600 MB on a single side.

The light beam reflected from the first optical disc 707 or the second optical disc 708 is once again passed through the objective lens 113, the quarter wave plate 55, and the liquid crystal optical element 90, and is redirected by the polarization beam splitter 50 toward the condenser lens 51 which focuses the light beam on the light detector 52. The light beam, when reflected by the first optical disc 707 or the second optical disc 708, is amplitude-modulated by the information (pit) recorded on the track of the optical disc, and is output as a light intensity signal from the light detector 52. Recorded information is recovered from this light intensity signal (RF signal).

When writing to the first optical disc 707 or the second optical disc 708, the intensity of the light beam to be emitted from the light source 1 or 101 is modulated with a write data signal, and the optical disc is illuminated by the modulated light beam. Data is written to the optical disc by causing the refractive index or color of a thin film to change, or causing the formation of a pit depression, in accordance with the intensity of the light beam. The intensity modulation of the light beam can be accomplished by modulating the electric current supplied to the semiconductor laser device used as the light source 1 or 101.

The objective lens 113 is attached to the tracking actuator 7, which moves the objective lens 113 in directions indicated by arrow A in the figure so that the light beam focused by the objective lens is made to accurately follow the track on the first optical disc 707 or the second optical disc 708. The actuator 7 is provided with a lead 8 for driving it.

The liquid crystal optical element 90 has the coma aberration correcting transparent electrode pattern and the spherical aberration correcting transparent electrode pattern as will be described later.

A control circuit 553, based on the light intensity signal (RF signal) from the light detector 52, detects the coma aberration caused by the tilting of the first optical disc 707. Further, the control circuit 553 applies a voltage proportional to the detected coma aberration to the coma aberration correcting transparent electrode pattern, thereby applying a correction so as to cancel out the coma aberration occurring during the reading or writing of the first optical disc 707. During the reading or writing of the first optical disc 707, the control circuit 553 applies a reference voltage to the spherical aberration correcting transparent electrode pattern, to maintain the spherical aberration correcting function of the liquid crystal optical element 90 in an inoperative condition.

The control circuit 553 switches the control in accordance with a switching signal (not shown) that occurs from switching operation from the first optical disc 707 to the second optical disc 708. More specifically, during the reading or writing of the second optical disc 708, the control circuit 553 applies a voltage to the spherical aberration correcting transparent electrode pattern of the liquid crystal optical element 90, thereby applying a correction so as to cancel out the generated spherical aberration. Further, during the reading or writing of the second optical disc 708, the control circuit 553 applies a reference voltage to the coma aberration correcting transparent electrode pattern, to maintain the coma aberration correcting function of the liquid crystal optical element 90 in an inoperative condition.

Figure 18:
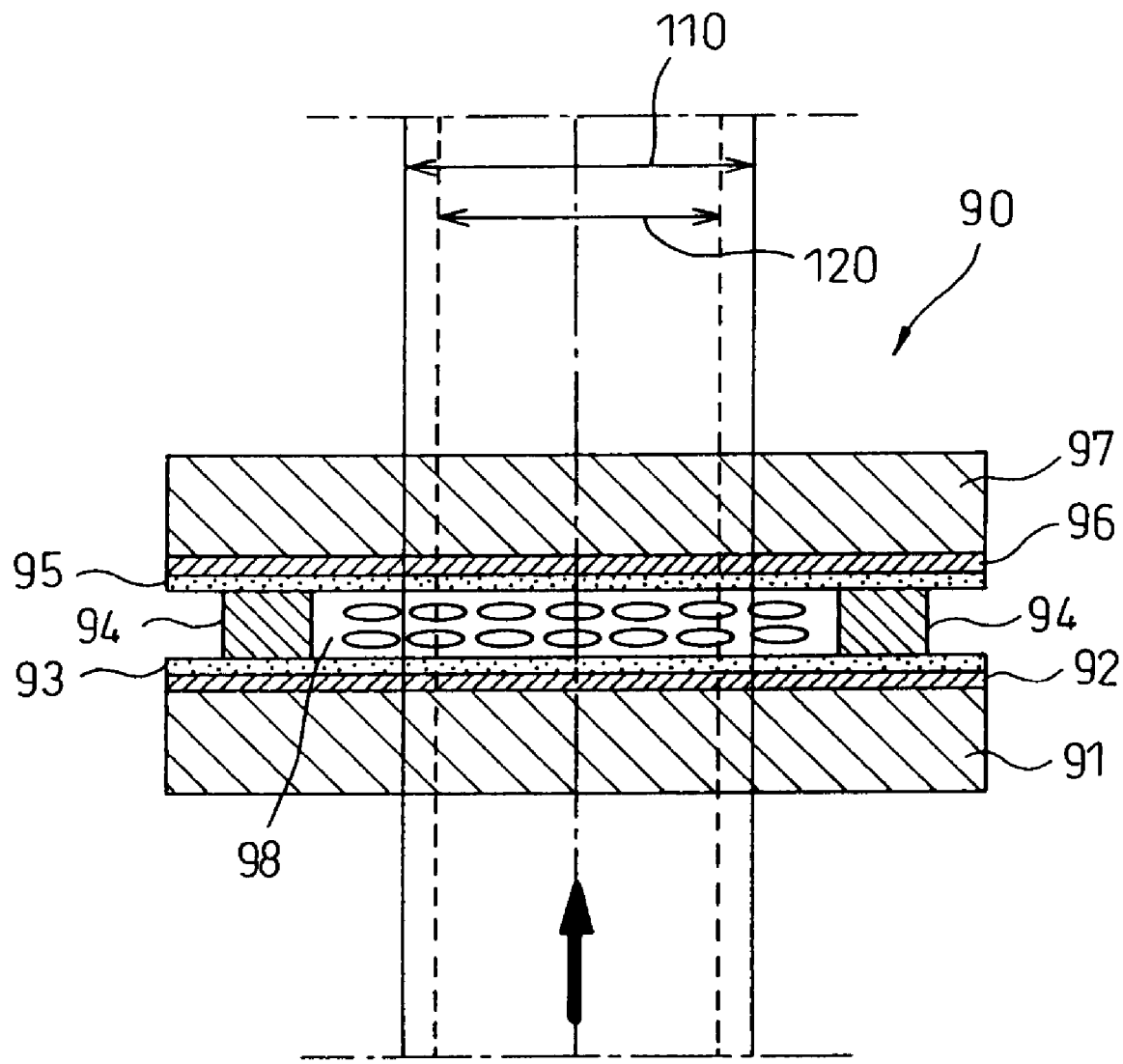
FIG. 18 is a diagram showing one example of a cross section of a liquid crystal optical element used in FIG. 17.

FIG. 18 shows a cross-sectional view of the liquid crystal optical element 90. The arrow shown in FIG. 18 indicates the direction in which the light beam emitted from the first light source 1 or the second light source 101 enters the liquid crystal optical element 90. In FIG. 18, a coma aberration correcting transparent electrode 92 and an alignment film 93 are formed on a transparent substrate 91 on the light source side. On the other hand, a spherical aberration correcting transparent electrode 96 and an alignment film 95 are formed on a transparent substrate 97 on the optical disc side. A liquid crystal 98 is sealed between the two transparent substrates 91 and 97 and sealed by a sealing member 94. The constituent elements shown in FIG. 18 are exaggerated for convenience of explanation, and the ratio of their thicknesses is different from the actual ratio. The difference from FIG. 10 is that the transparent electrodes 92 and 96 have the coma aberration correcting transparent electrode pattern and the spherical aberration correcting transparent electrode pattern, respectively, unlike those shown in FIG. 10.

FIG. 19A shows one example of the coma aberration correcting transparent electrode pattern 360 formed in the liquid crystal optical element 90. As shown in FIG. 19A, two regions 32 and 33 for advancing the phase and two regions 34 and 35 for retarding the phase are arranged in an inside region 180 which is defined 80 μm inward of the effective diameter 110 of the light beam incident on the liquid crystal optical element 90. In the figure, reference numeral 31 indicates a region to which a reference potential is applied.

When a positive (+) voltage with respect to the reference potential is applied to the regions 32 and 33, a potential difference occurs with respect to the transparent electrode 96 on the opposite side, and the orientation of the liquid crystal molecules therebetween changes according to the potential difference. When the coma aberration correcting transparent electrode pattern 360 is in an active condition, the spherical aberration correcting transparent electrode pattern 450 is held at reference voltage. As a result, the light beam passing through the above regions is acted upon by a force that advances its phase. On the other hand, when a negative (−) voltage with respect to the reference potential is applied to the regions 34 and 35, a potential difference occurs with respect to the transparent electrode 96 on the opposite side, and the orientation of the liquid crystal molecules therebetween changes according to the potential difference. As a result, the light beam passing therethrough is acted upon by a force that delays its phase. The reference potential (here, 0 V as an example) is applied to the region 31. These voltages are applied to the coma aberration correcting electrode pattern 360 via the lead 54 (see FIG. 17) from the control circuit 553.

In FIG. 19B, the voltages 127 applied to the respective regions are plotted on the X axis. when such voltages are applied to the respective regions 31 to 35 in the inside region 180, the liquid crystal optical element 90 works to cancel out the coma aberration 20 occurring when the first optical disc 707 is tilted relative to the optical axis.

FIG. 19C shows the coma aberration 128 after the correction. That is, the coma aberration 20 in FIG. 19B is corrected as shown by the coma aberration 128 in FIG. 19C.

It is thus understood that the correction is made by the liquid crystal optical element 90 so as to suppress the coma aberration occurring in the substrate of the first optical disc 707.

FIG. 20A shows one example of the spherical aberration correcting transparent electrode pattern 450 formed in the liquid crystal optical element 90 so as to be paired with the coma aberration correcting transparent electrode pattern 360 shown in FIG. 19A. As shown in FIG. 20A, six concentric regions 42 to 47 for advancing the phase are arranged in an inside region 190 which is defined 70 μm inward of the effective diameter 120 of the light beam incident on the liquid crystal optical element 90. Here, a reference potential is applied to a region 41, and this region does not have the function of advancing the phase of the incident beam.

When a positive (+) voltage with respect to the reference potential is applied to each of the regions 42 to 47, a potential difference occurs with respect to the transparent electrode 92 on the opposite side, and the orientation of the liquid crystal molecules therebetween changes according to the potential difference. When the spherical aberration correcting transparent electrode pattern 450 is in an active condition, the coma aberration correcting transparent electrode pattern 360 is held at reference voltage. As a result, the light beam passing through the above regions is acted upon by a force that advances its phase. The reference potential (here, 0 V as an example) is applied to the region 41. These voltages are applied to the spherical aberration correcting electrode pattern 450 via the lead 54 (see FIG. 17) from the control circuit 553.

In FIG. 20B, the voltage waveform 210 applied to the respective regions is plotted on the X axis. When such voltages are applied to the respective regions 41 to 47 in the inside region 190, the liquid crystal optical element 90 works to cancel out the spherical aberration 21 occurring in the substrate of the second optical disc 708.

FIG. 20C shows the spherical aberration 211 after the correction. That is, the spherical aberration 21 in FIG. 20B is corrected as shown by the spherical aberration 211 in FIG. 20C. It is thus understood that the correction is made by the liquid crystal optical element 90 so as to suppress the spherical aberration occurring in the substrate of the second optical disc 708.

Figure 21A:
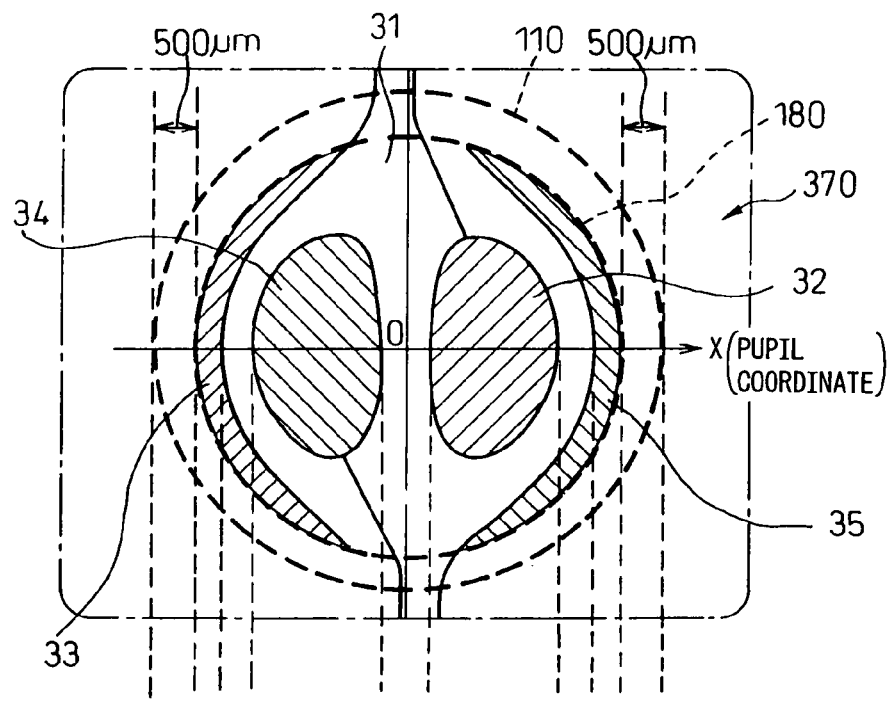
FIG. 21A is a diagram showing another example a coma aberration correcting electrode pattern in the liquid crystal optical element used in FIG. 17.

FIG. 21A shows one example of an alternative coma aberration correcting transparent electrode pattern 370 according to the present embodiment. In FIG. 21A, two regions 32 and 33 for advancing the phase and two regions 34 and 35 for retarding the phase are arranged in an inside region 180 which is defined 500 μm inward of the effective diameter 110 of the light beam incident on the liquid crystal optical element 90. In the figure, reference numeral 31 indicates a region to which a reference potential is applied.

When a positive (+) voltage with respect to the reference potential is applied to the regions 32 and 33, a potential difference occurs with respect to the transparent electrode 96 on the opposite side, and the orientation of the liquid crystal molecules therebetween changes according to the potential difference. As a result, the light beam passing therethrough is acted upon by a force that advances its phase. On the other hand, when a negative (−) voltage with respect to the reference potential is applied to the regions 34 and 35, a potential difference occurs with respect to the transparent electrode 96 on the opposite side, and the orientation of the liquid crystal molecules therebetween changes according to the potential difference. As a result, the light beam passing therethrough is acted upon by a force that delays its phase. The reference potential (here, 0 V as an example) is applied to the region 31. These voltages are applied to the transparent electrode pattern 370 via the lead 54 (see FIG. 17) from the control circuit 553.

Figure 21B:
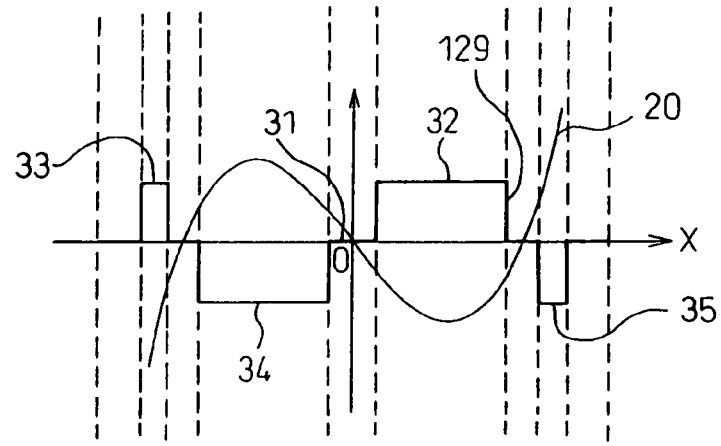
FIG. 21B is a diagram showing one example of a voltage applied to the electrode pattern shown in FIG. 21A.

In FIG. 21B, the voltage waveform 129 applied to the respective regions is plotted on the X axis. When such voltages are applied to the respective regions 31 to 35, the liquid crystal optical element 90 works to cancel out the coma aberration 20 occurring when the first optical disc 707 is tilted relative to the optical axis.

Figure 21C:
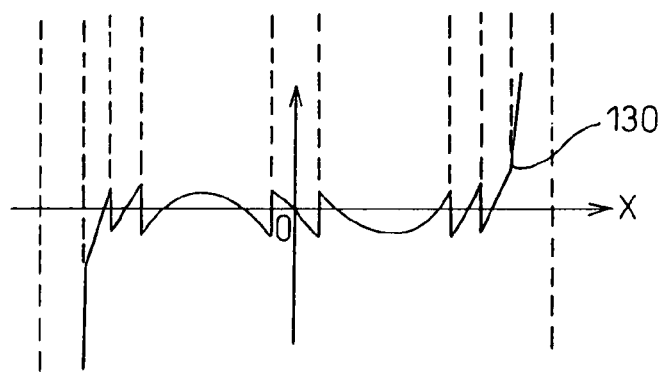
FIG. 21C is a diagram showing one example of a corrected coma aberration.

FIG. 21C shows the coma aberration 130 after the correction. That is, the coma aberration 129 in FIG. 21B is corrected as shown by the coma aberration 130 in FIG. 21C. It is thus understood that the correction is made by the liquid crystal optical element 90 so as to suppress the coma aberration occurring in the substrate of the first optical disc 707.

Figure 22A:
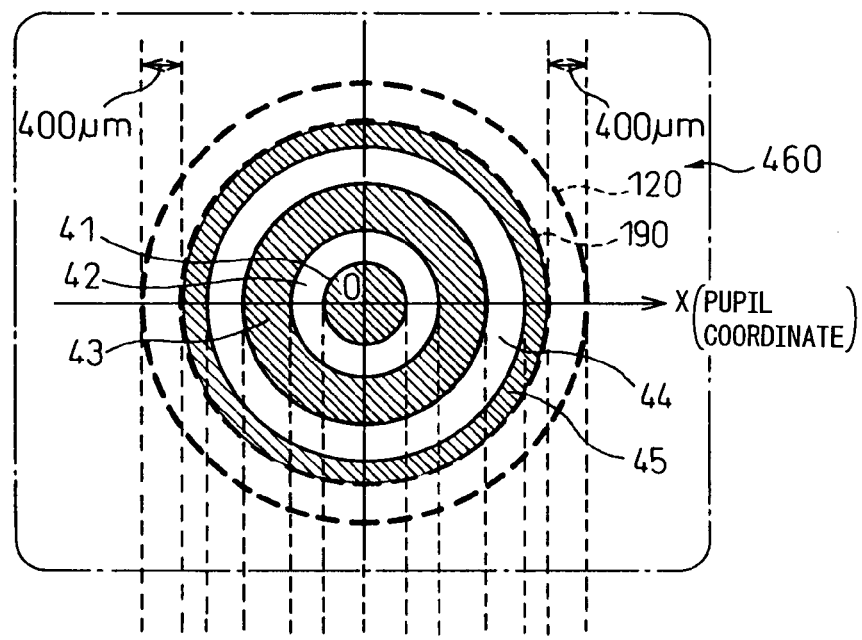
FIG. 22A is a diagram showing another example a spherical aberration correcting electrode pattern in the liquid crystal optical element used in FIG. 17.

FIG. 22A shows one example of an alternative spherical aberration correcting transparent electrode pattern 460 according to the present embodiment. This electrode pattern is one that is to be paired with the coma aberration correcting transparent electrode pattern 370 shown in FIG. 21A. In FIG. 22A, regions 42 to 45 for advancing the phase are formed in an inside region 190 which is defined 400 μm inward of the effective diameter 120 of the light beam incident on the liquid crystal optical element 90. A region 41 is a region to which a reference potential (here, 0 V as an example) is applied.

When a positive (+) voltage with respect to the reference potential is applied to each of the regions 42 to 45, a potential difference occurs with respect to the transparent electrode 92 on the opposite side, and the orientation of the liquid crystal molecules therebetween changes according to the potential difference. As a result, the light beam passing therethrough is acted upon by a force that advances its phase. These voltages are applied to the transparent electrode pattern 460 via the lead 54 (see FIG. 17) from the control circuit 553.

Figure 22B:
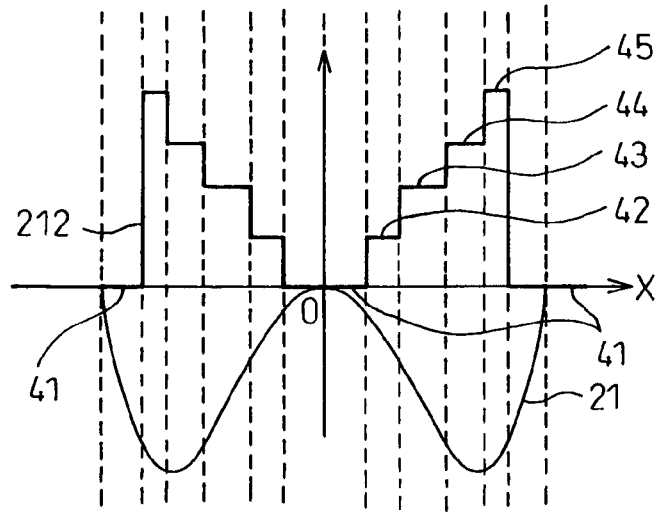
FIG. 22B is a diagram showing one example of a voltage applied to the electrode pattern shown in FIG. 22A.

In FIG. 22B, the voltages 212 applied to the respective regions are plotted on the X axis (pupil coordinate). When such voltages are applied to the respective regions 41 to 45 of the transparent electrode pattern 460, the liquid crystal optical element 90 works to cancel out the spherical aberration 21 occurring in the substrate of the second optical disc 708.

Figure 22C:
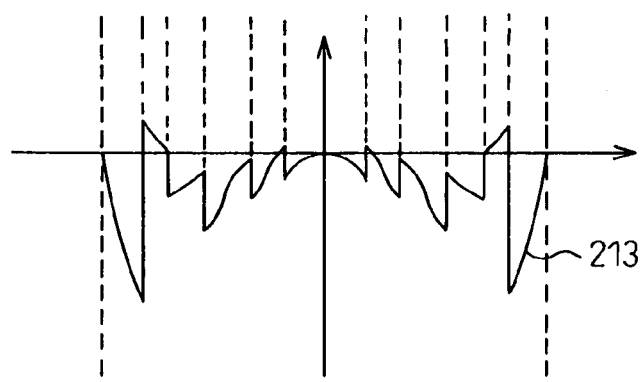
FIG. 22C is a diagram showing one example of a corrected spherical aberration.
Figure 23A:
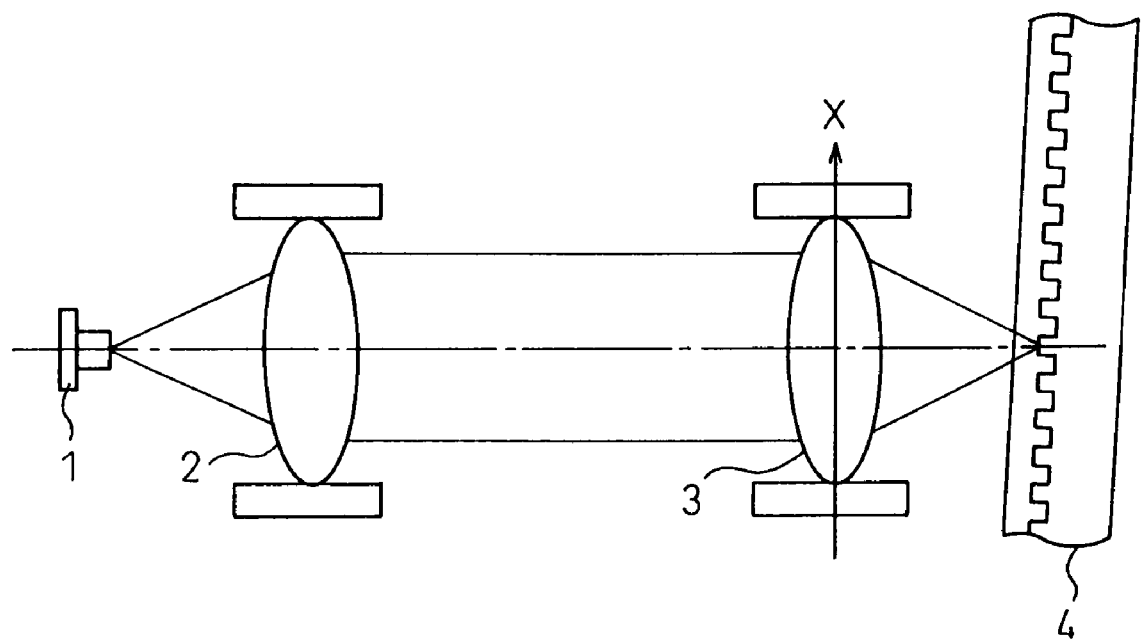
FIG. 23A is a diagram for explaining coma aberration generated due to the tilting of a recording medium.
Figure 23B:
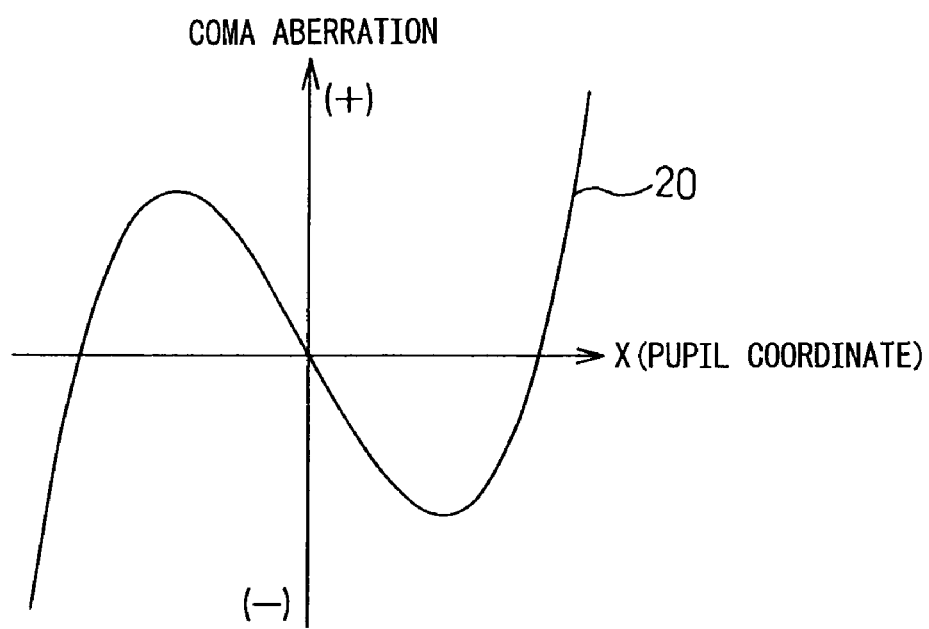
FIG. 23B is a diagram showing one example of the generated coma aberration.
Figure 24:
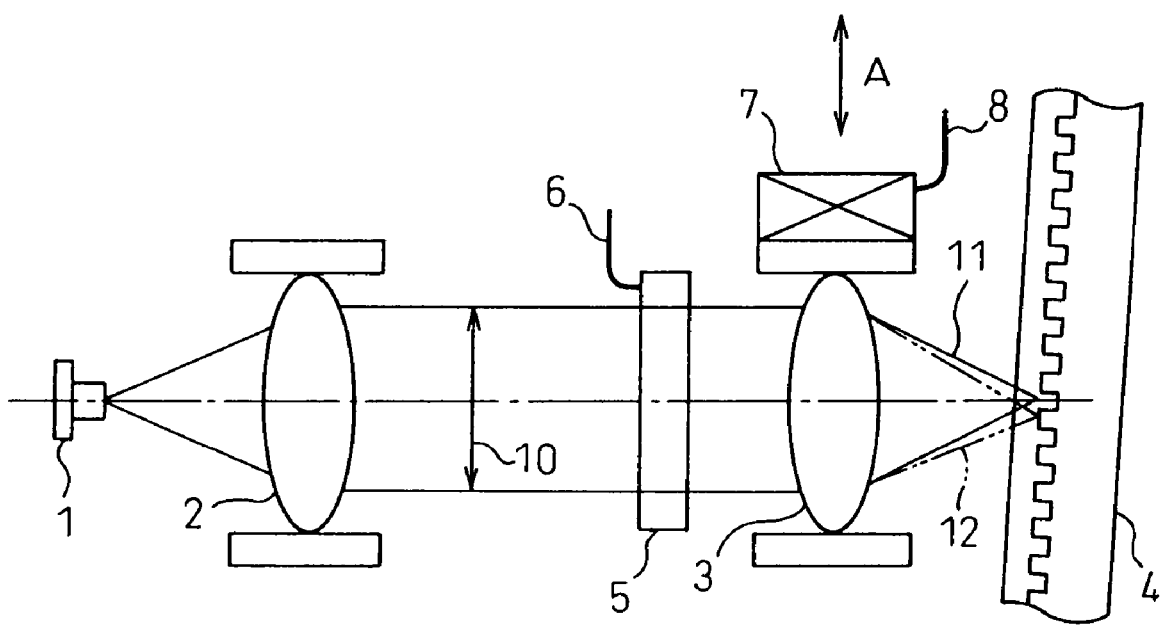
FIG. 24 is a diagram showing one example of an optical apparatus having a prior art liquid crystal optical element for coma aberration correction.

FIG. 22C shows the spherical aberration 213 after the correction. That is, the spherical aberration 21 in FIG. 22B is corrected as shown by the spherical aberration 213 in FIG. 22C. It is thus understood that the correction is made by the liquid crystal optical element 90 so as to suppress the spherical aberration occurring in the substrate of the second optical disc.

In the explanation of FIGS. 20A and 22A, it has been described that a positive (+) voltage with respect to the reference potential is applied to each region of the spherical aberration correcting transparent electrode patterns 450 and 460, thereby performing control so as to advance the phase of the light beam passing therethrough. However, if the direction of the spherical aberration occurring in the substrate of the second optical disc 708 is opposite to that shown in FIGS. 20B and 22B, control can be performed so that a negative (−) voltage opposite in polarity to that shown in FIGS. 20B and 22B is applied to each region of the transparent electrode patterns 450 and 460. In that case, the light beam passing through each region of the transparent electrode patterns 450 and 460 is acted upon by a force that delays its phase.

Here, as previously described, it is preferable that the coma aberration after the correction (residual coma aberration) and the spherical aberration after the correction (residual spherical aberration) be not greater than one quarter of the wavelength of the light beam (according to Rayleigh's quarter wavelength rule). Also, as previously described, it is preferable that the coma aberration after the correction and the spherical aberration after the correction be not greater than 1/14 of the wavelength of the light beam (according to Marechal's criterion). Further, as previously described, when the recording medium is a conventional DVD, it is preferable that the coma aberration after the correction and the spherical aberration after the correction be not greater than 33 mλ (according to the evaluation criterion (33 mλ) in the DVD evaluator).

Here, a difference will be described between such cases where the phase-advancing or phase-retarding regions are formed over the entire region inside the effective diameter 110 or 120, as shown in FIG. 25A or 29A, and such cases where the phase-advancing or phase-delaying regions are formed only in the inside region 180 or 190 defined inside the effective diameter 110 or 120, as shown in FIG. 19A, 20A, 21A, or 22A.

The wavefront aberration corrections shown in FIGS. 25A and 29A are equivalent to the case where corrections for wavefront aberrations (primarily, coma aberration and spherical aberration) are performed by capturing the light beam over the entire region of the effective diameter 110 or 120, as previously shown in FIG. 5A. In this case, however, when the objective lens 113 is moved by the actuator 7, the effective diameter of the liquid crystal optical element becomes displaced from the field of view of the objective lens (see FIG. 5B), and an effective wavefront aberration correction cannot be accomplished.

In contrast, the wavefront aberration correction shown in FIG. 19A, 20A, 21A, or 22A is equivalent to the case where the light beam falling only on the inside region defined inside the effective diameter 110 or 120 is captured and the captured light beam is corrected with the inside region corresponding to the effective diameter of the liquid crystal optical element, as previously shown in FIG. 6A. In this case, when the objective lens 113 is moved by the actuator 7, the center of the field of view of the objective lens becomes displaced from the center of the inside region, but the inside region still stays within the field of view of the objective lens (see FIG. 6B). Accordingly, satisfactory wavefront aberration correction can be accomplished, though the degree of correction somewhat drops compared with the case where the inside region is aligned with the center of the optical axis (see FIG. 6A).

As shown, as the phase-advancing and phase-retarding regions, etc. are formed only in the inside region 180 or 190 defined inside the effective diameter 110 or 120, rather than forming such regions over the entire region of the effective diameter 110 or 120, an effective wavefront aberration correction can be accomplished even when the objective lens 113 is moved by the actuator 7 for tracking.

That is, as the phase-advancing (or phase-delaying) regions are set so as to substantially stay within the field of view of the objective lens despite the movement of the lens by the actuator 7, an effective wavefront aberration correction can be accomplished.

Table 3 below shows the relationship between the inside region in which the coma aberration correcting electrode pattern is formed for the first optical disc 707 and the amount of movement of the objective lens 113 for tracking (=the amount of axis displacement) in relation to the degradation (chiefly, signal jitter) of the light intensity signal generated based on the reflected light beam from the first optical disc 707. The degradation of the light intensity signal is evaluated on a scale of A to D: A indicates the best condition, B a good condition, C a condition in which the light intensity signal is usable, and D a condition in which the light intensity signal is not usable. To construct the table shown below, coma aberration correcting electrode patterns were constructed that contained phase-advancing and phase-retarding regions only in an inside region defined 0 µm, 80 µm, 100 µm, 200 µm, 300 µm, 400 µm, 500 µm, or 600 µm, respectively, inward of the effective diameter 110, and the jitter amount of the light intensity signal was measured by displacing the liquid crystal optical element from the optical axis of the objective lens 113 by 0 µm, 50 µm, 100 µm, 150 µm, and 200 µn, respectively. The same optical apparatus construction as that shown in FIG. 17 was employed, and the effective diameter (φ) was selected as 5 mm and the numerical aperture (NA) of the objective lens as 0.65.

TABLE 3

| | | Amount of Axis Displacement (µm) | | | | |
|---|---|---|---|---|---|---|
| | | 0 | 50 | 100 | 150 | 200 |
| Inside Region (µm) | 0 | A | C | D | D | D |
| | 80 | A | B | C | D | D |
| | 100 | B | B | B | C | D |
| | 200 | B | B | B | B | C |
| | 300 | B | B | B | B | B |
| | 400 | B | B | B | B | B |
| | 500 | B | B | B | C | C |
| | 600 | C | D | D | D | D |

As can be seen from the table, even when an axis displacement of 0 µm to 100 µm occurs, satisfactory spherical aberration correction can be accomplished with the coma aberration correcting electrode pattern in which the phase-advancing and phase-retarding regions are formed only in the inside region defined 80 µm inward of the effective diameter 110. Further, even when an axis displacement of 0 µm to 150 µm occurs, satisfactory coma aberration correction can be accomplished with the coma aberration correcting electrode pattern in which the phase-advancing and phase-retarding regions are formed only in the inside region defined 100 µm inward of the effective diameter 110. Furthermore, even when an axis displacement of 0 µm to 200 µm occurs, satisfactory coma aberration correction can be accomplished with the coma aberration correcting electrode pattern in which the phase-advancing and phase-retarding regions are formed only in the inside region defined 200 µm to 500 µm inward of the effective diameter 110. As satisfactory coma aberration correction can be accomplished, the jitter amount of the light intensity signal is suppressed, and the optical apparatus is thus made usable. Here, the example in which the phase-advancing and phase-delaying regions are formed only in the inside region defined 80 µm inward of the effective diameter corresponds to the example shown in FIG. 19A, while the example in which the phase-advancing and phase-delaying regions are formed only in the inside region defined 500 µm inward of the effective diameter corresponds to the example shown in FIG. 21A.

On the other hand, in the case of the liquid crystal optical element (i.e., the liquid crystal optical element shown in FIG. 25A) in which the phase-advancing and phase-retarding regions are formed only in the inside region defined 0 µm inward of the effective diameter (i.e., over the entire region of the effective diameter 10), if an axis displacement of 100 µm or larger occurs, proper aberration correction cannot be accomplished. As a result, the jitter amount of the light intensity signal increases.

Likewise, in the case of the liquid crystal optical element in which the phase-advancing and phase-retarding regions are formed only in the inside region defined 600 µm inward of the effective diameter, if an axis displacement of 50 µm or larger occurs, proper aberration correction cannot be accomplished, as a result of which the jitter amount of the light intensity signal increases. This is presumably because the phase-advancing and phase-delaying regions are too small to accomplish proper aberration correction.

In this way, by using the liquid crystal optical element in which the phase-advancing and phase-retarding regions are formed only in the inside region defined 80 µm to 500 µm inward of the effective diameter, satisfactory coma aberration correction can be accomplished even when an axis displacement occurs due to the tracking motion of the objective lens.

Here, the inside region in which the phase-advancing and phase-delaying regions are to be formed may be set so as to match the specification of the optical apparatus. For example, if it is known in advance that the axis displacement due to tracking is 100 µm, the inside region should be set 80 µm to 100 µm inward of the effective diameter. If the axis displacement due to tracking is larger, the inside region should be set larger in accordance with the specification.

Table 4 below shows the relationship between the inside region in which the spherical aberration correcting electrode pattern is formed and the amount of movement of the objective lens 113 for tracking (=the amount of axis displacement) in relation to the degradation (chiefly, signal jitter) of the light intensity signal generated based on the reflected light beam from the second optical disc 708. The degradation of the light intensity signal is evaluated on a scale of A to D: A indicates the best condition, B a good condition, C a condition in which the light intensity signal is usable, and D a condition in which the light intensity signal is not usable. To construct the table shown below, spherical aberration correcting electrode patterns were constructed that contained a plurality of phase-advancing (or phase-retarding) regions only in an inside region defined 0 µm, 70 µm, 100 µm, 200 µm, 300 µm, 350 µm, 400 µm, or 500 µm, respectively, inward of the effective diameter 120, and the jitter amount of the light intensity signal was measured by displacing the liquid crystal optical element from the optical axis of the objective lens 113 by 0 µm, 50 µm, 100 µm, 150 µm, and 200 µm, respectively. The same optical apparatus construction as that shown in FIG. 17 was employed, and the effective diameter (φ) was selected as 4 mm and the numerical aperture (NA) of the objective lens as 0.65.

TABLE 4

| | | Amount of Axis Displacement (µm) | | | | |
|---|---|---|---|---|---|---|
| | | 0 | 50 | 100 | 150 | 200 |
| Inside Region (µm) | 0 | A | C | D | D | D |
| | 70 | A | B | C | D | D |
| | 100 | B | B | B | C | D |
| | 200 | B | B | B | B | C |
| | 300 | B | B | B | B | B |
| | 350 | B | B | B | B | B |
| | 400 | B | B | B | C | C |
| | 500 | C | D | D | D | D |

As can be seen from the table, even when an axis displacement of 0 µm to 100 µm occurs, satisfactory spherical aberration correction can be accomplished with the spherical aberration correcting electrode pattern in which the plurality of phase-advancing (or phase-retarding) regions are formed only in the inside region defined 70 µm inward of the effective diameter 120. Further, even when an axis displacement of 0 µm to 150 µm occurs, satisfactory spherical aberration correction can be accomplished with the spherical aberration correcting electrode pattern in which the plurality of phase-advancing regions are formed only in the inside region defined 100 µm inward of the effective diameter 120. Furthermore, even when an axis displacement of 0 µm to 200 µm occurs, satisfactory spherical aberration correction can be accomplished with the spherical aberration correcting electrode pattern in which the plurality of phase-advancing regions are formed only in the inside region defined 200 µm to 400 µm inward of the effective diameter 120. As satisfactory spherical aberration correction can be accomplished, the jitter amount of the light intensity signal is suppressed, and the optical apparatus is thus made usable. Here, the example in which the plurality of phase-advancing regions are formed only in the inside region defined 70 µm inward of the effective diameter 120 corresponds to the example shown in FIG. 20A, while the example in which the plurality of phase-advancing regions are formed only in the inside region defined 400 µm inward of the effective diameter corresponds to the example shown in FIG. 22A.

As described above, for the spherical aberration correcting electrode pattern, it is preferable that the plurality of phase-advancing (or phase-retarding) regions be formed only in an inside region defined 70 µm to 400 µm inward of the effective diameter 120.

Here, the coma aberration correcting electrode pattern and the spherical aberration correcting electrode pattern may be interchanged in position in relation to the light beam that enters the liquid crystal optical element 90.

In this way, in the liquid crystal optical element of the present embodiment and the optical apparatus using the same, as the coma aberration correcting electrode pattern and the spherical aberration correcting electrode pattern are each formed only in the predefined inside region, good coma aberration correction and good spherical aberration correction can be accomplished with a simple construction irrespectively of the tracking motion.

Further, in the liquid crystal optical element of the present embodiment and the optical apparatus using the same, as the regions contributing to the coma aberration correction and the spherical aberration correction are set so as to substantially stay within the field of view of the objective lens even when the objective lens is moved for tracking, satisfactory corrections can be made for both the coma and spherical aberrations occurring in the substrates of the respective recording media.

Furthermore, in the liquid crystal optical element of the present embodiment and the optical apparatus using the same, as the liquid crystal optical element for spherical aberration correction need not be combined with the objective lens in a single unit, good spherical aberration correction and good tracking can be accomplished with simple construction and without overloading the actuator.

Further, in the liquid crystal optical element of the present embodiment and the optical apparatus using the same, one of the electrode patterns of the liquid crystal is constructed as the spherical aberration correcting pattern, and the other as the coma aberration correcting pattern; this not only solves the previously described problems of the disc tilt of the recording medium and the axis displacement of the liquid crystal optical element, but also makes it possible to handle recording media such as the next generation high density DVD as well as recording media, such as DVDs, having a plurality of track surfaces.

The invention claimed is:

1. A liquid crystal optical element for use in an optical apparatus having a light source, an objective lens for focusing a light beam from said light source onto a medium, and a tracking means for moving said objective lens to follow the track of said medium, said liquid crystal optical element comprising:
a first transparent substrate;
a second transparent substrate;
a liquid crystal sealed between said first and second transparent substrates; and
an electrode pattern as a region for advancing or delaying the phase of said light beam and correcting wavefront aberration, wherein
said region is formed smaller than the field of view of said objective lens so that said region substantially stays within the field of view of said objective lens regardless of the tracking motion of said tracking means.

2. The liquid crystal optical element according to claim 1, wherein said electrode pattern is a coma aberration correcting electrode pattern, and
said region has a first region for advancing the phase of said light beam and a second region for delaying the phase of said light beam.

3. The liquid crystal optical element according to claim 2, wherein said electrode pattern has a third region that does not substantially change the phase of said light beam.

4. The liquid crystal optical element according to claim 2, wherein said region has only one said first region and only one said second region.

5. The liquid crystal optical element according to claim 2, wherein said region has two of said first regions and two of said second regions.

6. The liquid crystal optical element according to claim 2, wherein said first and second regions together are formed smaller than, and 50 μm to 300 μm inwardly of, the field of view of said objective lens when said tracking means is in a non-operating condition.

7. The liquid crystal optical element according to claim 2, wherein said first and second regions together are formed smaller than, and inwardly of, the field of view of said objective lens so that residual coma aberration of said light beam after said aberration correction is kept within λ/4, where λ is the wavelength of said light beam, when said tracking means is in a non-operating condition.

8. The liquid crystal optical element according to claim 2, wherein said first and second regions together are formed smaller than, and inwardly of, the field of view of said objective lens so that residual coma aberration of said light beam after said aberration correction is kept within λ/14, where λ is the wavelength of said light beam, when said tracking means is in a non-operating condition.

9. The liquid crystal optical element according to claim 2, wherein said first and second regions together are formed smaller than and inwardly of the field of view of said objective lens so that residual coma aberration of said light beam after said aberration correction is kept within 33 mλ, where λ is the wavelength of said light beam, when said tracking means is in a non-operating condition.

10. The liquid crystal optical element according to claim 1, wherein said electrode pattern is a spherical aberration correcting electrode pattern, and said region has a plurality of subregions for advancing or delaying the phase of said light beam.

11. The liquid crystal optical element according to claim 10, wherein said plurality of subregions are formed smaller than, and 50 μm to 300 μm inwardly of, the field of view of said objective lens when said tracking means is in a non-operating condition.

12. The liquid crystal optical element according to claim 10, wherein said plurality of subregions are formed smaller than, and inwardly of, the field of view of said objective lens so that residual spherical aberration of said light beam after said aberration correction is kept within λ/4, where λ is the wavelength of said light beam, when said tracking means is in a non-operating condition.

13. The liquid crystal optical element according to claim 10, wherein said plurality of subregions are formed smaller than, and inwardly of, the field of view of said objective lens so that residual spherical aberration of said light beam after said aberration correction is kept within λ/14, where λ is the wavelength of said light beam, when said tracking means is in a non-operating condition.

14. The liquid crystal optical element according to claim 10, wherein said plurality of subregions are formed smaller than, and inwardly of, the field of view of said objective lens so that residual spherical aberration of said light beam after said aberration correction is kept within 33 mλ, where λ is the wavelength of said light beam, when said tracking means is in a non-operating condition.

15. The liquid crystal optical element according to claim 1, wherein said electrode pattern includes a coma aberration correcting electrode pattern formed on either one of said first and second transparent substrates and a spherical aberration correcting electrode pattern formed on the other one of said first and second transparent substrates.

16. The liquid crystal optical element according to claim 15, wherein said region for said coma aberration correcting electrode pattern has a first region for advancing the phase of said light beam and a second region for delaying the phase of said light beam.

17. The liquid crystal optical element according to claim 16, wherein said coma aberration correcting electrode pattern has a third region that does not substantially change the phase of said light beam.

18. The liquid crystal optical element according to claim 16, wherein said first and second regions together are formed smaller than, and 80 μm to 500 μm inwardly of, the field of view of said objective lens when said tracking means is in a non-operating condition.

19. The liquid crystal optical element according to claim 16, wherein said first and second regions together are formed smaller than, and inwardly of, the field of view of said objective lens so that residual coma aberration of said light beam after said aberration correction is kept within λ/4, where λ is the wavelength of said light beam, when said tracking means is in a non-operating condition.

20. The liquid crystal optical element according to claim 16, wherein said first and second regions together are formed smaller than, and inwardly of, the field of view of said objective lens so that residual coma aberration of said light beam after said aberration correction is kept within λ/14, where λ is the wavelength of said light beam, when said tracking means is in a non-operating condition.

21. The liquid crystal optical element according to claim 16, wherein said first and second regions together are formed smaller than, and inwardly of, the field of view of said objective lens so that residual coma aberration of said light beam after said aberration correction is kept within 33 λm, where λ is the wavelength of said light beam, when said tracking means is in a non-operating condition.

22. The liquid crystal optical element according to claim 15, wherein said region for said spherical aberration correcting electrode pattern has a plurality of subregions for advancing or delaying the phase of said light beam.

23. The liquid crystal optical element according to claim 22, wherein said plurality of subregions are formed smaller than, and 70 μm to 400 μm inwardly of, the field of view of said objective lens when said tracking means is in a non-operating condition.

24. The liquid crystal optical element according to claim 22, wherein said plurality of subregions are formed smaller than, and inwardly of, the field of view of said objective lens so that residual spherical aberration of said light beam after said aberration correction is kept within λ/4, where λ is the wavelength of said light beam, when said tracking means is in a non-operating condition.

25. The liquid crystal optical element according to claim 22, wherein said plurality of subregions are formed smaller than, and inwardly of, the field of view of said objective lens so that residual spherical aberration of said light beam after said aberration correction is kept within λ/14, where λ is the wavelength of said light beam, when said tracking means is in a non-operating condition.

26. The liquid crystal optical element according to claim 22, wherein said plurality of subregions are formed smaller than, and inwardly of, the field of view of said objective lens so that residual spherical aberration of said light beam after said aberration correction is kept within 33 mλ, where λ is the wavelength of said light beam, when said tracking means is in a non-operating condition.

27. The liquid crystal optical element according to claim 22, wherein said coma aberration correcting electrode pattern is used for a DVD.

28. The liquid crystal optical element according to claim 22, wherein said spherical aberration correcting electrode pattern is used for a CD.

29. The liquid crystal optical element according to claim 22, wherein said objective lens is an objective lens for said DVD.

30. An optical apparatus for focusing a light beam onto a medium, comprising:
a light source;
an objective lens for focusing the light beam from said light source onto said recording medium;
a tracking means for moving said objective lens to follow the track of said medium; and
a liquid crystal optical element mounted separately from said objective lens, wherein said liquid crystal optical element includes:
a first transparent substrate;
a second transparent substrate;
a liquid crystal sealed between said first and second transparent substrates; and
an electrode pattern as a region for advancing or delaying the phase of said light beam and thereby correcting wavefront aberration, wherein said region is formed smaller than the field of view of said objective lens so that said region substantially stays within the field of view of said objective lens regardless of tracking motion of said tracking means.

31. The optical apparatus according to claim 30, wherein said electrode pattern is a coma aberration correcting electrode pattern, and said region has a first region for advancing the phase of said light beam and a second region for delaying the phase of said light beam.

32. The optical apparatus according to claim 31, wherein said electrode pattern has a third region that does not substantially change the phase of said light beam.

33. The optical apparatus according to claim 31, wherein said region has only one said first region and only one said second region.

34. The optical apparatus according to claim 31, wherein said region has two of said first regions and two of said second regions.

35. The optical apparatus according to claim 31, wherein said first and second regions together are formed smaller than, and 50 μm to 300 μm inwardly of, the field of view of said objective lens when said tracking means is in a non-operating condition.

36. The optical apparatus according to claim 31, wherein said first and second regions together are formed smaller than, and inwardly of, the field of view of said objective lens so that residual coma aberration of said light beam after said aberration correction is kept within λ/4, where λ is the wavelength of said light beam, when said tracking means is in a non-operating condition.

37. The optical apparatus according to claim 31, wherein said first and second regions together are formed smaller than, and inwardly of, the field of view of said objective lens so that residual coma aberration of said light beam after said aberration correction is kept within λ/14, where λ is the wavelength of said light beam, when said tracking means is in a non-operating condition.

38. The optical apparatus according to claim 31, wherein said first and second regions together are formed smaller than, and inwardly of, the field of view of said objective lens so that residual coma aberration of said light beam after said aberration correction is kept within 33 mλ, where λ is the wavelength of said light beam, when said tracking means is in a non-operating condition.

39. The optical apparatus according to claim 30, wherein said electrode pattern is a spherical aberration correcting electrode pattern, and
said region has a plurality of subregions for advancing or delaying the phase of said light beam.

40. The optical apparatus according to claim 39, wherein said plurality of subregions are formed smaller than, and 50 μm to 300 μm inwardly of, the field of view of said objective lens when said tracking means is in a non-operating condition.

41. The optical apparatus according to claim 39, wherein said plurality of subregions are formed only in an inside region smaller than an effective diameter of said objective lens so that residual spherical aberration of said light beam after said aberration correction is kept within λ/4, where λ is the wavelength of said light beam, when said tracking means is in a non-operating condition.

42. The optical apparatus according to claim 39, wherein said plurality of subregions are formed smaller than, and inwardly of, the field of view of said objective lens so that residual spherical aberration of said light beam after said aberration correction is kept within λ/14, where λ is the wavelength of said light beam, when said tracking means is in a non-operating condition.

43. The optical apparatus according to claim 39, wherein said plurality of subregions are formed smaller than, and inwardly of, the field of view of said objective lens so that residual spherical aberration of said light beam after said aberration correction is kept within 33 m$\lambda$, where $\lambda$ is the wavelength of said light beam, when said tracking means is in a non-operating condition.

44. The optical apparatus according to claim 39, further comprising a voltage applying means for applying a voltage to said spherical aberration correcting electrode pattern according to generated spherical aberration.

45. The optical apparatus according to claim 39, wherein said recording medium has a plurality of track surfaces, and
said optical apparatus further comprises a voltage applying means for activating said spherical aberration correcting electrode pattern according to said plurality of track surfaces.

46. The optical apparatus according to claim 30, wherein said electrode pattern includes a coma aberration correcting electrode pattern formed on either one of said first and second transparent substrates and a spherical aberration correcting electrode pattern formed on the other one of said first and second transparent substrates.

47. The optical apparatus according to claim 46, wherein said region for said coma aberration correcting electrode pattern has a first region for advancing the phase of said light beam and a second region for delaying the phase of said light beam.

48. The optical apparatus according to claim 46, wherein said coma aberration correcting electrode pattern has a third region that does not substantially change the phase of said light beam.

49. The optical apparatus according to claim 46, wherein said first and second regions together are formed smaller than, and 80 μm to 500 μm inwardly of, the field of view of said objective lens when said tracking means is in a non-operating condition.

50. The optical apparatus according to claim 46, wherein said first and second regions together are formed smaller than, and inwardly of, the field of view of said objective lens so that residual coma aberration of said light beam after said aberration correction is kept within $\lambda/4$, where $\lambda$ is the wavelength of said light beam, when said tracking means is in a non-operating condition.

51. The optical apparatus according to claim 46, wherein said first and second regions together are formed smaller than, and inwardly of, the field of view of said objective lens so that residual coma aberration of said light beam after said aberration correction is kept within $\lambda/14$, where $\lambda$ is the wavelength of said light beam, when said tracking means is in a non-operating condition.

52. The optical apparatus according to claim 46, wherein said first and second regions together are formed smaller than, and inwardly of, the field of view of said objective lens so that residual coma aberration of said light beam after said aberration correction is kept within 33 m$\lambda$, where $\lambda$ is the wavelength of said light beam, when said tracking means is in a non-operating condition.

53. The optical apparatus according to claim 46, wherein said region for said spherical aberration correcting electrode pattern has a plurality of subregions for advancing or delaying the phase of said light beam.

54. The optical apparatus according to claim 53, wherein said plurality of subregions are formed smaller than, and 70 μm to 400 μm inwardly of, the field of view of said objective lens when said tracking means is in a non-operating condition.

55. The optical apparatus according to claim 53, wherein said plurality of subregions are formed smaller than, and inwardly of, the field of view of said objective lens so that residual spherical aberration of said light beam after said aberration correction is kept within $\lambda/4$, where $\lambda$ is the wavelength of said light beam, when said tracking means is in a non-operating condition.

56. The optical apparatus according to claim 53, wherein said plurality of subregions are formed smaller than, and inwardly of, the field of view of said objective lens so that residual spherical aberration of said light beam after said aberration correction is kept within $\lambda/14$, where $\lambda$ is the wavelength of said light beam, when said tracking means is in a non-operating condition.

57. The optical apparatus according to claim 53, wherein said plurality of subregions are formed smaller than, and inwardly of, the field of view of said objective lens so that residual spherical aberration of said light beam after said aberration correction is kept within 33 m$\lambda$, where $\lambda$ is the wavelength of said light beam, when said tracking means is in a non-operating condition.

58. The optical apparatus according to claim 46, further comprising a switching means for switching operation between said coma aberration correcting electrode pattern and said spherical aberration correcting electrode pattern according to said recording medium used.

59. The optical apparatus according to claim 58, wherein said coma aberration correcting electrode pattern is used for a DVD.

60. The optical apparatus according to claim 58, wherein said spherical aberration correcting electrode pattern is used for a CD.

61. The optical apparatus according to claim 58, wherein said objective lens is an objective lens for said DVD.

* * * * *